US010435186B2

(12) United States Patent
Capitani

(10) Patent No.: US 10,435,186 B2
(45) Date of Patent: Oct. 8, 2019

(54) APPARATUS AND PROCESS FOR PACKAGING A PRODUCT

(71) Applicant: Stefano Capitani, Milan (IT)

(72) Inventor: Stefano Capitani, Milan (IT)

(73) Assignee: Cryovac, LLC, Charlotte, NC (US)

( * ) Notice: Subject to any disclaimer, the term of this patent is extended or adjusted under 35 U.S.C. 154(b) by 116 days.

(21) Appl. No.: 15/117,766

(22) PCT Filed: Feb. 10, 2015

(86) PCT No.: PCT/EP2015/052790
§ 371 (c)(1),
(2) Date: Aug. 10, 2016

(87) PCT Pub. No.: WO2015/121266
PCT Pub. Date: Aug. 20, 2015

(65) Prior Publication Data
US 2016/0355283 A1     Dec. 8, 2016

(51) Int. Cl.
*B65B 7/16* (2006.01)
*B65B 31/02* (2006.01)
(Continued)

(52) U.S. Cl.
CPC .............. *B65B 7/164* (2013.01); *B29C 65/02* (2013.01); *B29C 65/08* (2013.01); *B29C 65/18* (2013.01);
(Continued)

(58) Field of Classification Search
CPC ....... B65B 7/164; B65B 31/028; B65B 61/06; B65B 61/064
See application file for complete search history.

(56) References Cited

U.S. PATENT DOCUMENTS

| 2,762,720 A | 9/1956 | Michel et al. |
| 3,491,504 A | 1/1970 | Young et al. |

(Continued)

FOREIGN PATENT DOCUMENTS

| EP | 0469296 A1 | 2/1992 |
| EP | 0690012 A1 | 1/1996 |

(Continued)

OTHER PUBLICATIONS

Written Opinion of the International Searching Authority, PCT/EP2015/052790, 5 pages.

*Primary Examiner* — Mark A Osele
*Assistant Examiner* — Christopher C Caillouet
(74) *Attorney, Agent, or Firm* — Jon M. Isaacson

(57) ABSTRACT

An apparatus for packaging a product comprises a packaging assembly to fix a film sheet to a support. The packaging assembly includes a lower tool having seats for receiving the support and an upper tool facing the lower tool and comprising a film holding plate for holding the film sheet. The film holding plate has an active surface for receiving the film sheet, where the upper and lower tools cooperating to define a packaging chamber. The packaging assembly is open to receive the film sheet in a first operating condition and is hermetically closed in a second operating condition. The film holding plate has a lateral surface extending substantially perpendicular to a plane defined by the active surface, the film holding plate comprising ejectors arranged in the lateral surface for ejecting a stream of gas substantially parallel to said plane and substantially away from a center of the active surface.

17 Claims, 19 Drawing Sheets

(51) Int. Cl.
*B65B 61/06* (2006.01)
*B29C 65/02* (2006.01)
*B65B 41/12* (2006.01)
*B65B 51/22* (2006.01)
*B65B 57/02* (2006.01)
*B29C 65/08* (2006.01)
*B29C 65/18* (2006.01)
*B29C 65/22* (2006.01)
*B29C 65/30* (2006.01)
*B29C 65/32* (2006.01)
*B29C 65/78* (2006.01)
*B29C 65/00* (2006.01)
*B29C 65/48* (2006.01)
*B29L 31/00* (2006.01)

(52) U.S. Cl.
CPC .......... *B29C 65/222* (2013.01); *B29C 65/225* (2013.01); *B29C 65/305* (2013.01); *B29C 65/32* (2013.01); *B29C 65/7802* (2013.01); *B29C 65/7841* (2013.01); *B29C 65/7847* (2013.01); *B29C 66/00145* (2013.01); *B29C 66/112* (2013.01); *B29C 66/131* (2013.01); *B29C 66/53461* (2013.01); *B29C 66/727* (2013.01); *B29C 66/72328* (2013.01); *B29C 66/72341* (2013.01); *B29C 66/7352* (2013.01); *B29C 66/73921* (2013.01); *B29C 66/8242* (2013.01); *B29C 66/83221* (2013.01); *B29C 66/849* (2013.01); *B29C 66/91421* (2013.01); *B29C 66/91423* (2013.01); *B65B 31/028* (2013.01); *B65B 41/12* (2013.01); *B65B 51/22* (2013.01); *B65B 57/02* (2013.01); *B65B 61/06* (2013.01); *B29C 65/48* (2013.01); *B29C 65/7852* (2013.01); *B29C 65/7897* (2013.01); *B29C 66/71* (2013.01); *B29C 66/73715* (2013.01); *B29C 66/919* (2013.01); *B29C 66/961* (2013.01); *B29L 2031/712* (2013.01); *B29L 2031/7164* (2013.01)

(56) References Cited

U.S. PATENT DOCUMENTS

| | | |
|---|---|---|
| 3,574,642 A | 4/1971 | Weinke |
| 3,681,092 A | 8/1972 | Titchenal et al. |
| 3,713,849 A | 1/1973 | Grindrod et al. |
| 4,055,672 A | 10/1977 | Hirsch et al. |
| RE30,009 E | 5/1979 | Perdue et al. |
| 5,346,735 A | 9/1994 | Logan et al. |
| 6,476,137 B1 | 11/2002 | Longo |
| 7,803,416 B2 | 9/2010 | Roveda et al. |
| 2004/0033382 A1 | 2/2004 | Kendig |
| 2005/0100750 A1 | 5/2005 | Peiffer et al. |
| 2005/0257501 A1 | 11/2005 | Natterer |
| 2007/0022717 A1 | 2/2007 | Seggem |
| 2016/0355283 A1* | 12/2016 | Capitani ............... B65B 31/028 |

FOREIGN PATENT DOCUMENTS

| | | |
|---|---|---|
| FR | 1258357 A | 4/1961 |
| FR | 1286018 A | 3/1962 |
| WO | 2007093495 A1 | 8/2007 |
| WO | 2011012652 A1 | 2/2011 |

* cited by examiner

APPARATUS AND PROCESS FOR PACKAGING A PRODUCT

TECHNICAL FIELD

The present invention relates to an apparatus and to a process for packaging a product. In accordance with certain aspects, the invention relates to an apparatus and process improving configuring and positioning a film in tray lidding and skin packing. In accordance with other aspects, the invention relates to an apparatus and process for skin packaging of a product. In accordance with other aspects, the invention relates to an apparatus and process for packaging a product under a controlled atmosphere or under vacuum.

BACKGROUND ART

Containers are commonly used for the packaging of food and for a wide variety of other items wherein a lid is bonded to the container e.g. by the application of heat. The containers and lids can be made of a number of materials, for example plastic, metal, or combinations thereof, whereas the lid is typically supplied in form of a continuous film and subsequently cut into a suitable shape either before or after bonding. In some examples, a plastic lid is pre-cut into a suitable shape and subsequently heat bonded onto a plastic tray.

One method of bonding the lid to the tray involves use of a laminated plastic lid having a layer of metal foil. A power supply provides an electrical current to a nearby induction coil, which induces an electrical current into the metal foil to develop heat, which melts portions of the lid and container, and fuses the lid to the container lip. For example, EP0469296 discloses an induction sealing assembly using a single turn coil to seal a plastic lid onto a plastic container. The assembly includes a nest having a recess for holding a container to be sealed, and a movable sealing head for holding a lid or foil membrane and for positioning the lid relative to an opening in the container. Means are provided to secure a portion of the sealing head against a portion of the nest to form an airtight chamber between a lower portion of the sealing head and an upper portion of the nest. The induction sealing assembly uses a vacuum source and a source of inert gas to flush air from the container prior to sealing. An induction coil mounted in the sealing head seals the lid to the container by heating some portions of the lid in contact with the container. This solution uses a precut lid, so that means for transporting and loading the lid into a proper position for sealing are required, compromising the efficiency of the packaging process. Moreover, EP0469296 generally suggests using a roll stock foil membrane to seal the container while being silent regarding the specific manner as to how the membrane should be cut from the roll in order to form an accurately fitting tray lid.

In order to package products, in particular food products, vacuum packaging has been developed and refined in the past. Among known vacuum packaging processes, vacuum skin packaging is commonly employed for packaging food products such as fresh and frozen meat and fish, cheese, processed meat, ready-to-eat meals and the like. Vacuum skin packaging is described, for example, in FR 1258357, FR 1286018, AU 3491504, US RE 30009, U.S. Pat. Nos. 3,574,642, 3,681,092, 3,713,849, 4,055,672, and 5,346,735.

Vacuum skin packaging is basically a thermoforming process. In particular, the product is typically placed on a rigid or semi-rigid support (such as a tray, a bowl, or a cup). The support with the product placed thereon is put in a vacuum chamber, where a film of thermoplastic material, held by a local vacuum in a position above the product placed on the support, is heated to make it more yielding. The space between the support and the film is evacuated. The film is then sealed at the perimeter of the tray to fix its position relative to the tray and the local vacuum above the film is shut off, releasing the film. When the vacuum inside the chamber is decreased, the vacuum inside the tray causes the film to drape down all around the product and seal to the surface of the support not covered by the product, thus forming a tight skin around the product and on the support.

US 2007/0022717 discloses a machine for gas tight packaging an object using a film material. The machine has a lower tool for supporting two trays and an upper tool having cutting devices housed inside the upper tool and facing the lower tool. A film is interposed between the upper tool and the lower tool. The upper and lower tools are first closed the one against the other and then the film is cut to the size of the peripheral rims of the trays by the cutting devices operative inside the upper tool. Sealing tools heat-seal the cut regions of the film to the peripheral rim of the tray. A vacuum is situated in the surrounding region of the tray to cause deep drawing of the film. In the document it is also mentioned that the same device can be used for sealing trays with films that are not deep drawn to form a skin over the product.

US 2005/0257501 discloses a machine for packaging a product arranged in a tray. The machine has a lower tool for supporting the tray and an upper tool with a cutting device. During operation, the film is clamped along an edge surrounding the tray and is deformed by the upper tool in a direction extending away from the product. The space surrounding the product is then evacuated, the film and the edge of the tray are sealed, and the film is subsequently cut by the cutting device.

As to the machines disclosed in US 2007/0022717 and US 2005/0257501, the film is cut to the size of the tray within the chamber formed by the upper tool and the lower tool, by means of the cutting devices provided on the upper tool. First of all, this disadvantageously requires providing a rather complex and bulky upper tool. Further, this disadvantageously requires providing an excess film with respect to the size of the support, the excess film having to be cut from the package and to be disposed of during the packaging process or at the end thereof. Indeed, the film is in the form of a continuous sheet wound on a roll (as shown e.g. in FIG. 3 of US 2005/0257501). Therefore, excess film material is required to allow the film to be pulled from the roll and to be held in place above the supported product. Further, in US 2007/0022717 more than one product loaded support (namely two) is packaged at each cycle, so that an excess film is also present between adjacent supports.

WO2011/012652 shows an apparatus for packaging a product in a tray. The machine comprises a first film transfer plate configured for holding a film sheet, heating the film sheet, bringing the film sheet to a position above a tray with the product arranged thereon, and fixing the film sheet to the tray in an air tight manner. A second film transfer plate is also present. As for the first film transfer plate also the second film transfer plate is configured for holding a film sheet, heating the film sheet, bringing the film sheet to a position above a tray with the product arranged thereon, and fixing the film sheet to the tray in an air tight manner. During a first operating step of the machine, the first film transfer plate holds a first film sheet and heats the first film sheet, while the second film transfer plate releases a second film sheet thereby allowing the second sheet to be drawn into a first tray; and during a second operating step of the machine, the second film transfer plate holds a third film sheet and heats the third film sheet, while the first film transfer plate releases the first film sheet thereby allowing the first film sheet to be drawn into a second tray. The machine further comprises a rotating cylinder suitable for rotating about its axis X, the first film transfer plate and the second film transfer plate being connected to the rotating cylinder so that, when the rotating cylinder rotates about its axis X, the positions of the first film transfer plate and the second film transfer plate are exchanged. A vacuum arrangement allows removing air from within the tray underneath the film sheet (positioned either by the first or by the second film transfer plate) through the at least one hole present in the tray. The film transfer plates are configured to release the film sheet thereby allowing the film sheet to be drawn into the tray while the vacuum arrangement is removing air from within the tray.

As can be seen from the description above, the use of pre-cut film provides an improvement over known methods and apparatus for packaging products, which rely on excess film being cut from packaged products, after packaging and sealing thereof. If the dimensions of the film—in particular the width thereof—and those of the trays are carefully adapted to one another, packaging of products using tray lidding and skin packaging can be realized effectively without excess film material having to be cut from the packaged products. This leads to substantial advantages with respect to the minimization of material consumption.

However, as shown in some examples above, excess film material can be utilized in terms of positioning the film so that requirements with respect to the accuracy of positioning the film can be much less strict. Further, in terms of handling the film, having excess portions around the packaged product allows for easy handling of the film by the excess portions being acted upon by the packaging apparatus. For example, excess portions of the film can be clamped in order to pull the film into position. In other examples, the amount of material in the excess portions can provide a stiffness to the excess portion preventing unwanted folding or other deformations and/or movements that can be detrimental to the packaging process and/or that could lead to imperfections in the packaging (e.g. compromised seal or uneven appearance).

Consequently, minimizing or eliminating the amount of excess material necessary for the packaging process can lead to one or more of the following detrimental effects.

In tray lidding, a pre-cut lid is positioned on a film holder above a tray to be sealed so that the pre-cut film extends beyond the film holder. This facilitates a sealing tool to act upon the portions of the film extending beyond the film holder in order to seal the film to the tray. However, the portions of the pre-cut film extending beyond the film holder are prone to deformation due to a number of packaging process related factors: heat emitted from the sealing tool or other components, turbulence of gas or air created upon evacuation and/or upon creation of the inert atmosphere, mechanical movement of components of the packaging tool, mechanical resistance and/or rigidity of the material at certain process related temperatures, etc. When such deformation occurs, the quality of the seal can be compromised, possibly leading to a seal of mediocre quality or a defective seal.

In skin packaging, portions of pre-cut film extending beyond the sealing tool typically extend from the corners of the tool, in particular, when the pre-cut film has a rectangular outline and pointy corners, while the tray has a curved outline and curved corners. Here, too, the film can deform and impact the quality of the seal and packaging.

Therefore, it is an object of the invention conceiving a process and an apparatus, which can efficiently and accurately position and configure a film in tray lidding or skin packaging. In particular, it is an object of the invention to position and configure peripheral portions of the film.

A further object of the invention is to provide a packaging process and apparatus that facilitate an effective control of the temperature of a film and/or peripheral portions thereof in order to prevent or eliminate undesired shrinking of the material of the film.

SUMMARY OF THE INVENTION

One or more of the objects specified above are substantially achieved by a process and by an apparatus according to any one of the appended claims. Aspects of the invention are disclosed below.

According to the invention, in a $1^{st}$ aspect there is provided an apparatus for packaging a product arranged on a support, said support having a base wall and a side wall, said apparatus comprising a packaging assembly configured for tightly fixing one or more film sheets to said one or more supports. The packaging assembly includes a lower tool comprising at least an inner wall defining a prefixed number of seats for receiving said one or more supports, and an upper tool facing the lower tool and comprising a film holding plate configured for holding the one or more film sheets, the film holding plate having a respective active surface configured for receiving the one or more film sheets, at least the upper and lower tools cooperating to define a packaging chamber. The packaging assembly is configured to operate at least in a first operating condition, where said packaging chamber is open to receive the one or more film sheets and, in a second operating condition, where said packaging chamber is optionally hermetically closed. The apparatus further comprises a film supplying assembly configured for supplying a continuous film, a film cutting assembly active on the continuous film and configured for cutting film sheets of prefixed length from said continuous film, optionally wherein the film cutting assembly is located outside said packaging chamber, and a control unit connected to the packaging assembly and configured for commanding the packaging assembly to pass from the first to the second operating condition and vice-versa, wherein the film holding plate has a lateral surface extending substantially perpendicular to a plane defined by the active surface, the film holding plate comprising a plurality of ejectors arranged in the lateral surface, each of the plurality of ejectors being configured for ejecting a stream of gas in a direction substantially parallel to said plane and substantially away from a center of the active surface.

In a $2^{nd}$ aspect according to the $1^{st}$ aspect, the apparatus further comprises at least one transfer device configured for positioning the cut film sheets inside the packaging chamber and above the respective support, the transfer device including a backing structure having a flat holding surface adapted for receiving the at least one or more film sheets cut by the cutting assembly, and one selected in the group of a mechanism active on the packaging assembly and configured for displacing the upper tool between a first position, where the upper tool is positioned in correspondence of the backing structure and configured to pick up from the backing structure the one or more cut film sheets, and at least a second position, where the upper tool is aligned to the lower tool and configured to position at least one film sheet above said support, and a mechanism active on the backing structure and configured for relative movement of the backing structure with respect to the packaging assembly between a first position, where the baking structure is positioned at the cutting assembly and at least a second position, where the backing structure is positioned inside said packaging chamber and configured to place at least one film sheet above said support. The control unit is further configured for activating the transfer device for positioning the cut film sheets inside the packaging chamber and above the respective support, and synchronizing activation of the transfer device with passage of the packaging assembly from the first to the second operating condition.

In a $3^{rd}$ aspect according to any one of the $1^{st}$ and $2^{nd}$ aspects, the apparatus further comprises a transport assembly configured for displacing one or more supports along a predefined path to the packaging assembly, the transport assembly including a conveyor configured for displacing a prefixed number of supports per time, wherein the control unit is configured for controlling the conveyor to displace the prefixed number of supports from a region outside the packaging chamber, to a region inside the packaging chamber where the support or supports of said prefixed number are in vertical alignment to respective film sheets, and synchronizing the conveyor such that movement of the prefixed number of supports from the region outside the packaging chamber to the region inside the packaging chamber is caused to take place when the packaging chamber is open.

In a $4^{th}$ aspect according to any one of the preceding aspects, the apparatus further comprises at least one of a vacuum arrangement connected to the packaging chamber and configured for removing gas from said packaging chamber, the vacuum arrangement optionally comprising at least one vacuum pump and at least one evacuation pipe connecting the inside of said packaging chamber to the vacuum pump, said control unit being further configured to control the vacuum arrangement to withdraw gas from said packaging chamber at least when the packaging assembly is in said second operating condition with said packaging chamber hermetically closed; and a controlled atmosphere arrangement connected to the packaging chamber and configured for injecting a stream of controlled gas into said packaging chamber, the controlled atmosphere arrangement optionally comprising at least one injection device and at least one injection pipe connecting the inside of said packaging chamber to the injection device, said control unit being further configured to control said controlled atmosphere arrangement to inject said stream of controlled gas at least when the packaging assembly is in said second operating condition with said packaging chamber hermetically closed; wherein the controlled atmosphere arrangement is configured to inject gas into the packaging chamber including a quantity of one or more of $N_2$, $O_2$ and $CO_2$ which is different from the quantity of these same gases as present in the atmosphere at 20° C. and sea level (1 atmosphere pressure).

In a $5^{th}$ aspect according to the $4^{th}$ aspect, the apparatus includes both the vacuum arrangement and the controlled atmosphere arrangement, wherein the control unit is configured to control said controlled atmosphere arrangement to start injecting said stream of controlled gas either after a prefixed delay from activation of said vacuum arrangement or after a prefixed level of vacuum has been reached inside said packaging chamber, optionally wherein said control unit is configured to control said controlled atmosphere arrangement to start injecting said stream of controlled gas while said gas withdrawal from said packaging chamber is still ongoing. The pump is preferably of a type compatible with the type or composition of gas being used (e.g. suitable for a gas mixture having a high oxygen content and, therefore, being highly flammable).

In a $6^{th}$ aspect according to any one of the $4^{th}$ and $5^{th}$ aspects, the control unit is configured to operate the vacuum arrangement for removing gas from said packaging chamber and create in the packaging chamber a vacuum level with pressure comprised between 100 and 300 mbar, optionally between 150 and 250 mbar.

In a $7^{th}$ aspect according to any one of the preceding aspects, the packaging assembly further comprises a main actuator active on at least one of said upper and lower tool, the main actuator being controlled by the control unit. The control unit is configured for acting on the main actuator and causing relative movement of the upper and lower tool, along a main direction, between said first operating condition, where the upper tool is spaced apart from the lower tool and said packaging chamber is open to receive one or more of said film sheets, and said second operating condition, where a closure surface of the upper tool tightly abuts against a closure surface of the lower tool to hermetically close said packaging chamber with respect to an atmosphere outside the apparatus.

In an $8^{th}$ aspect according to any one of the preceding aspects, the film holding plate comprises means for holding the one or more film sheets in correspondence of said active surface, said means for holding comprising one or more in the group of a vacuum source controlled by the control unit, the control unit being configured for activating the vacuum source and causing the film holding plate to receive and hold said one or more film sheets in correspondence of the active surface, mechanical holders associated to the active surface, adhesive portions associated to the active surface, heatable portions associated to the holding plate and controlled by control unit for causing heating of the active surface and thus of the film sheet in order to increase stickiness of the film sheet to the active surface, electric systems associated to the holding plate and controlled by control unit for charging the active surface with a predetermined polarity.

In a $9^{th}$ aspect according to the $8^{th}$ aspect, the apparatus further comprises a heating structure peripherally associated to the film holding plate and having a respective heating surface which extends radially outside with respect to the active surface of the holding plate, wherein at least when the packaging assembly is in said second operating condition, the heating surface of the heating structure faces an end surface of said inner wall delimiting a respective one of said seats in the lower tool, the heating structure and film holding plate are relatively movable the one with respect to the other along said main direction (A5) such that the heating surface of the heating structure may selectively be positioned in a position where it does not contact the film sheet and in a position where it contacts the film sheet positioned above a support located in one of said seats, and the control unit is configured for controlling heating of the heating structure such that the heating surface is brought at least to a first temperature.

In a $10^{th}$ aspect according to any one of the preceding aspects, the apparatus further comprises heating means integrated in the film holding plate and controlled by the control unit, the control unit being configured for controlling the heating means such that the active surface of the film holding plate is brought at least to a second temperature comprised between 150° C. and 260° C., optionally between 180-240° C., more optionally between 200-220° C. The aforementioned temperatures are at least suitable for materials such as PET. In case PE is used, the temperature range is preferably comprised between 130° C. and 160° C.

In an 11$^{th}$ aspect according to aspects 9 and 10, the control unit is configured for independently controlling the heating means and the heating structure and to independently set the first and second temperatures.

In a 12$^{th}$ aspect according to any one of aspects 9 to 11, the heating structure comprises one of a metallic body embedding at least one resistive and/or inductive element connected to a power supply and to the control unit which is configured for controlling the power supply to supply current to the resistive or inductive element such as to keep the temperature of the heating surface within a prefixed range around said first temperature; a metallic wire directly carried by the heating surface of the heating structure, the metallic wire being connected to a power supply and to the control unit which is configured for controlling the power supply to supply current to the metallic wire during discrete time intervals followed by time intervals where no current supply to the metallic wire takes place, in particular wherein the control unit is configured for controlling the power supply to supply current to the metallic wire when sealing of the film sheet to the support takes place; and a printed circuit formed onto said heating surface of the heating structure, the printed circuit being connected to a power supply and to the control unit which is configured for controlling the power supply to supply current to the printed circuit during discrete time intervals followed by time intervals where no current supply to printed circuit takes place exclusively, in particular wherein the control unit is configured for controlling the power supply to supply current to the printed circuit when sealing of the film sheet to the support takes place.

In a 13$^{th}$ aspect according to any one of aspects 9 to 12, the film holding plate is rigidly coupled to the upper tool and mounted to this latter such as the film holding plate is not relatively movable with respect to the upper tool at least along said main direction (A5), the active surface is flush to the bottom surface of the lower tool, and said active surface of the holding plate is sufficiently sized to overlap, optionally completely overlap, an end surface of said inner wall delimiting a respective one of said seats in the lower tool.

In a 14$^{th}$ aspect according to any one of the preceding aspects, the film holding plate has a substantially rectangular shape comprising four corners, and wherein the plurality of ejectors comprises at least one ejector arranged at each of the four corners of the holding plate. The corners preferably have a rounded shape.

In a 15$^{th}$ aspect according to any one of the preceding aspects, the plurality of ejectors are arranged around a perimeter of the film holding plate defined by the lateral surface, optionally wherein the plurality of ejectors are spaced in a substantially equidistant position from one another.

In a 16$^{th}$ aspect according to any one of the preceding aspects, the plurality of ejectors are in fluid communication with a common manifold configured to supply the stream of gas to each of the plurality of ejectors.

In a 17$^{th}$ aspect according to any one of the preceding aspects, the plurality of ejectors is angularly arranged with respect to the center of the active surface in substantially the same angular distance from one another.

In an 18$^{th}$ aspect according to any one of the preceding aspects, the apparatus further comprises a film positioning arrangement connected to the plurality of ejectors and configured for supplying the stream of gas to the plurality of ejectors, optionally the film positioning arrangement comprising at least one supply device and at least one supply pipe connecting the supply device with the plurality of ejectors.

In a 19$^{th}$ aspect according to the 18$^{th}$ aspect, the control unit is further configured to control said film positioning arrangement to supply said stream of gas comprising one or more of starting supply of the stream of gas, increasing supply of the stream of gas, decreasing supply of the stream of gas, and stopping supply of the stream of gas.

In a 20$^{th}$ aspect according to any one of aspects 18 or 19, and according to any one of aspects 4 or 5, the stream of gas has a same composition as the stream of controlled gas injected by the controlled atmosphere arrangement, optionally wherein the film positioning arrangement comprises a supply switch configured to controllably select a first gas supply source and a second gas supply source for of the stream of gas, the first gas supply source being configured to supply gas having the same composition as the stream of controlled gas injected by the controlled atmosphere arrangement, the second gas supply source being configured to supply air.

In a 21$^{st}$ aspect according to any one of aspects 18 or 19, the stream of gas comprises air.

In a 22$^{nd}$ aspect according to any one of aspects 18 to 21, and according to aspect 5, the control unit is configured to execute the steps of: controlling said film positioning arrangement to start supply of the stream of gas to the ejectors, controlling said vacuum arrangement to withdraw gas from said packaging chamber, controlling said controlled atmosphere arrangement to start injecting the stream of controlled gas, controlling said controlled atmosphere arrangement to stop injecting the stream of controlled gas, controlling said film positioning arrangement to stop supply of the stream of gas to the ejectors.

In a 23$^{rd}$ aspect according to aspects 22 and 20, the step of controlling said vacuum arrangement to withdraw gas from said packaging chamber further comprises controlling the film positioning arrangement to decrease or stop supply of the stream of gas to the ejectors during withdrawal of gas from the packaging chamber, optionally further comprising controlling the film positioning arrangement to restart or increase supply of the stream of gas to the ejectors while withdrawal of gas from the packaging chamber is still ongoing.

In a 24$^{th}$ aspect according to any one of aspects 22 and 23, and according to aspect 20, the step of controlling the controlled atmosphere arrangement to start injecting the stream of controlled gas further comprises controlling the film positioning arrangement to start supply of a gas to the ejectors having the same composition as the stream of controlled gas.

In a 25$^{th}$ aspect according to any one of the preceding aspects, the packaging assembly further comprises at least a side wall movably associated to one of the upper tool or lower tool, wherein the side wall has a front surface configured for abutting against an abutment surface of the other of said upper tool or lower tool, the side wall is mounted to the packaging assembly such that when the packaging assembly moves from said first operating condition to said second operating condition, the side wall correspondingly moves from a first position, where the side wall front surface is spaced from said abutment surface so that the packaging chamber is left open to receive one or more of said film sheets, to a second position, where the side wall front surface tightly closes against said abutment surface such that said packaging chamber is hermetically closed with respect to an atmosphere outside the apparatus.

In a 26$^{th}$ aspect according to the 25$^{th}$ aspect, and according to aspect 7, the control unit is configured, after the packaging assembly has reached the second operating condition, for acting on the main actuator and causing a further relative movement of the upper and lower tools, along the main direction (A5) such that the film sheet held in position by the holder plate is pressed against the rim of the support and wherein the further relative movement causes a retraction of the side wall against the reaction of a contrast element, which optionally comprises one or more elastic elements.

In a 27$^{th}$ aspect according to any one of the preceding aspects, the lower tool is provided with multiple seats each for hosting a corresponding support and wherein the upper tool is provided with a corresponding plurality of holding plates each for holding a respective film sheet.

In a 28$^{th}$ aspect according to the 27$^{th}$ aspect, the apparatus further comprises a plurality of distinct backing structures, each comprising a flat holding surface adapted for receiving one respective of said film sheets, each of the backing structures being movable between at least the cutting assembly, to pick up the respective film sheet, and the inside of the chamber, to position the cut film sheet in correspondence of the respective upper tool holding plate, and a transfer actuator being active on the backing structures for allowing movement of the backing structures and thus of cut film sheets from the cutting assembly to inside of the packaging chamber, the transfer actuator being controlled by the control unit such that to increase a mutually spacing among the backing structures before, when or subsequent to moving the backing structures from the cutting assembly to the inside the packaging chamber.

In a 29$^{th}$ aspect according to any one of the preceding aspects, the packaging assembly comprises, for each of said seats, a number of pusher elements adapted to move from a release position, where active portions of the pusher elements are spaced from the active surface of the holding plate, to an engage position, where active portions of the pusher elements press the cut film sheet border portions against said active surface of the holding plate, wherein said pusher elements include one selected in the group of finger shaped stoppers pivotally mounted to the upper tool and active in correspondence of corners of said seats, finger shaped stoppers mounted to the lower tool, configured to be vertically moved, and active in correspondence of corners of said seats, oscillating bars pivotally mounted to the upper tool and active in correspondence of side borders of said seats, and oscillating bars mounted to the lower tool, configured to be vertically moved, and active in correspondence of side borders of said seats. Optionally, at least one pusher actuator is active on said pusher elements under the control of said control unit which is configured to activate the said pusher actuator and move the pusher elements from said release to said engage position and vice versa.

In a 30$^{th}$ aspect according to any one of the preceding aspects, the apparatus further comprises a frame carrying the transport assembly, the packaging assembly, the film supplying assembly, which comprises a film roll supported by a roll holder carried by said frame, and the film cutting assembly, which comprises at least one blade carried by said frame and active in a position located between said packaging assembly and said film supply assembly. The control unit is configured for execution of the following cycle: commanding the transport assembly to displace said support said packaging chamber; commanding the film cutting assembly to cut at least one film sheet; commanding the transfer device to position the cut film sheet inside the packaging chamber and above the respective support; commanding the upper tool to hold the cut film sheet above, and at a distance from, said support; commanding the packaging assembly to pass from the first to the second operating condition (optionally commanding the vacuum arrangement to remove air from within said hermetically closed packaging chamber and/or commanding the controlled atmosphere arrangement to inject a gas or a gas mixture in the packaging chamber); and commanding the packaging assembly to tightly fix the film sheet to said support.

According to the invention, in a 31$^{st}$ aspect there is provided a process of packaging a product arranged on a support, said support having a base wall and a side wall, said process optionally using an apparatus according to any one of the preceding claims, the process comprising the steps of unrolling a film from roll, transversely cutting the unrolled portion of film and preparing a cut film sheet, moving the cut film sheet into a packaging chamber of a packaging assembly and into the proximity of a film holder arranged within the packaging chamber, the film holder having an active surface, activating ejection of a plurality of streams of gas around a perimeter of the film holder, the plurality of streams of gas being ejected over a peripheral portion (18b, 18c) of the cut film sheet in a direction substantially parallel to a plane defined by the cut film sheet and away from a center of the cut film sheet, in order to position the peripheral portion (18b, 18c) substantially within the plane of the cut film sheet, moving a support into the packaging chamber and below the film holder, substantially in superimposition with the cut film sheet, optionally the cut film sheets being held at a distance sufficient to allow gas circulation inside the support, moving the support into a position substantially in contact with the cut film sheet, deactivating the ejection of the plurality of streams of gas, heat sealing the film sheet to the support.

Optionally, the process comprises the steps of hermetically closing the packaging chamber with the cut film sheet held above the support after moving the support into the packaging chamber and below the film holder, and opening the hermetically closed packaging chamber, and moving the support having the cut film sheet sealedly fixed thereto out of the packaging chamber after heat sealing the film sheet to the support.

In a 32$^{nd}$ aspect according to the 31$^{st}$ aspect, the cutting of the film into film sheets takes place outside the packaging chamber at a station remote from the location where the film sheets are coupled to the supports, and wherein the support comprises and horizontal rim radially emerging from said side wall, optionally wherein the film sheet is cut to a size identical to that of the outer border of the rim or to a size radially smaller than the outer edge of rim but sufficient to tightly close the mouth of the tray and sealingly engage the rim top surface.

In a 33$^{rd}$ aspect according to any one of aspects 31 to 32, the process further comprises evacuating the hermetically closed packaging chamber, and/or injecting a stream of controlled gas, the stream of controlled gas being configured for creating a modified atmosphere within the chamber.

In a 34$^{th}$ aspect according to any one of aspects 31 to 32, the process further comprises the steps of evacuating the hermetically closed packaging chamber until a pressure comprised between 100 and 300 mbar, optionally between 150 and 250 mbar, is reached inside said packaging chamber and then—while the film sheet is kept at a distance from a support mouth—injecting a stream of controlled gas into the packaging chamber, the stream of controlled gas being configured for creating a modified atmosphere, optionally wherein injecting of said stream of controlled gas for creating a modified atmosphere is performed while the step of evacuating is still ongoing; and uniformly heating the film sheet in case the film sheet is not heat shrinkable or heating a peripheral portion of the film sheet in case the film is heat shrinkable; and approaching the film sheet to the support and tightly bonding it to the support rim, preferably the step of heating the film sheet or the step of heating the peripheral portion of the film sheet being performed at substantially the same time as the step of approaching the film sheet to the support.

In a 35$^{th}$ aspect according to any one of aspects 31 to 33, the process further comprises the steps of heating a peripheral portion of the film sheet to a first temperature adequate for heat sealing, and heating a central portion to a second temperature adequate for rendering the film sheet deformable, optionally the second temperature being equal to or higher than the first temperature.

BRIEF DESCRIPTION OF THE DRAWINGS

The present invention will become clearer by reading the following detailed description, given by way of example and not of limitation, to be read with reference to the accompanying drawings, wherein.

DEFINITIONS AND CONVENTIONS

Figure 1:
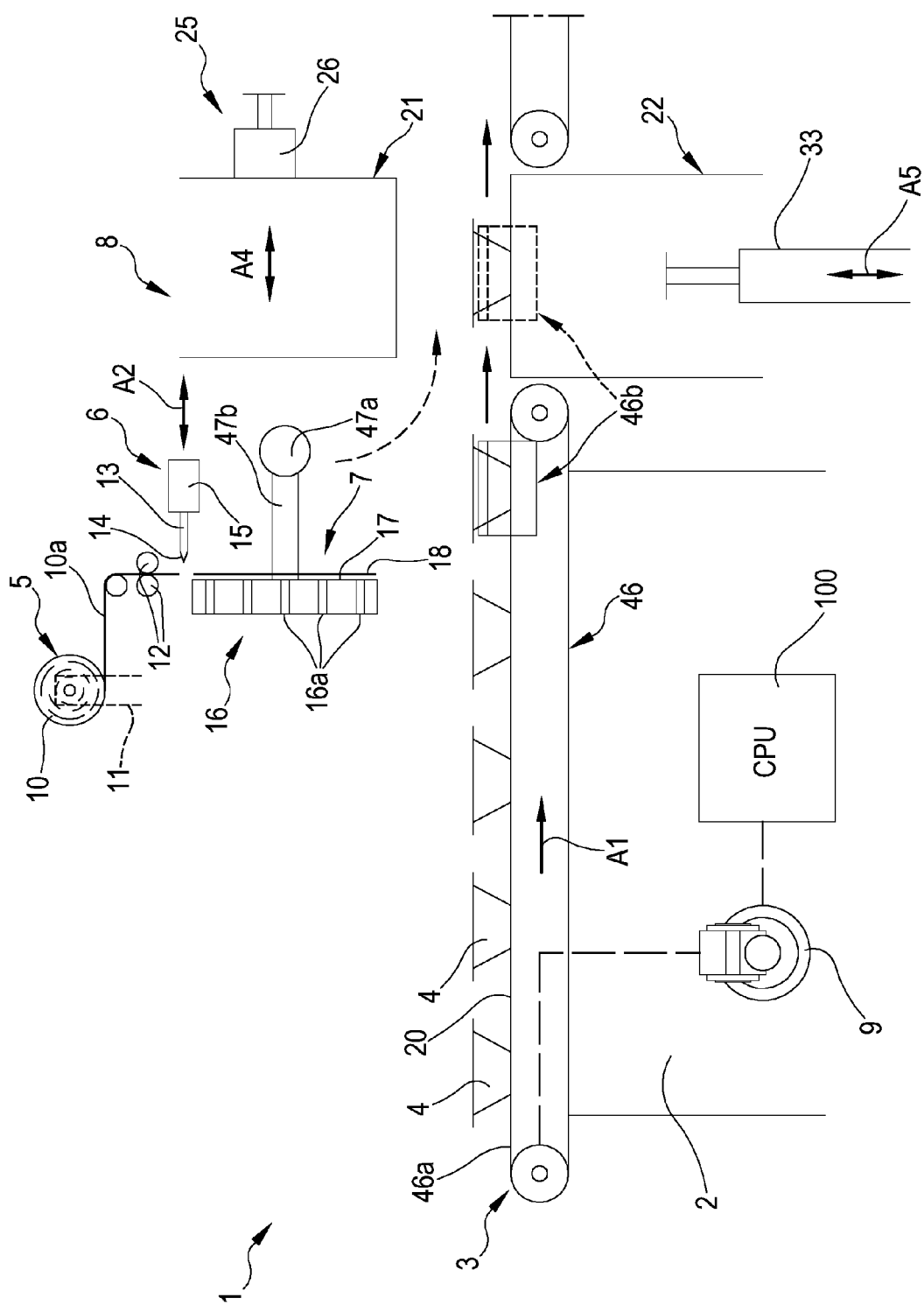
FIG. 1 is a schematic side view layout of an apparatus according to aspects of the invention. The layout of the apparatus of FIG. 1 may be present in all embodiments described herein.

It should be noted that in the present detailed description corresponding parts shown in the various figures are indicated with the same reference numerals through the figures. It is further noted that the figures are not to scale and the parts and components shown therein are schematic representations.

In the following description and claims the apparatus and process refer to packaging of a product inside a support or tray. The product may be a food product or other product.

As used herein, support 4 denotes a container of the type having a base wall 4a, a side wall 4b, and optionally a top rim 4c radially emerging from the side wall 4b. It is also noted that for the purpose of the present description the terms tray and support have the same meaning and can be used interchangeably. The tray or supports 4 may have a rectangular shape or any other suitable shape, such as round, square, elliptical etc. Trays may be manufactured by thermoforming or injection molding.

The Trays or Supports

The trays or supports 4 described and claimed herein may be made of a single layer or, preferably, of a multi-layer polymeric material. In some examples, the supports are substantially flat and/or made of foamed material.

In case of a single layer material, suitable polymers include, for example, polystyrene, polypropylene, polyesters, high density polyethylene, poly(lactic acid), PVC, and the like, either foamed or solid.

Preferably the tray 4 is provided with gas barrier properties. As used herein such term refers to a film or sheet of material which has an oxygen transmission rate of less than 200 cm$^3$/m$^2$·day·atm, less than 150 cm$^3$/m$^2$·day·atm, less than 100 cm$^3$/m$^2$·day·atm as measured according to ASTM D-3985 at 23° C. and 0% relative humidity. Suitable materials for gas barrier monolayer thermoplastic trays 4 are, for example, polyesters, polyamides and the like.

In case the tray 4 is made of a multi-layer material, suitable polymers are, for example, ethylene homo- and co-polymers, propylene homo- and co-polymers, polyamides, polystyrene, polyesters, poly(lactic acid), PVC and the like. Part of the multi-layer material can be solid and part can be foamed.

For example, the tray 4 may comprise at least one layer of a foamed polymeric material chosen from the group consisting of polystyrene, polypropylene, polyesters and the like.

The multi-layer material may be produced either by co-extrusion of all the layers using co-extrusion techniques or by glue- or heat-lamination of, for example, a rigid foamed or solid substrate with a thin film, usually called "liner".

The thin film may be laminated either on the side of the tray 4 in contact with the product P or on the side facing away from the product P or on both sides. In the latter case the films laminated on the two sides of the tray 4 may be the same or different. A layer of an oxygen barrier material, for example (ethylene-co-vinyl alcohol) copolymer, is optionally present to increase the shelf-life of the packaged product P.

Gas barrier polymers that may be employed for the gas barrier layer are PVDC, EVOH, polyamides, polyesters and blends thereof. The thickness of the gas barrier layer will be set in order to provide the tray with an oxygen transmission rate suitable for the specific packaged product.

The tray may also comprise a heat sealable layer. Generally, the heat-sealable layer will be selected among the polyolefins, such as ethylene homo- or co-polymers, propylene homo- or co-polymers, ethylene/vinyl acetate copolymers, ionomers, and the homo- and co-polyesters, e.g. PETG, a glycol-modified polyethylene terephthalate.

Additional layers, such as adhesive layers, to better adhere the gas-barrier layer to the adjacent layers, may be present in the gas barrier material for the tray and are preferably present depending in particular on the specific resins used for the gas barrier layer.

In case of a multilayer material used to form the tray 4, part of this structure may be foamed and part may be un-foamed. For example, the tray 4 may comprise (from the outermost layer to the innermost food-contact layer) one or more structural layers, typically of a material such as foam polystyrene, foam polyester or foam polypropylene, or a cast sheet of e.g. polypropylene, polystyrene, poly(vinyl chloride), polyester or cardboard; a gas barrier layer and a heat-sealable layer.

The tray 4 may be obtained from a sheet of foamed polymeric material having a film comprising at least one oxygen barrier layer and at least one surface sealing layer laminated onto the side facing the packaged product, so that the surface sealing layer of the film is the food contact layer the tray. A second film, either barrier or non-barrier, may be laminated on the outer surface of the tray.

Specific tray 4 formulations are used for food products that require heating in a conventional or microwave oven before consumption. The surface of the container in contact with the product, i.e. the surface involved in the formation of the seal with the lidding film, comprises a polyester resin. For example, the container can be made of a cardboard coated with a polyester resin or it can be integrally made of a polyester resin. Examples of suitable containers for the package of the invention are CPET, APET or APET/CPET containers. Such containers can be either foamed or not foamed.

Trays 4 used in tray lidding or skin packaging applications containing foamed parts, have a total thickness lower than 8 mm, and, for example, may be comprised between 0.5 mm and 7.0 mm, more frequently between 1.0 mm and 6.0 mm.

In case of a rigid tray not containing foamed parts, the total thickness of the single-layer or multi-layer thermoplastic material is preferably less than 2 mm, and, for example, may be comprised between 0.1 mm and 1.2 mm, more frequently between 0.2 mm and 1.0 mm.

The Film or Film Material

The film or film material 10a described herein may be applied to the tray or support 4 to form a lid on the tray (e.g. for MAP—modified atmosphere packaging) or a skin-like cover in contact with the tray and product, and matching the contour of the product.

The film for skin packaging applications may be made of a flexible multi-layer material comprising at least a first outer heat-sealable layer, an optional gas barrier layer and a second outer heat-resistant layer. The outer heat-sealable layer may comprise a polymer capable of welding to the inner surface of the supports carrying the products to be packaged, for example, ethylene homo- or co-polymers, like LDPE, ethylene/alpha-olefin copolymers, ethylene/acrylic acid copolymers, ethylene/methacrylic acid copolymers, and ethylene/vinyl acetate copolymers, ionomers, co-polyesters (e.g. PETG).

The optional gas barrier layer preferably comprises oxygen impermeable resins like PVDC, EVOH, polyamides and blends of EVOH and polyamides. The outer heat-resistant layer may be made of ethylene homo- or copolymers, ethylene/cyclic-olefin copolymers, such as ethylene or norbornene copolymers, propylene homo- or co-polymers, ionomers, (co)polyesters, (co)polyamides.

The film may also comprise other layers such as adhesive layers or bulk layers to increase the thickness of the film and improve its properties regarding resistance and deep drawing. In particular, ionomers, ethylene/vinyl acetate copolymers, polyamides and polyesters are used in bulk layers. In all layers of the film, the polymer components may contain appropriate amounts of additives normally included in such compositions. Some of these additives are preferably included in the outer layers or in one of the outer layers, while some others are preferably added to inner layers. These additives include slip and anti-block agents such as talc, waxes, silica, and the like, antioxidants, stabilizers, plasticizers, fillers, pigments and dyes, cross-linking inhibitors, cross-linking enhancers, UV absorbers, odor absorbers, oxygen scavengers, bactericides, antistatic agents and the like additives known to those skilled in the art of packaging films.

One or more layers of the film can be cross-linked to improve the strength of the film and/or its heat resistance. Cross-linking may be achieved by using chemical additives or by subjecting the film layers to an energetic radiation treatment. The films for skin packaging are typically manufactured in order to show low shrink when heated during the packaging cycle. Those films usually shrink less than 15% at 160° C., more frequently lower than 10%, even more frequently lower than 8% in both the longitudinal and transversal direction (ASTM D2732). The films usually have a thickness comprised between 20 microns and 200 microns, more frequently between 40 and 180 microns, and even more frequently between 50 microns and 150 microns.

The skin packages are usually "easy-to-open", i.e. they are easily openable by manually pulling apart the two webs, normally starting from a point like a corner of the package where the upper web has purposely not been sealed to the support. To achieve this feature, either the film or the tray can be provided with a suitable composition, allowing easy opening of the package as known in the art. Typically, the sealant composition and/or the composition of the adjacent layer of the tray and/or the film are adjusted in order to achieve the easy opening feature.

Various mechanisms can occur while opening an easy-to-open package.

In the first one ("peelable easy opening"), the package is opened by separating the film and the tray at the seal interface.

In the second mechanism ("adhesive failure") the opening of the package is achieved through an initial breakage through the thickness of one of the sealing layers followed by delamination of this layer from the underlying support or film.

The third system is based on the "cohesive failure" mechanism. The easy opening feature is achieved by internal rupture of a seal layer that, during opening of the package, breaks along a plane parallel to the layer itself.

Specific blends are known in the art to obtain such opening mechanisms, ensure the peeling of the film from the tray surface, such as those described in EP1084186.

On the other hand, in case the film 10a is used for creating a lid on the tray or support 4, the film material may be obtained by co-extrusion or lamination processes. Lid films may have a symmetrical or asymmetrical structure and can be of a single layer or multi layer type.

The multilayer films have at least 2, more frequently at least 5, and even more frequently at least 7 layers.

The total thickness of the film may vary from 3 to 100 micron, more frequently from 5 to 50 micron, even more frequently from 10 to 30 micron.

The films may optionally be cross-linked. Cross-linking may be carried out by irradiation with high energy electrons at a suitable dosage level as known in the art. The lid films described above may be heat shrinkable or heat-set. The heat shrinkable films typically show a free shrink value measured at 120° C. according to ASTM D2732 in the range of from 2 to 80%, more frequently from 5 to 60%, even more frequently from 10 to 40% in both the longitudinal and the transverse direction. The heat-set films usually have free shrink values lower than 10% at 120° C., preferably lower than 5% in both the longitudinal and transversal direction (ASTM D 2732).

Lid films usually comprise at least a heat sealable layer and an outer skin layer, which is generally made up of heat resistant polymers or polyolefin. The sealing layer typically comprises a heat-sealable polyolefin which in turn comprises a single polyolefin or a blend of two or more polyolefins such as polyethylene or polypropylene or a blend thereof. The sealing layer can be further provided with anti-fogging properties by incorporating one or more anti-fogging additives into its composition or by coating or spraying one or more anti-fogging additives onto the surface of the sealing layer by technical means known in the art.

The sealing layer may further comprise one or more plasticizers. The skin layer may comprises polyesters, polyamides or polyolefin. In some structures, a blend of polyamide and polyester can advantageously be used for the skin layer. In some cases, the lid films comprise a barrier layer. Barrier films typically have an OTR (evaluated at 23° C. and 0% R.H. according to ASTM D-3985) below 100 cm$^3$/(m$^2$·day·atm) and more frequently below 80 cm$^3$/(m$^2$·day·atm). The barrier layer is usually made of a thermoplastic resin selected among a saponified or hydrolyzed product of ethylene-vinyl acetate copolymer (EVOH), an amorphous polyamide and a vinyl-vinylidene chloride and their admixtures. Some materials comprise an EVOH barrier layer, sandwiched between two polyamide layers. The skin layer typically comprises polyesters, polyamides or polyolefin.

In some packaging applications, the lid films do not comprise any barrier layer. Such films usually comprise one or more polyolefin herein defined. Non-barrier films typically have an OTR (evaluated at 23° C. and 0% R.H. according to ASTM D-3985) from 100 cm$^3$/(m$^2$·day·atm) up to 10000 cm$^3$/(m$^2$·day·atm), more typically up to 6000 cm$^3$/(m$^2$·day·atm).

Peculiar polyester-based compositions are those used for tray lidding of ready-to-eat meal packages. For these films, the polyester resins can make up at least 50%, 60%, 70%, 80%, or 90% by weight of the film. These films are typically used in combination with polyester-based supports.

For example, the container can be made of a cardboard coated with a polyester resin or it can be integrally made of a polyester resin. Examples of suitable containers for the package are CPET, APET or APET/CPET containers, either foamed or not foamed.

Usually, biaxially oriented PET is used as the lid film due to its high thermal stability at standard food heating/cooking temperatures. Often biaxially oriented polyester films are heat-set, i.e. non-heat-shrinkable. To improve the heat-sealability of the PET lidding film to the container a heat-sealable layer of a material with a lower melting point is usually provided on the film. The heat-sealable layer may be coextruded with the PET base layer (as disclosed in EP-A-1529797 and WO2007/093495) or it may be solvent- or extrusion-coated over the base film (as disclosed in U.S. Pat. No. 2,762,720 and EP-A-1252008).

Particularly in the case of fresh meat packages, twin lidding film comprising an inner, oxygen-permeable, and an outer, oxygen-impermeable, lidding film are advantageously used. The combination of these two films significantly prevents the meat discoloration also when the packaged meat extends upwardly with respect to the height of the tray walls, which is the most critical situation in barrier packaging of fresh meat. These films are described for example in EP1848635 and EP0690012, the disclosures of which are incorporated herein by reference. In some examples, twin lidding film can be made by sealing two suitable films in the region of the corners by means of very small bonding or sealing points. In this manner, the twin lidding film can be handled more easily in the different stages of the packaging process.

The lid film can be monolayer. Typical composition of monolayer films comprise polyesters as herein defined and their blends, or polyolefins as herein defined and their blends.

In all the film layers described herein, the polymer components may contain appropriate amounts of additives normally included in such compositions. Some of these additives are preferably included in the outer layers or in one of the outer layers, while some others are preferably added to inner layers. These additives include slip and anti-block agents such as talc, waxes, silica, and the like, antioxidants, stabilizers, plasticizers, fillers, pigments and dyes, cross-linking inhibitors, cross-linking enhancers, UV absorbers, odor absorbers, oxygen scavengers, bactericides, antistatic agents, anti-fogging agents or compositions, and the like additives known to those skilled in the art of packaging films.

The films suitable for lidding applications can advantageously be perforated, in order to allow the packaged food to breath.

Those films may be perforated by using different technologies available in the art, through laser or mechanical means such as rolls provided with several needles.

The number of perforations per unit area of the film and their dimensions affect the gas permeability of the film.

Micro perforated films are usually characterized by OTR value (evaluated at 23° C. and 0% R.H. according to ASTM D-3985) from 2500 cm$^3$/(m$^2$·day·atm) up to 1000000 cm$^3$/(m$^2$·day·atm).

Macro perforated films are usually characterized by OTR (evaluated at 23° C. and 0% R.H. according to ASTM D-3985) higher than 1000000 cm$^3$/(m$^2$·day·atm).

Furthermore, the films herein described for lidding applications can be formulated to provide strong or peelable sealing onto the support. A method of measuring the force of a peelable seal, herein referred to as "peel force" is described in ASTM F-88-00. Acceptable peel force values fare in the range from 100 g/25 mm to 850 g/25 mm, from 150 g/25 mm to 800 g/25 mm, from 200 g/25 mm to 700 g/25 mm.

The desired seal strength is achieved specifically designing the tray and the lid formulations.

In general, one or more layers of the lid film can be printed, in order to provide useful information to the consumer, a pleasing image and/or trademark or other advertising information to enhance the retail sale of the packaged product. The film may be printed by any suitable method, such as rotary screen, gravure or flexographic techniques as known in the art.

Definitions and Conventions Concerning Materials

PVDC is any vinylidene chloride copolymers wherein a major amount of the copolymer comprises vinylidene chloride and a minor amount of the copolymer comprises one or more unsaturated monomers copolymerizable therewith, typically vinyl chloride, and alkyl acrylates or methacrylates (e.g. methyl acrylate or methacrylate) and the blends thereof in different proportions. Generally a PVDC barrier layer will contain plasticizers and/or stabilizers as known in the art.

As used herein, the term EVOH includes saponified or hydrolyzed ethylene-vinyl acetate copolymers, and refers to ethylene/vinyl alcohol copolymers having an ethylene co-monomer content preferably comprised from about 28 to about 48 mol %, more preferably, from about 32 to about 44 mol % ethylene, and even more preferably, and a saponification degree of at least 85%, preferably at least 90%.

The term "polyamides" as used herein is intended to refer to both homo- and co- or ter-polyamides. This term specifically includes aliphatic polyamides or co-polyamides, e.g., polyamide 6, polyamide 11, polyamide 12, polyamide 66, polyamide 69, polyamide 610, polyamide 612, copolyamide 6/9, copolyamide 6/10, copolyamide 6/12, copolyamide 6/66, copolyamide 6/69, aromatic and partially aromatic polyamides or co-polyamides, such as polyamide 6I, polyamide 6I/6T, polyamide MXD6, polyamide MXD6/MXDI, and blends thereof.

As used herein, the term "copolymer" refers to a polymer derived from two or more types of monomers, and includes terpolymers. Ethylene homopolymers include high density polyethylene (HDPE) and low density polyethylene (LDPE). Ethylene copolymers include ethylene/alpha-olefin copolymers and ethylene/unsaturated ester copolymers. Ethylene/alpha-olefin copolymers generally include copolymers of ethylene and one or more co-monomers selected from alpha-olefins having from 3 to 20 carbon atoms, such as 1-butene, 1-pentene, 1-hexene, 1-octene, 4-methyl-1-pentene and the like.

Ethylene/alpha-olefin copolymers generally have a density in the range of from about 0.86 to about 0.94 g/cm3. The term linear low density polyethylene (LLDPE) is generally understood to include that group of ethylene/alpha-olefin copolymers which fall into the density range of about 0.915 to about 0.94 g/cm$^3$ and particularly about 0.915 to about 0.925 g/cm$^3$. Sometimes linear polyethylene in the density range from about 0.926 to about 0.94 g/cm$^3$ is referred to as linear medium density polyethylene (LMDPE). Lower density ethylene/alpha-olefin copolymers may be referred to as very low density polyethylene (VLDPE) and ultra-low density polyethylene (ULDPE). Ethylene/alpha-olefin copolymers may be obtained by either heterogeneous or homogeneous polymerization processes.

Another suitable ethylene copolymer is an ethylene/unsaturated ester copolymer, which is the copolymer of ethylene and one or more unsaturated ester monomers. Suitable unsaturated esters include vinyl esters of aliphatic carboxylic acids, where the esters have from 4 to 12 carbon atoms, such as vinyl acetate, and alkyl esters of acrylic or methacrylic acid, where the esters have from 4 to 12 carbon atoms.

Ionomers are copolymers of an ethylene and an unsaturated monocarboxylic acid having the carboxylic acid neutralized by a metal ion, such as zinc or, preferably, sodium.

Useful propylene copolymers include propylene/ethylene copolymers, which are copolymers of propylene and ethylene having a majority weight percent content of propylene, and propylene/ethylene/butene terpolymers, which are copolymers of propylene, ethylene and 1-butene.

As used herein, the term "polyolefin" refers to any polymerized olefin, which can be linear, branched, cyclic, aliphatic, aromatic, substituted, or unsubstituted. More specifically, included in the term polyolefin are homo-polymers of olefin, co-polymers of olefin, co-polymers of an olefin and an non-olefinic co-monomer co-polymerizable with the olefin, such as vinyl monomers, modified polymers thereof, and the like. Specific examples include polyethylene homo-polymer, polypropylene homo-polymer, polybutene homo-polymer, ethylene-alpha-olefin co-polymer, propylene-alpha-olefin co-polymer, butene-alpha-olefin co-polymer, ethylene-unsaturated ester co-polymer, ethylene-unsaturated acid co-polymer, (e.g. ethylene-ethyl acrylate co-polymer, ethylene-butyl acrylate co-polymer, ethylene-methyl acrylate co-polymer, ethylene-acrylic acid co-polymer, and ethylene-methacrylic acid co-polymer), ethylene-vinyl acetate copolymer, ionomer resin, polymethylpentene, etc.

The term "polyester" is used herein to refer to both homo- and co-polyesters, wherein homo-polyesters are defined as polymers obtained from the condensation of one dicarboxylic acid with one diol and co-polyesters are defined as polymers obtained from the condensation of one or more dicarboxylic acids with one or more diols. Suitable polyester resins are, for example, polyesters of ethylene glycol and terephthalic acid, i.e. poly(ethylene terephthalate) (PET). Preference is given to polyesters that contain ethylene units and include, based on the dicarboxylate units, at least 90 mol %, more preferably at least 95 mol %, of terephthalate units. The remaining monomer units are selected from other dicarboxylic acids or diols. Suitable other aromatic dicarboxylic acids are preferably isophthalic acid, phthalic acid, 2,5-, 2,6- or 2,7-naphthalenedicarboxylic acid. Of the cycloaliphatic dicarboxylic acids, mention should be made of cyclohexanedicarboxylic acids (in particular cyclohexane-1,4-dicarboxylic acid). Of the aliphatic dicarboxylic acids, the ($C_3$-$Ci_9$)alkanedioic acids are particularly suitable, in particular succinic acid, sebacic acid, adipic acid, azelaic acid, suberic acid or pimelic acid. Suitable diols are, for example aliphatic diols such as ethylene glycol, diethylene glycol, triethylene glycol, propylene glycol, 1,3-butane diol, 1,4-butane diol, 1,5-pentane diol, 2,2-dimethyl-1,3-propane diol, neopentyl glycol and 1,6-hexane diol, and cycloaliphatic diols such as 1,4-cyclohexanedimethanol and 1,4-cyclohexane diol, optionally heteroatom-containing diols having one or more rings.

Co-polyester resins derived from one or more dicarboxylic acid(s) or their lower alkyl (up to 14 carbon atoms) diesters with one or more glycol(s), particularly an aliphatic or cycloaliphatic glycol may also be used as the polyester resins for the base film. Suitable dicarboxylic acids include aromatic dicarboxylic acids such as terephthalic acid, isophthalic acid, phthalic acid, or 2,5-, 2,6- or 2,7-naphthalenedicarboxylic acid, and aliphatic dicarboxylic acids such as succinic acid, sebacic acid, adipic acid, azelaic acid, suberic acid or pimelic acid. Suitable glycol(s) include aliphatic diols such as ethylene glycol, diethylene glycol, triethylene glycol, propylene glycol, 1,3-butane diol, 1,4-butane diol, 1,5-pentane diol, 2,2-dimethyl-1,3-propane diol, neopentyl glycol and 1,6-hexane diol, and cycloaliphatic diols such as 1,4-cyclohexanedimethanol and 1,4-cyclohexane diol. Examples of such copolyesters are (i) copolyesters of azelaic acid and terephthalic acid with an aliphatic glycol, preferably ethylene glycol; (ii) copolyesters of adipic acid and terephthalic acid with an aliphatic glycol, preferably ethylene glycol; and (iii) copolyesters of sebacic acid and terephthalic acid with an aliphatic glycol, preferably butylene glycol; (iv) co-polyesters of ethylene glycol, terephthalic acid and isophthalic acid. Suitable amorphous co-polyesters are those derived from an aliphatic diol and a cycloaliphatic diol with one or more, dicarboxylic acid(s), preferably an aromatic dicarboxylic acid. Typical amorphous copolyesters include co-polyesters of terephthalic acid with an aliphatic diol and a cycloaliphatic diol, especially ethylene glycol and 1,4-cyclohexanedimethanol.

DETAILED DESCRIPTION

First Embodiment of the Apparatus 1

FIGS. 1-11 show an apparatus 1 for packaging of a product P arranged on a support or tray 4 according to an embodiment of the present invention. The apparatus 1 is adapted for modified atmosphere packaging, where a plastic film, such as film sheet 18 described below, is applied to the top rim 4c of a support or tray 4 after a modified gas atmosphere has been created inside the support 4, and/or for vacuum skin packaging of the product P, where a thin film of plastic material, such as film sheet 18 described below, is draped down on the product and intimately adheres to a top rim and to the inner surface of the support as well as to the product surface thus leaving a minimum, if any, amount of air or modified gas within the packaging. The apparatus 1 may also be used in case a film sheet applied to a tray or support and neither vacuum nor modified atmosphere is created.

The apparatus 1 comprises a frame 2, a transport assembly 3 for displacing the support or tray 4, a film supplying assembly 5, a film cutting assembly 6, a transfer device 7 and a packaging assembly 8.

The tray 4 shown in the enclosed figures presents a base wall 4a, a side wall 4b emerging from the base wall and delimiting a space where a product P can be housed, and a top rim 4c radially protruding from the side wall 4b: in the example shown the top rim 4c has a horizontal flat portion defining a suitable sealing surface for sealed fixing of a plastic film.

The frame 2 defines a base body of the apparatus 1 and serves to carry and support various parts of the apparatus 1 as herein described.

The transport assembly 3 comprises a displacement plane 20 (which may be a physical plane (e.g. a conveyor belt) carrying and displacing the trays or supports or an ideal plane along which the trays are guided e.g. by means of rails or guides). The plane 20 is defined on a top area of the frame and a conveyor 46 is arranged in correspondence of the sliding plane 20. In the example shown, the transport assembly 3 is carried by, e.g. fixed to, the frame 2 so that the sliding plane 20 is substantially horizontal and the conveyor 46 moves the trays or supports 4 according to the horizontal direction indicated by the arrow A1 shown in FIG. 1. The transport assembly 3 arranged on the frame 2 is configured for displacing the support or tray 4 along a predefined path from a loading station, where supports or trays 4 which may already be filled with the respective product(s) P are positioned, to the packaging assembly 8 where a film sheet 18 is tightly fixed to each support or tray 4, as explained in detail below. The conveyor 46 displaces the trays (e.g. a prefixed number of trays each time) towards and into the packaging chamber, into proper position for receiving the cut film sheets. For example, a control unit 100 (which is further described below) may control the conveyor 46 to displace a prefixed number of trays or supports 4 each time from a region outside the packaging assembly, to a region within the packaging assembly where the tray or trays are in vertical alignment with the film sheets (e.g. directly below or in superimposition therewith). The conveyor may, for example, include a first transfer device 46a (such as the belt shown in FIG. 1) configured for bringing the trays in close proximity to the packaging assembly and a second transfer device 46b adapted to pick up one or more of said trays and to bring them into the packaging assembly 8. The second transfer device may, for example, include actuators or arms acting on the sides of the trays or supports such as to pick up the supports from the first transfer device, to bring them into the packaging station, and then to return to the first transfer devise to pick up a new set of trays or supports 4. Alternatively, the conveyor 46 may include pushers (e.g. in the form of bars extending transverse to said direction A1) acting on the trays and pushing the trays into the packaging assembly 8. The pushers may be moved by chains or belts and may be moved into the packaging assembly to properly position a number of trays, and then be retracted from the packaging assembly, once the trays have reached their proper position inside the packaging assembly. In some examples, the pushers can be integrated into the packaging assembly in a manner not interfering with the process taking place inside the packaging assembly. In these examples, the pushers are extended in order to retrieve a number of trays and move them into the packaging assembly, into which the pushers are fully retracted and where they subsequently remain until opening of the packaging assembly following the execution of the process taking place inside the packaging assembly. According to a further alternative, the conveyor 46 may include housings (e.g. in the form of plates provided with cavities for receiving a number of trays) which are moved along said direction A1 and which are moving inside the packaging station together with the supports or trays 4. According to this alternative, the housings have a suitable shape in order to be hosted inside the packaging station during the application of the film 10a to the tray or support 4.

It is noted that the products P may be positioned on the support or tray 4 either upstream from the loading station or in any location between the loading station and the packaging assembly 8. The transport assembly 3 further comprises a motor 9 (e.g. a stepping motor unit) for operating the conveyor belt 46 with a continuous or step-by-step movement.

The film supply assembly 5 may comprise a film roll 10 supplying a continuous film 10a. The film supplying assembly 5 may further comprise an arm 11 (represented in dashed lines in FIG. 1) fixed to the frame 2 and suitable for supporting the roll 10. Further, the film supplying assembly 5 may comprise film punching devices (not shown, as these are known in the art) essentially configured to provide the correct profile to the film edges to match (when transversally cut in the cutting assembly 6) the shape of the tray 4 opening having rounded corners. The punching devices may also help to keep an unrolled portion of film pulled from the film roll 10 aligned according to a prefixed direction. The film supplying assembly 5 also comprises pinch rollers 12 and/or other means for pulling the film from the roll 10 and properly position it in correspondence of the film cutting assembly 6 (e.g., said means may comprise pincers acting on the side of the film and/or pincers acting on an edge of the film (e.g. the front edge or side edges) and configured to pull the film).

The type of film 10a rolled up on the film roll 10 and supplied to the apparatus 1 may correspond to one of the types of film described above, depending upon the specific application.

The film cutting assembly 6 shown in the figures is an exemplary cutting assembly illustrating one of several alternatives for supplying the film sheets 18. Generally, the film sheets 18 could be pre-cut at another location and provided in the form of stacks of film sheets 18 ready for heat sealing. Further, the film sheets 18 can be cut locally, for example by a cutting assembly (such as cutting assembly 6) located external to the packaging chamber. In both cases, the film sheets 18, either pre-cut or cut online, are either supplied to the packaging apparatus 1 by a corresponding transfer device picking up film sheets 18 and transferring them into the packaging chamber 24 or some component of the packaging apparatus (for example a holding plate such as holding plate 36) is actuated to be moved into a pick-up position where the component can pick up a single film sheet 18 and to be retracted into an operating position within the packaging assembly or packaging chamber, in order to properly position the film sheet 18 for being heat sealed to a support 4. As a further alternative, the cutting assembly may be located inside the packaging assembly such that the film sheets 18 are cut on the fly and picked up by a component (e.g. a sealing head or a holding plate) directly within the packaging assembly or packaging chamber, such that the film sheets 18 need not be transferred into the packaging assembly or packaging chamber (in which case no separate transfer device is necessary). It is noted that the individual manner in which the film sheets 18 are supplied can be realized in accordance with any one of the above-described mechanisms or any other suitable method.

The film cutting assembly 6 comprises a cutting device 13 with a blade 14 and a blade piston 15. This piston 15 may be replaced by any other kind of electric, pneumatic, or hydraulic (linear) actuator. The blade piston 15 is preferably fixed to the frame 2 and is connected to the cutting device 13 so as to push and pull it in a direction transverse to the unrolled portion of the film 10a, as indicated by the double arrow A2 shown in FIG. 1. The film cutting assembly 6 is described here, illustrating one possibility of supplying the film to the packaging apparatus. In some examples, however, the film material can be supplied in a manner where the film is pre-cut and supplied, for example, on a sheet by sheet basis, delivered from a stack of pre-cut film sheets.

FIGS. 2 to 11 show a more detailed view of the transfer device 7 and the packaging assembly 8 of the packaging apparatus 1 according to a first embodiment.

Generally, the packaging assembly 8 is configured for tightly fixing the film sheets 18 to said supports 4 and includes a lower tool 22 and an upper tool 21. The lower tool 22 has a number of inner walls 23 defining a prefixed number of seats 23b. In one embodiment the lower tool 22 is provided with multiple seats 23b each for hosting a corresponding support 4. In this case the upper tool 21 is provided with a corresponding plurality of holding plates 36 each for holding a respective film sheet 18.

Each of seats 23b is configured for receiving one support 4. For example, in the embodiment of FIGS. 2-11 the seat 23b is peripherally delimited by inner wall 23 and the support or tray 4 is received within the seat 23b such that the top rim 4c may rest above the end surface 23a of the inner wall 23. The upper tool 21 faces the lower tool 22 and is configured for holding one or more of said film sheets 18: in the example shown in FIGS. 2-11 the upper tool 21 is configured for holding one cut film sheet 18. As shown in FIGS. 2-11 the upper and lower tools 21, 22 cooperate to define a packaging chamber 24. In a first operating condition of the packaging assembly 8—shown in FIGS. 2-6 and 11—the upper and lower tools 21 and 22 are space apart and the packaging chamber 24 is open thereby allowing one or more of said film sheets 18 to move from the cutting assembly 6 into the packaging chamber 24, as further detailed below. In a second operating condition of the packaging assembly 8—shown in FIGS. 7-10 the packaging chamber 24 is hermetically closed with respect to an atmosphere outside the apparatus 1.

It is noted that within the scope of this document the term "hermetically closed" denotes that the inside of the packaging chamber 24 cannot freely communicate with the atmosphere outside the chamber and gas may be supplied or withdrawn from the chamber only via supply or discharge channels under the control of the apparatus 1. The above-mentioned transfer device 7 is configured for positioning the cut film sheets 18 inside the packaging chamber 24 and above the respective support 4. The transfer device 7 includes a backing structure 16 having a flat holding surface 17 adapted for receiving the at least one or more film sheets 18 cut by blade 14. While backing structure 16 is described here and shown in the figures as having a substantially flat holding surface 17, it is noted that the holding surface 17 does not have to be flat, but can have any suitable shape (e.g., concave, convex, corrugated, having some texture, having protrusions and/or recesses, etc.). FIG. 1 shows that the blade 14 is configured to cut the continuous film 10a such that a separate film sheet 18 can be positioned in correspondence of the flat holding surface 17. The backing structure 16 may hold the cut film sheet 18 using one or more of:

- a vacuum system connected to one or more channels present in the backing structure and leading to apertures located one holding surface 17,
- mechanical holders, such as pincers, clamps or the like,
- adhesive systems, for example comprising adhesive portions associated to the holding surface 17,
- heating systems, for example comprising heatable portions (controlled by control unit 100) associated to the backing structure causing heating of the holding surface 16 and thus of the film sheet 18 in order to increase stickiness of the film sheet to the holding surface 17,
- electric systems, for example the holding surface may be charged with a polarity different from that typical of the plastic sheet 18. In this case the control unit may be connected to a voltage generator and may control the electric charging of surface 17.

In the embodiments shown in FIGS. 2 to 17, the backing structure 16 is shown as employing a vacuum system that is configured to create negative pressure on the side of the flat holding surface 17 by evacuation of air or gas through channels 16a (shown in FIG. 2) present in the backing structure 16, the channels 16a defining apertures located in the flat holding surface 17. Again, while backing structure 16 and holding surface 17 are described here and shown in the figures as being substantially flat, it is noted that the respective elements could have any suitable non-flat shape (e.g., concave, convex, with some texture, having protrusions and/or recesses, etc.). The channels 16a, schematically shown in FIGS. 2 to 17, and/or the corresponding apertures can be arranged, sized and/or shaped in a manner suitable for the intended application and depending on the material or type of film 10 used. For example, the size, shape, and number, as well as the individual distribution of the channels 16a over the area of the backing structure 16 can be adapted as desired. For thicker, stronger, and/or heavier film materials, for example, the channels 16a and/or corresponding apertures can have a larger size (e.g. a larger diameter) and/or be distributed more densely, while for thinner, weaker, and/or lighter film materials, the channels 16a and/or corresponding apertures can have a smaller size (e.g. a smaller diameter) and/or be distributed more sparsely.

The channels 16a are in fluid communication with a suitable vacuum source or evacuation means (not shown) as known in the art. In addition to the type and distribution of channels and/or apertures, the vacuum source or evacuation means can be controlled in a manner suitable for the individual film materials used, in a manner known in the art. For clarity, individual additional components known in the art, for example, the vacuum source or evacuation means, manifolds, connecting channels, lines, valves, etc. are not shown in all figures.

Figure 2:
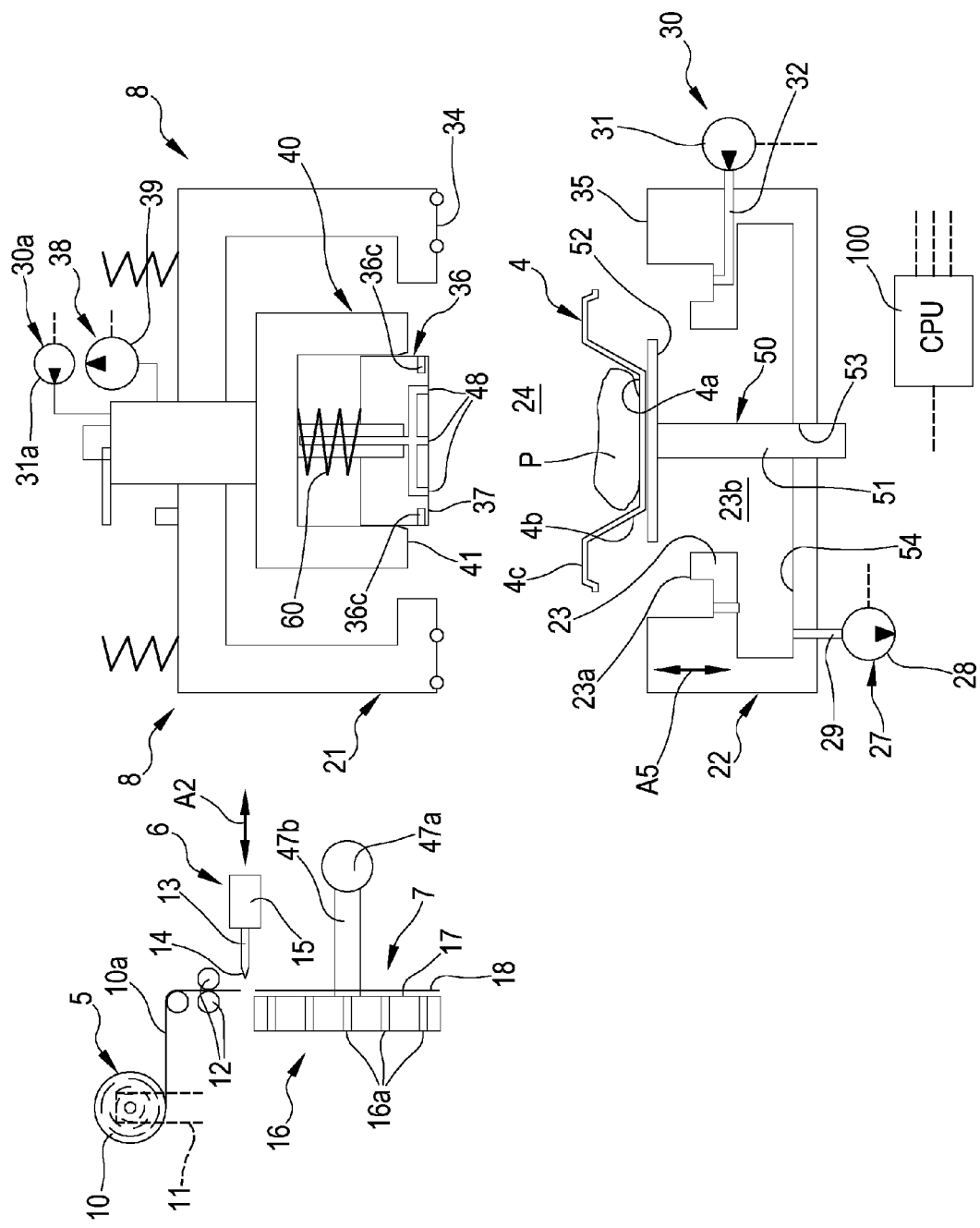
FIGS. 2-11 are schematic side views relating to a first embodiment of a packaging apparatus according to aspects of the invention. In these figures, consecutive phases of a packaging process operated by the apparatus of the first embodiment are shown. The apparatus and process according to these figures are intended for tray lidding.
Figure 3:
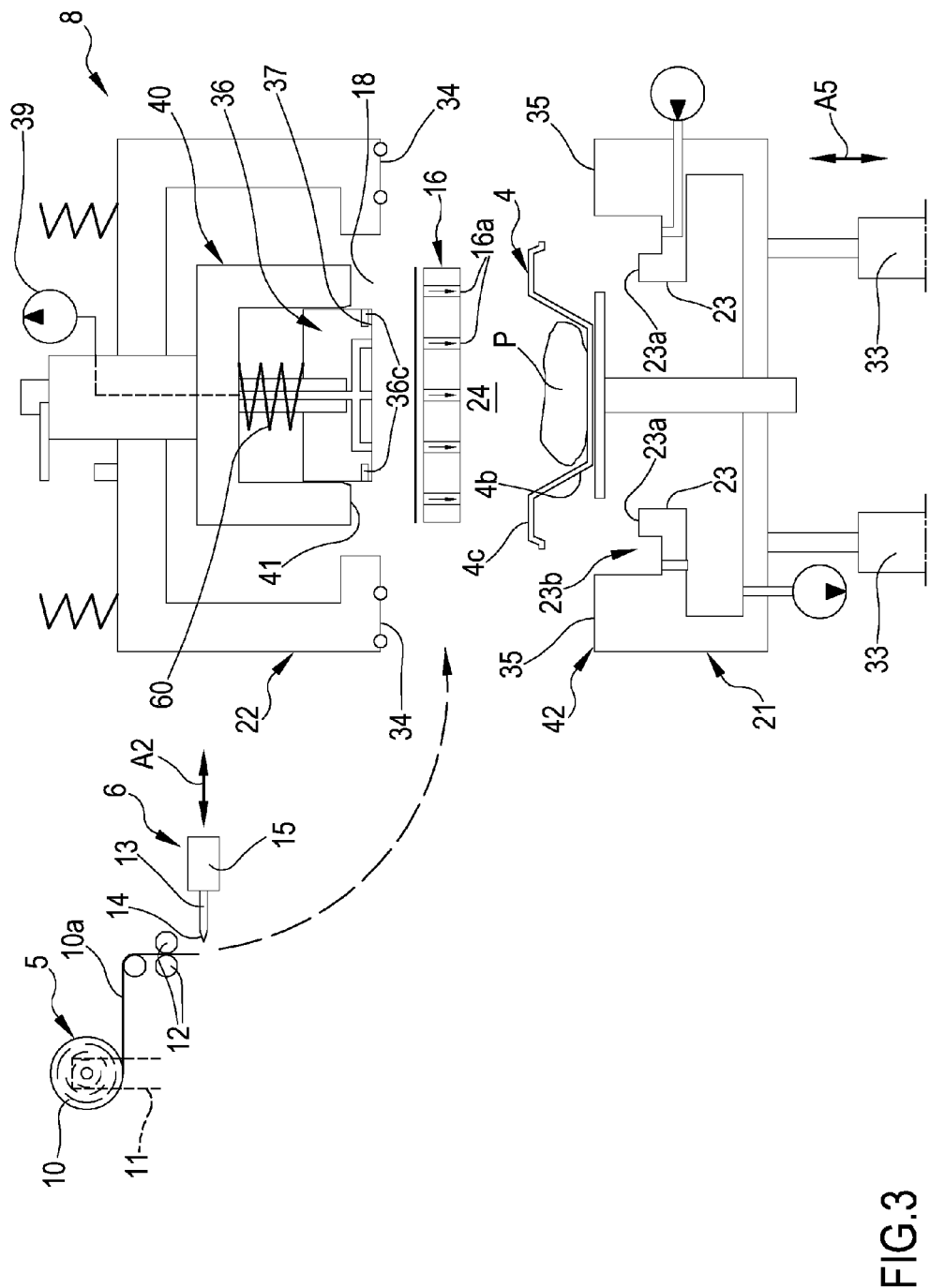

The transfer device 7 also includes a mechanism, for example carried by frame 2, active on the backing structure 16 and configured for relatively moving the backing structure 16 with respect to the packaging assembly 8 between a first position, shown in FIG. 2, where the baking structure 16 is positioned near the cutting device, for example immediately downstream the blade 14 with respect to the movement imposed to film 10a, and at least a second position, where the backing structure 16 is positioned inside the packaging chamber 24. In the examples shown in the enclosed figures, the mechanism includes a transfer actuator 47a active on the backing structure 16 via a lateral support 47b and configured for moving the backing structure 16 along a path suitable for achieving the displacement between said first and second positions. It is noted that, for clarity, the transfer actuator 47a and lateral support 47b are not shown to scale in the figures, but merely illustrate the possibility of a rotatory actuator, imparting movement to backing plate 17 between a pick-up position, where the backing plate can pick up film sheets 18, and a transfer position, where the backing plate can supply the film sheets 18 to the packaging assembly. For example, the mechanism and transfer actuator may displace and rotate the backing structure along a circular path as indicated by the dashed arrow in FIG. 3. The rotating range of the transfer actuator 47a is configured such that the backing structure is able to position at least one film sheet 18 above said support 4 inside the chamber 24, below and/or in superimposition with a central portion of the upper tool 21, as shown in FIG. 3. The transfer actuator 47a may be any kind of electric, pneumatic or hydraulic actuator known in the art and suitable for actuating the backing structure in the required manner. For clarity, the mechanism and/or transfer actuator 47a and lateral support 47b are not shown in all figures.

As an alternative, instead of moving the backing structure 16, the upper tool 21 may be mobile with respect to frame 2 and be configured to pick the cut film sheets 18 from the area immediately downstream the cutting device 13. In this case the transfer device 7 would include a mechanism 25, for example carried by frame 2, active on the packaging assembly 8 and configured for displacing the upper tool 21 between a first position, where the upper tool 21 is positioned in correspondence of the backing structure 16 and configured to pick up from the backing structure 16 the one or more cut film sheets 18, and at least a second position, where the upper tool 21 is aligned to the lower tool 22 and configured to position at least one film sheet 18 above said support 4. In order to achieve the above movement the mechanism may displace the upper tool 21 along any suitable path. For example, FIG. 1 schematically shows that the mechanism 25 may include a transfer actuator 26 configured for displacing the upper tool 21 along a direction parallel to said horizontal direction A1 as indicated by double arrow A4 in FIG. 1, as well as for rotating the upper tool 21 so that the lower end thereof faces the backing structure 16 in order to pick up the film sheets 18. Alternatively the mechanism 25 may exclusively cause rotation of the upper tool around a pivoting axis or a translational displacement in order to move the upper tool between the respective positions. The transfer actuator 26 may comprise any kind of electric, pneumatic or hydraulic actuators or combinations thereof known in the art. FIG. 1 illustrates both mechanisms described above.

The apparatus 1 also includes at least one control unit 100, which is connected to the transport assembly 3, to the film supplying assembly 5, to the film cutting assembly 6, to the transfer device 7 and to the packaging assembly 8. The control unit 100, which is schematically represented in FIG. 1, is configured for activating the transfer device 7 so as to control motion of the backing structure 16 (or of the upper tool 21, as described above), into the different operating positions described above. The control unit 100 is also configured for synchronizing activation of the transfer device 7 with passage of the packaging assembly 8 from the first to the second operating condition so that the movement of the backing structure 16 is caused to take place when the packaging chamber 24 is open while the packaging chamber 24 is closed only once the backing structure 16 has transferred the cut film sheet 18 to the upper tool 21 and has been retracted from the packaging chamber 24. The control unit may also be configured for synchronizing the conveyor 46 such that movement of a prefixed number of trays or supports 4 from a region outside the packaging chamber 24 to a region inside the packaging chamber 24 is caused to take place when the packaging chamber 24 is open while the packaging chamber 24 is closed only once said prefixed number of trays or supports 4 is in proper position relative to the upper tool 21.

The apparatus 1 may also comprise a vacuum arrangement 27 connected to the packaging chamber 24 and configured for removing gas from inside said packaging chamber. The vacuum arrangement comprises at least one vacuum pump 28 and at least one evacuation pipe 29 connecting the inside of said chamber 24 to the vacuum pump. The control unit 100 controls the vacuum pump 28 to withdraw gas from said packaging chamber 24 at least when the packaging assembly is in said second operating condition, i.e. with said packaging chamber hermetically closed.

The apparatus 1 may additionally or alternatively include a controlled atmosphere arrangement 30 connected to the packaging chamber 24 and configured for injecting a gas stream into said packaging chamber; the controlled atmosphere arrangement comprises at least one injection device including an injection pump and/or one injection valve 31 acting on at least one injection pipe 32 connecting the inside of said chamber to the a source of controlled gas (not shown) which may be arranged externally to the apparatus 1. The control unit 100 may be configured to control opening and closing of the injection valve (or activation of the injection pump) 31 to inject said stream of controlled gas at least when the packaging assembly 8 is in said second operating condition, i.e. with said packaging chamber 24 hermetically closed.

The control unit 100 may also be configured to control the composition of the modified atmosphere generated inside the chamber 24. For example, the control unit 100 may regulate the composition of the gas stream injected into the packaging chamber. The gas mixtures injected into the packaging chamber to generate a modified atmosphere may vary depending upon the nature of product P. In general, mixtures of a modified atmosphere include a volumetric quantity of one or more of $N_2$, $O_2$ and $CO_2$ different from the quantity of these same gases as present in the atmosphere at 20° C. and sea level (1 atmosphere pressure). If product P is a produce such as meat, poultry, fish, cheese, baked goods, or pasta, the following gas mixtures may be used (quantities are expressed in volume percentages at 20° C., 1 atm of pressure):

Red meat, poultry without skin: $O_2$=70%, $CO_2$=30%
Poultry with skin, cheese, pasta, baked goods: $CO_2$=50%, $N_2$=50%
Fish $CO_2$=70%, $N_2$=30% or $CO_2$=40%, $N_2$=30%, $O_2$%=30
Processed meat $CO_2$=30%, $N_2$=70%

According to one aspect the control unit 100 may be configured to control said injection pump or said injection valve 31 to start injecting said stream of controlled gas either after a prefixed delay from activation of said vacuum pump 28 or after a prefixed level of vacuum has been reached inside said packaging chamber 24. In a further aspect the control unit 100 may cause the start of the injection of said stream of controlled gas for creating a modified atmosphere while said vacuum pump 28 is still active so as to shorten the time for creating the modified atmosphere. It is noted, however, that high oxygen content in the gases evacuated and/or supplied or otherwise processed can entail a substantial risk of explosion in some of the components (e.g. the pump or pumps). Consequently, suitable components should be used. Moreover, as it is preferable to avoid having very strong vacuum in the packaging chamber 24 and at the same time it is desirable to ensure a proper atmosphere inside the chamber it is advantageous stopping the vacuum pump after opening the gas injection. In this way the pressure inside the packaging chamber can be controlled in order to not decrease below a desired value. During the simultaneous operation of the vacuum pump 28 and the injection of said stream of controlled gas, the gas injected is mixed with residual air and the vacuum pump 28 continues to remove the mixture so that the amount of gas and/or air initially present in the packaging chamber is continually decreased. This flushing of gas and mixing of the gas and residual air is very important in order to achieve the desired controlled atmosphere in an effective and efficient manner, while ensuring that the desired pressure (i.e. level of vacuum) is achieved.

According to a further aspect, it is noted that the control unit 100 is configured to control said injection pump 31 such that the gas flow is not injected at a speed that is too high and that may impair the firm holding of the cut film by the upper tool. The control unit 100 may control gas injection at a gas pressure set below a limit to prevent detachment of the film from the upper tool 21 or inaccurate positioning thereof in correspondence of the upper tool 21. In one example, the injection pressure is maintained between 1.3 and 4.0 bar, or preferably between 1.5 and 3.0 bar.

Note that in the examples shown, the evacuation pipe 29 and the injection pipe 32 communicate with a lower portion of the packaging chamber which is separated from an upper portion of the packaging chamber due to the presence of said inner wall or walls 23 which define a sort of separation septum. In order to allow proper circulation of gas within the entire packaging chamber the upper and lower portions of packaging chamber 8 are fluidly connected by apertures or channels located in proximity or at the inner wall 23. These apertures or channels (see e.g. FIGS. 3-5) are positioned such as not to be occluded by the tray walls when the tray is positioned in the seats 23b.

Although the apparatus 1 may have one or both the vacuum arrangement 27 and the controlled atmosphere arrangement 30, it is to be understood that the control unit 100 of the apparatus 1 may also be configured to tightly engage the film sheets 18 to the trays without activating the vacuum arrangement or the controlled atmosphere arrangement and thus leaving the normal environment atmosphere within the tray. This may be, for example, the case for non-perishable products. In another embodiment, the apparatus 1 may be designed without vacuum arrangement and without modified atmosphere arrangement.

Entering now into a more detailed description of the packaging assembly 8, it should be noted that this latter further comprises a main actuator 33 active on at least one of said upper and lower tool 21 and 22. In the example of FIGS. 2-11, the first actuator 33 is carried by frame 2 and acts onto the lower tool 22 under the control of control unit 100. The main actuator 33 may include a piston (the piston may be replaced by any other kind of electric, pneumatic, or hydraulic (linear) actuator) configured for lifting and lowering the lower tool 22 along a direction transverse to said horizontal direction A1. In the example of FIGS. 1-16 the lower tool can be vertically lifted and lowered by main actuator 33 as indicated by the double arrow A5 shown in FIG. 1. The control unit 100 is configured for controlling the main actuator 33 and for causing movement of lower tool 22, along the prefixed main direction indicated by arrow A5, between said first operating condition (FIGS. 2 to 6), where the upper tool 21 is spaced apart from the lower tool 22 and said packaging chamber 24 is open to receive one or more of said film sheets 18, and said second operating condition (FIGS. 7 to 10), where a closure surface 34 of the upper tool 21 tightly abuts against a closure surface 35 of the lower tool 22 to hermetically close said packaging chamber 24 with respect to an atmosphere outside the apparatus. A gasket or other element for facilitating a gas tight closure may be positioned at said closure surfaces 34 and 35. As mentioned above, the control unit synchronizes opening and closing of the packaging chamber with the movement of the backing structure 16.

Once the chamber 24 has been closed, and after operation of the vacuum and/or controlled atmosphere arrangement, the control unit is configured to act on main actuator 33 to impose a further vertical movement to the lower tool and thus also to the upper tool as this latter abuts now against the lower tool (FIG. 9) such that the film sheet 18 is brought into contact with the rim 4c of tray 4. Note that elastic elements 55 may be interposed between the upper tool and the frame (such as one or more compression springs and/or one or more pneumatic actuators) to elastically push the upper tool against the lower tool.

Also note that at each seat 23b operates at least one inner element 50, which in the apparatus of FIGS. 1-16 includes a stem 51 and a terminal plate 52, configured for supporting at least the base 4a the tray or support 4. The inner element is movable relative to the lower tool 22 at least along the main direction of double arrow A5 direction. In the embodiment shown (see e.g. FIG. 2) the stem 51 may slide through an opening 53 on the bottom 54 of the lower tool 22 in order to allow relative movement between said inner element 50 and lower tool 22. It is noted that the inner element may be controlled by a respective actuator (not shown) or it may be directly carried by frame 2. In the examples shown, in the case where the lower tool is movable up and down as described above, the inner element 50 may remain vertically fixed at least until the terminal plate reaches bottom 54 of the lower tool (see FIGS. 7-10), in which case the inner element 50 is configured to move further up together with and, optionally, actuated by the bottom 54 of the lower tool.

In further detail, the upper tool 21 has at least one holding plate 36 having a respective active surface 37 configured for receiving the one or more film sheets 18 and means 38 for holding the one or more film sheets 18 in correspondence of said active surface 37. The means 38 for holding may comprise a vacuum source 39, e.g. in the form of a pump, controlled by the control unit 100 and connected to a plurality of suction holes 48 present in correspondence of the active surface 37. The control unit 100 may be configured for activating the vacuum source 39 and causing the film holding plate 36 to receive and hold said one or more film sheets 18 in correspondence of the active surface 37. In particular, the control unit 100 may be configured for coordinating activation of vacuum source 39 with proper positioning of the cut film sheet 18 by the backing plate 16. For example, the control unit 100 may activate the vacuum source 39 and cause the film holding plate 36 to receive and hold said one or more film sheets 18 in correspondence of the active surface 37, when the backing structure 16 carrying the cut film 18 is properly positioned within the packaging chamber underneath the holding plate 36. Note that in addition or in alternative to vacuum source 39 the means for holding 38 may include one or more of the following:

mechanical holders, such as pincers, clamps or the like, adhesive systems, for example comprising adhesive portions associated to the active surface 37, heating systems, for example comprising heatable portions—controlled by control unit 100—associated to the holding plate for causing heating of the active surface 37 and thus of the film sheet 18 in order to increase stickiness of the film sheet to the active surface 37, electric systems, for example the active surface 37 may be charged with a polarity different from that typical of the plastic sheet 18. In this case the control unit may be connected to a voltage generator and may control the electric charging of surface 37.

Similar to the lower tool 22 and the controlled atmosphere arrangement 30, the upper tool 21 can comprise or be connected to a film positioning arrangement 30a, which comprises an injection device 31a similar to injection device 31 as described above. Injection device 31a is configured to selectively supply a stream of pressurized air or gas 31b (see, e.g., FIG. 6A) to holding plate 36 and is connected to a plurality of ejectors 36c present in holding plate 36 in a similar manner as vacuum source 39 is connected to suction holes 48, as described above. The supply of air or gas can be controlled through control unit 100, which can be configured to control, for example, a corresponding valve (or valves). Alternatively or in addition, control unit 100 can be configured to control activation of injection device 31a (e.g., starting, stopping, increasing or decreasing its activity, intermittent pulses, etc.). Injection device 31a is further connected to a suitable source of air or gas, as indicated by the dashed line in FIG. 2. For reasons of clarity, all the individual connections, channels, manifolds, and/or valves, etc. are not shown in FIG. 2. It is understood that such connections are known in the art and can be adapted to the respective purpose (e.g. supply of pressurized air/gas or of a vacuum).

As mentioned above, the holding plate 36 comprises a plurality of ejectors 36c arranged on the sides and/or corners of holding plate 36. FIG. 2, for example, shows a cross section view of holding plate 36 along a plane perpendicular to the plane of active surface 37 (see dashed line II in FIG. 6C). In the example shown in FIG. 2, ejectors 36c arranged on both lateral sides of holding plate 36, such that also a cross section of ejectors 36c is shown. It is understood that in this example, additional ejectors 36c are arranged also at the front and back sides of holding plate 36. Preferably, ejectors are placed along the edge region such that the ejectors 36c are arranged along the entire periphery of holding plate 36 and evenly spaced from one another (e.g. the ejectors are spaced at the same distances from one another around holding plate 36). In general, the side walls of holding plate 36 define a lateral surface thereof, which is substantially perpendicular to the active surface 37 of the holding plate 36. The holding plate 36 typically has, as viewed from the top (see, e.g., FIG. 6C) a generally rectangular shape, whereas the lateral surface delimits the perimeter of the holding plate 36 in all directions as it extends around the entire periphery of the holding plate 36.

Figure 6:
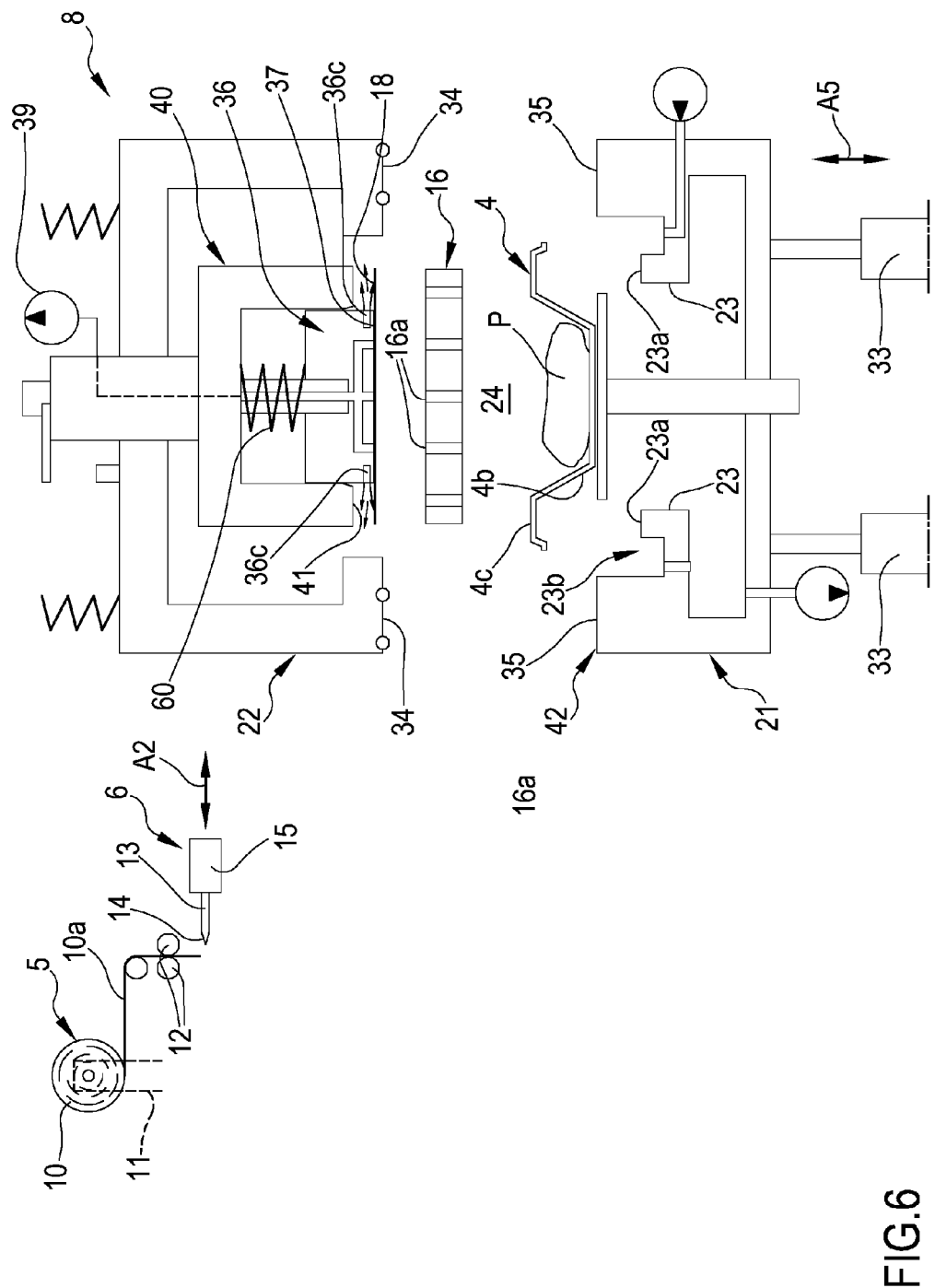
Figure 6A:
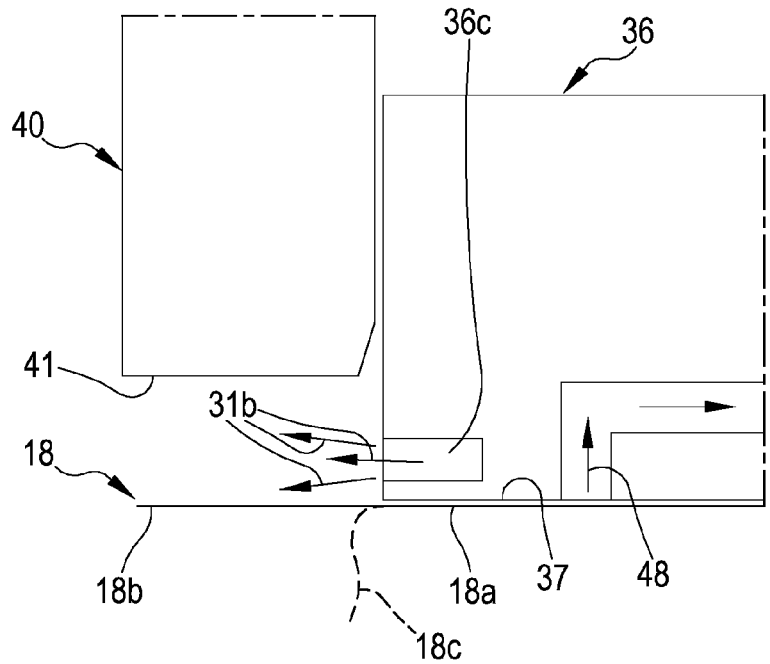
Figure 6B:
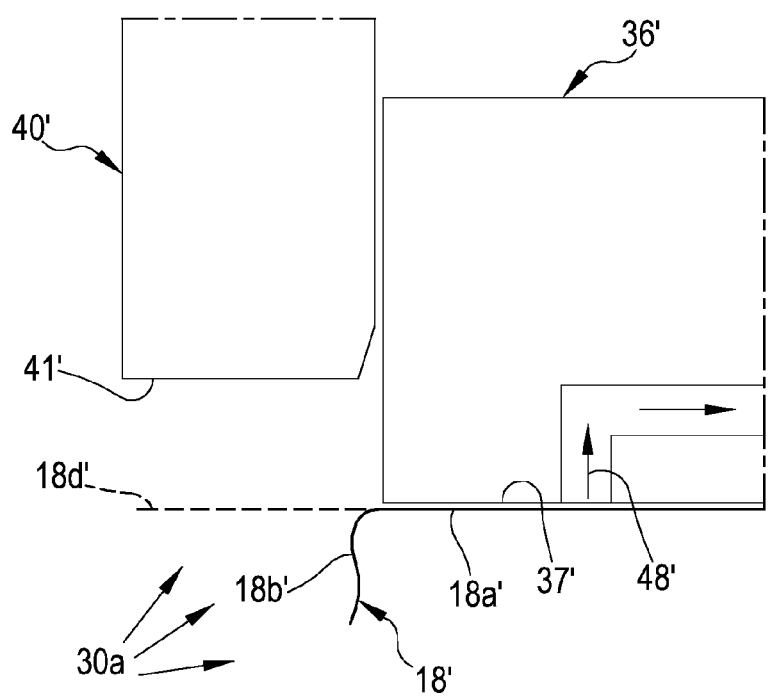
Figure 6C:
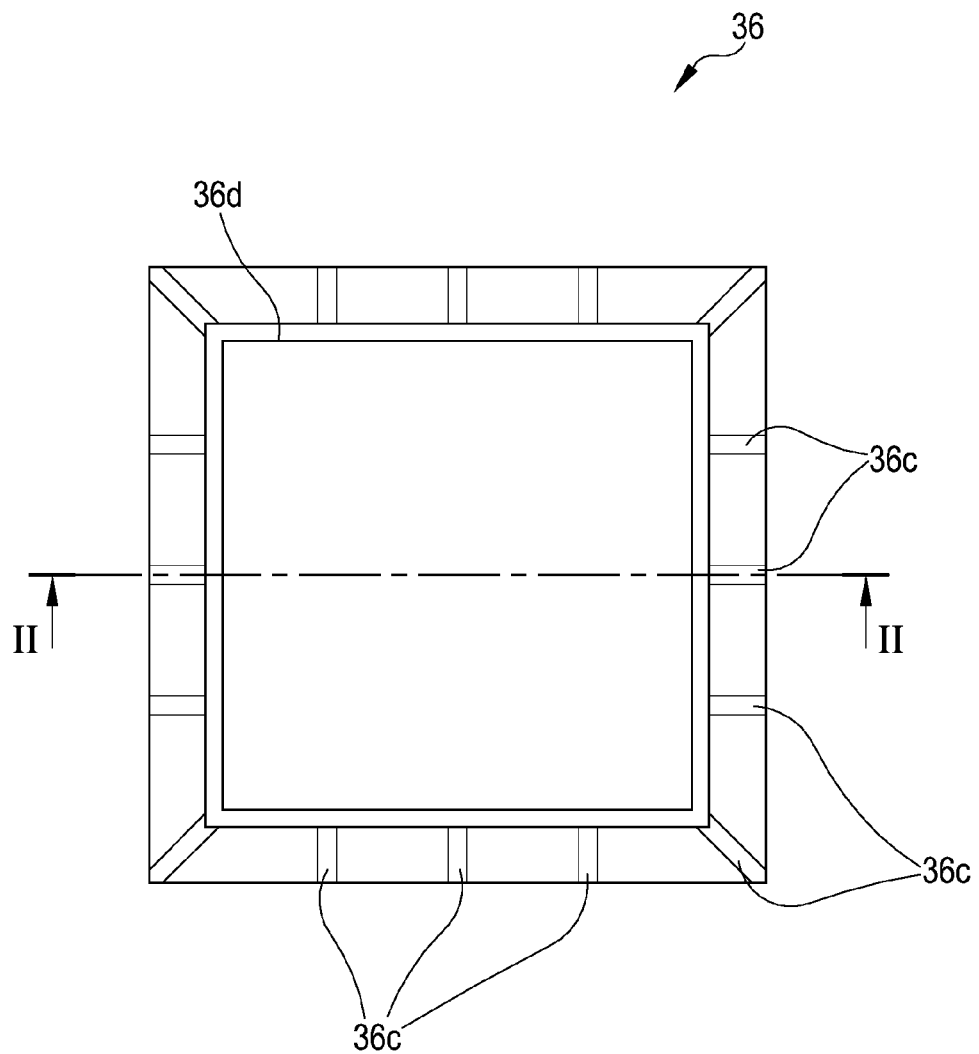

FIG. 6C shows a cross section view of an example arrangement of ejectors 36c in holding plate 36. Here, a cross section view along a plane parallel to active surface 37 is shown. In this example, ejectors 36c are substantially evenly spaced from one another, whereas one of the ejectors 36c is arranged at each of the corners of holding plate 36 and three ejectors 36c are arranged in each side of holding plate 36c, such that holding plate 36 has 16 ejectors in total. It is understood that, in general, holding plate 36 can comprise any number of ejectors depending on the individual application (e.g. depending on the material used for film sheet 18 or the dimensions and/or shape of holding plate 36). In some embodiments, the holding plate 36 can comprise 8, 12, 16, 20, or 24 ejectors. It is further understood that ejectors can be evenly arranged around holding plate 36 or in an uneven manner, where, for example, the distances between the ejectors 36c are different and/or where one side has more ejectors 36c than another side of holding plate 36. In some examples, the ejectors 36c are placed more concentrated in the corner regions of holding plate 36. Further, holding plate can have a rectangular cross section shape, rather than a substantially square shape, as shown in FIG. 6C. In such cases, the number of ejectors 36c arranged on the longer sides of holding plate 36 can be greater than the number of ejectors 36c arranged on the shorter sides of holding plate 36, irrespective of whether the ejectors 36c are arranged evenly spaced apart.

FIG. 6C further shows an example manifold arrangement comprising a channel 36d, peripherally extending around holding plate 36 and in fluid communication with ejectors 36c. Injection device 31a can be connected to channel 36d in any suitable manner such that the air or gas stream 31b can be supplied to ejectors 36c. The manifold arrangement 36d is preferably configured such that air or gas stream 31b can be supplied substantially evenly to the ejectors 36c arranged around holding plate 36.

Referring now to FIG. 6A, each ejector 36c is arranged and shaped such that it facilitates ejection of an air or gas stream 31b in a manner substantially parallel with respect to the plane of active surface 37 such that the air or gas stream 31b is configured to flow from holding plate 36 close to the plane defined by active surface 37 in a direction substantially parallel thereto, in particular having a main motion component substantially parallel to said plane. It is noted that the air or gas stream 31b has, upon exit from an ejector 36c, essentially an unlimited number of motion components, due to the turbulence occurring at and around the ejector 36c, irrespective of the presence of gas or vacuum in the environment within chamber 24. In the context of the present description, the term "main motion component" is defined as the main direction of the air or gas stream 31b upon exit from ejector 36c, which is composed of many very similar motion components that eventually deviate more and more from the initial direction the air or gas stream 31b has while still within ejector 36c. Said deviation increases with the distance from ejector 36c after exit of the air or gas stream 31b therefrom. Within the context of the present description an air or gas stream 31b has a main motion component parallel to the plane of active surface 37 if the main direction of air or gas flow does not substantially change before the air or gas flow has travelled a distance substantially corresponding to the lateral extension of heating surface 41 and/or substantially corresponding to the width of cut film 18 extending beyond holding plate 36 (see FIG. 6A).

Figure 10:
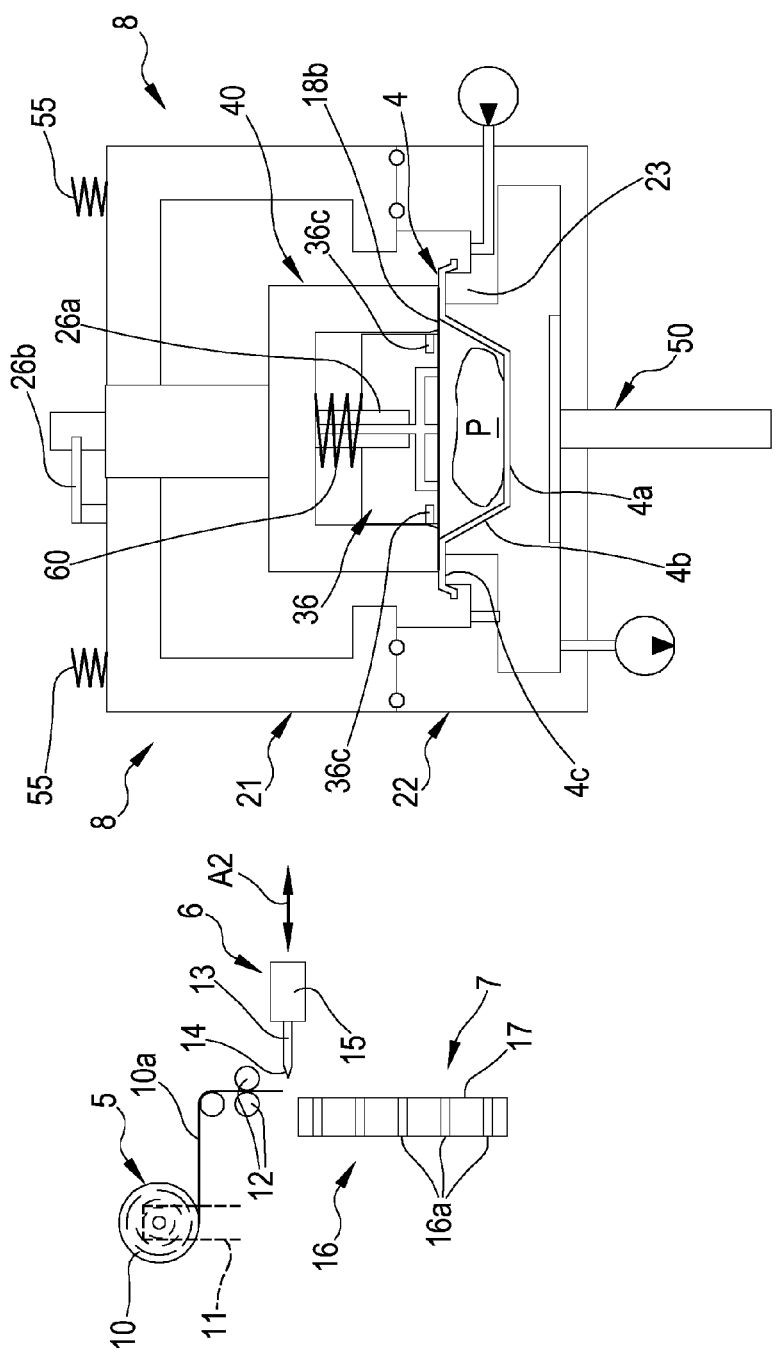
Figure 11:
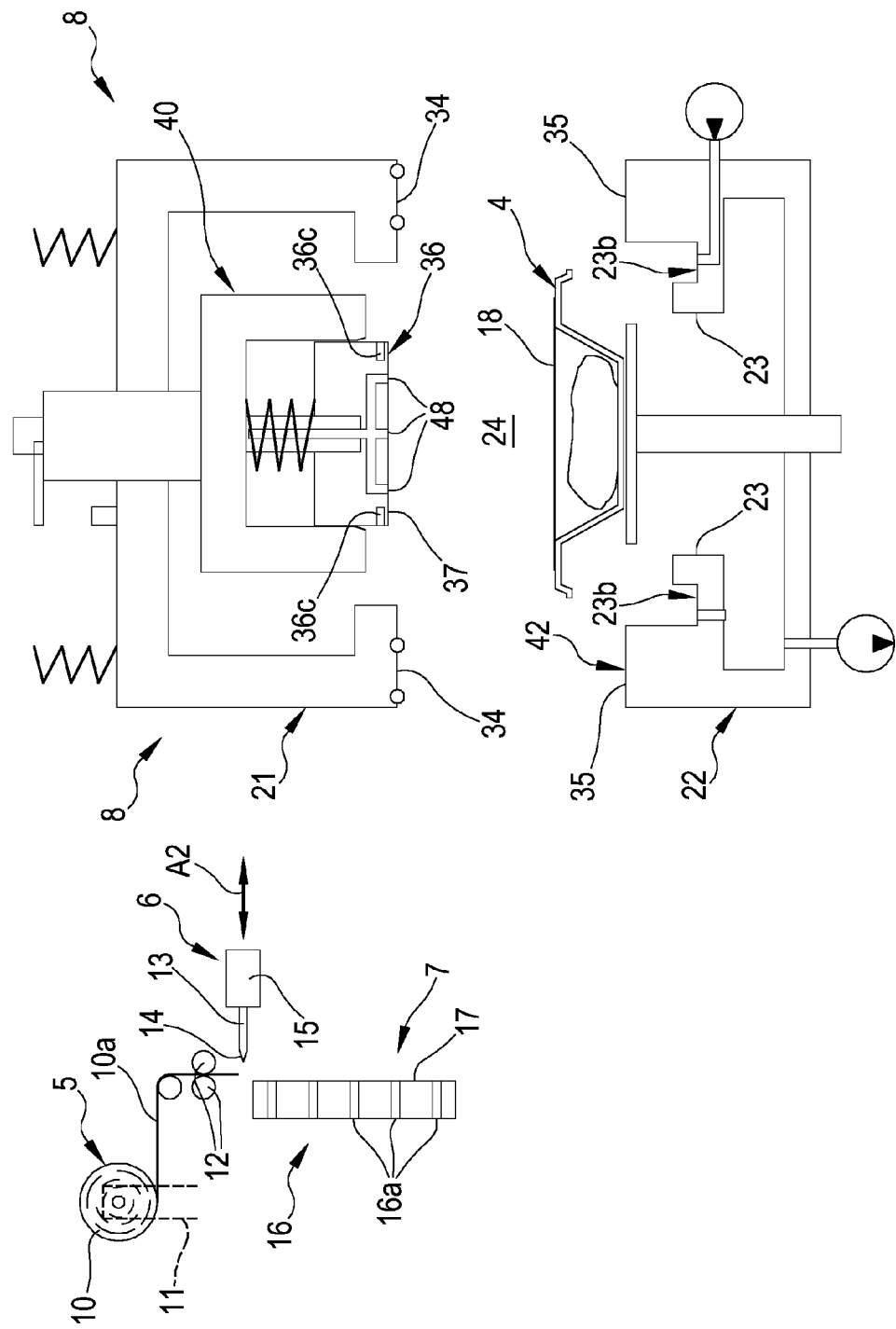
Figure 12:
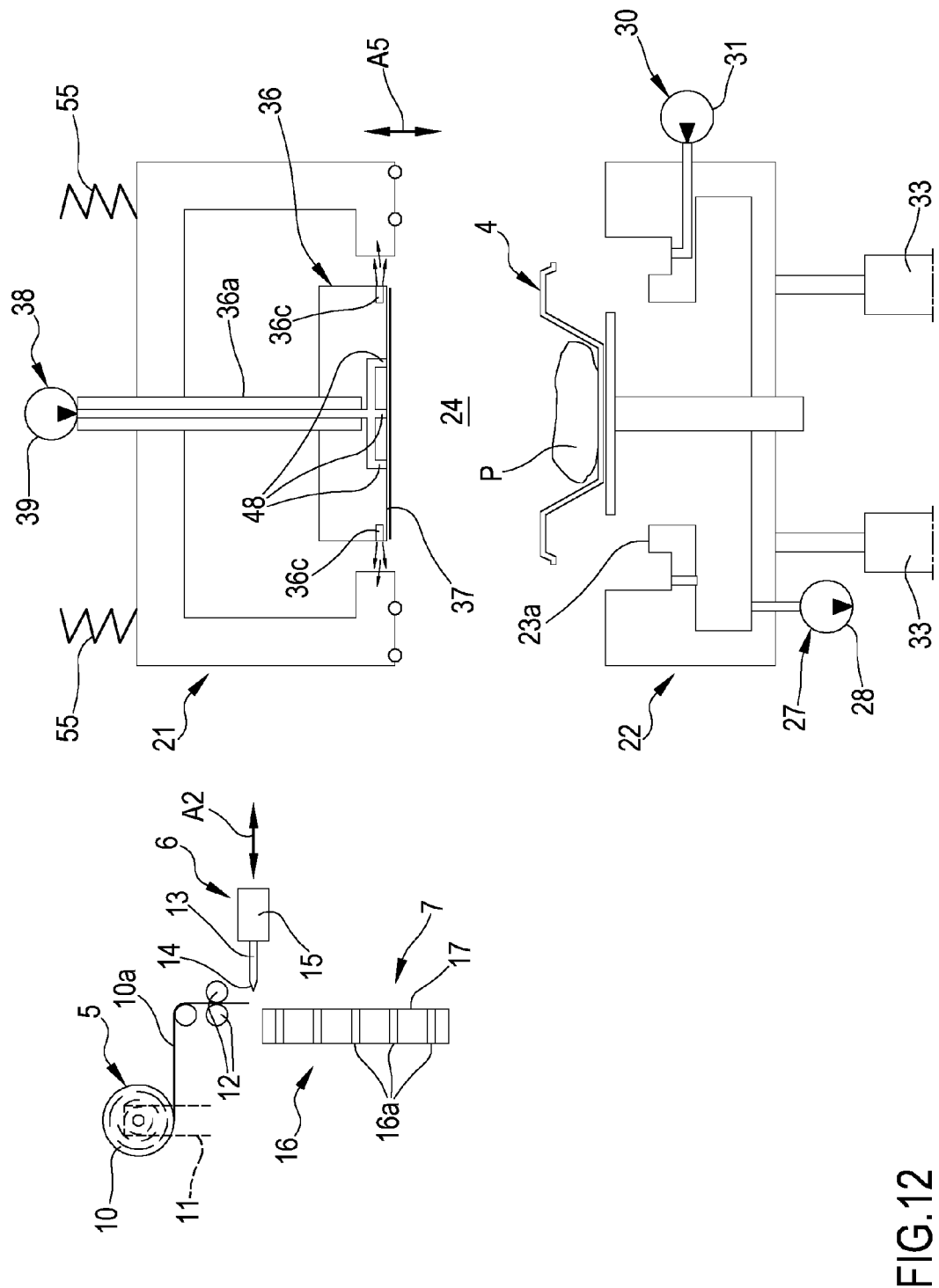
FIGS. 12-16 are schematic side views relating to a second embodiment of a packaging apparatus according to aspects of the invention. In these figures, consecutive phases of a packaging process operated by the apparatus of the second embodiment are shown. The apparatus and process according to these figures are intended to form a skin packaging.

At least some or all of the ejectors 36c are further arranged in proximity to the active surface 37, preferably being spaced from heating surface 41 of heating structure 40 by a distance that is greater than that from active surface 37. In general, ejectors 36c can be arranged in any manner suitable to ensure unobstructed ejection of air or gas 31b from holding plate 36 when holding plate 36 and heating structure 40 are in a spaced-apart configuration such as shown in FIG. 2 or 6A. This spaced-apart configuration is defined in contrast to a configuration in which heating structure 40 essentially houses holding plate 36 when the position of holding plate 36 has been shifted as shown in FIG. 10, in which some or all of ejectors 36c are obstructed by heating structure 40.

Ejectors 36c can be configured, sized, and/or shaped in a manner suitable to facilitate the ejection of a stream of air or gas 31b substantially parallel to the active surface 37, as shown in FIGS. 6, 6A, and 7 to 9. For example, ejectors 36c can have a substantially cylindrical shape (e.g. a regular tube shape; the corresponding openings being substantially circular), as shown in FIGS. 2 to 17. Alternatively, ejectors 36c can have a tapered shape (e.g. conical; the diameter increasing either outwardly or inwardly), an elliptic shape (e.g. a flattened cylinder), a slit shape (e.g. vertical or horizontal slit), a combination of the aforementioned, or any other shape that allows for air or gas to be ejected in a manner substantially parallel to active surface 37.

As can be seen from, for example, FIGS. 6A and 6C, ejectors 36c define channel that open up to the space around holding plate 36 such that the air or gas streams 31b ejected by ejectors 36c can enter into said space and disperse, preferably evenly, around the holding plate 36. FIGS. 5 to 9 show that the air or gas streams 31b ejected from ejectors 36c can exit from holding plate 36 in a largely unrestricted manner and the air or gas can exit from chamber 24 when it is in the open configuration or disperse throughout chamber 24 when it is in the closed configuration. In general, the ejectors can have any suitable shape that enables the ejection and flow of gas as desired in the context of the present invention. Thus, the properties of the ejectors shown herein can be modified for some applications. In some examples, the ejectors exhibit an inclination either up or down, i.e. away from or towards the film held by the holding plate. Other properties can vary as well, for example, diameter, size, orientation, etc., as also described further below.

As further discussed below, when describing the operation of the apparatus 1, the control unit may be configured to create a vacuum in the packaging chamber 24 (by controlling the vacuum pump 28 to withdraw gas from said packaging chamber 24) until a pressure comprised between 100 and 300 mbar, optionally between 150 and 250 mbar, is reached. This pressure level is sufficiently low but not too low so that detachment of the film sheet from the holding plate 36 is avoided as the control unit also creates a pressure level in correspondence of the suction holes 48, by acting on vacuum source 39, below the pressure level in the packaging chamber.

As shown in FIGS. 2-11 the packaging assembly 8 has a heating structure 40 peripherally associated to the film holding plate 36 and having a respective heating surface 41 which extends radially outside with respect to the active surface 37 of the holding plate 36. In practice the holding plate 36 is sized to cover only a central portion 18a of the cut film sheet 18 while the heating surface 41 of the heating structure 40 is designed to heat a peripheral portion 18b of the cut film sheet 18 surrounding said central portion. The term "peripheral portion", as used herein, generally denotes the portion or portions of cut film sheet 18 that comprise one or more edge regions and optionally one or more corner regions, as well as some of the adjacent film material (e.g. a region including between about 3 mm to about 10 mm (preferably between about 4 mm to about 8 mm) of material around the edges of cut film sheet 18). The peripheral portion 18b can be continuous (e.g. comprising all edges and corners) or not continuous (e.g. comprising only one or more edges without the corners). The packaging assembly 8 and particularly the heating structure 40 is positioned and configured such that at least when the packaging assembly 8 is in said second operating condition, the heating surface 41 of the heating structure 40 faces the end surface 23a of said inner wall 23 delimiting one of said seats 23b in the lower tool 22. Note that in the example of FIGS. 2-11 the heating structure 40 and film holding plate 36 are initially positioned such that heating surface 41 is retracted with respect to active surface 37 (see FIGS. 2-6). This ensures that in this initial relative position of heating structure 40 and holding plate 36, ejectors 36c are not covered by the heating structure 40 (see above). As described, and as can be seen in particular from the series of FIGS. 9, 10, and 11, also the heating structure 40 and the holding plate 36 are relatively movable to one another along said main (vertical) direction represented by double arrow A5. In detail, the holding plate 36 is terminally carried by a shaft 36a slidably coupled relative to the heating structure 40 and having an abutting portion 36b designed to cooperate with the upper tool and with the heating structure as explained below. An elastic element 60 (which may be, e.g., a spring or a pneumatic actuator) may be interposed between the holding plate and the heating structure. The elastic element 60 allows the positioning of the holding plate 36 as shown in FIGS. 2-9 since the elastic element 60 tends to push the holding plate downwards (the downward stroke of the holding plate 36 relative to the heating structure 40 is limited by abutting portion 36a interfering with the heating structure 40).

The control unit 100 is connected to the heating structure 40 and configured for controlling heating of the heating structure 40 such that the heating surface 41 is brought at least to a first temperature (selected based on the materials used for the film sheet 18 and the tray 7 to be adequate for sealing at least the peripheral portion of the cut film sheet to the tray rim).

It is noted that according to a variant, second heating means may also be integrated in the film holding plate 36 which may be configured to heat the active surface 37 such a way to bring it at least to a second temperature. The heating means can be connected with the control unit 100 and the control unit be configured for controlling the heating means such that the active surface 37 of the film holding plate 36 is brought at least to said second temperature. Depending upon the circumstances the first and second temperatures may be equal or different.

Advantageously, the control unit 100 is configured for independently controlling the (first and second, if present) heating means and the heating structure 40 and to independently set the first and second temperatures. In this way, the control unit 100 may allow an operator to properly set the temperature of the heated parts of the upper tool 21 (active surface 37 and heating surface 41). The management of these temperatures by the control unit 100 allows improve the bond between film sheet 18 and support or tray 7. In particular: the control unit 100 may be configured to control the first and second temperatures as follows:

in case of shrinkable films 10 being used, then the control unit may only cause heating of the heating surface 41, optionally only when this latter is pressed against the rim 4c of tray 4, in case of non heat shrinkable films 10 being used, then the control unit may cause heating of the entire film sheet with the first and second temperatures being e.g. equal, in case of skin packaging (see, e.g., FIGS. 12 to 17), the control unit may cause heating of the entire film sheet, e.g. with the second temperature being higher than the first temperature.

It is noted that in case of skin packaging, in some examples, the temperature of the stream of gas ejected from ejectors 36c (and/or the temperature of the component defining the ejectors 36c, e.g. the holding plate 36) can be kept at a low temperature of about 50° C. to 60° C., such that an undesired shrinking of the material of the film can be partially or substantially recovered during a period after packaging (e.g., typically within 24 hours after packaging). From a constructional point of view, the heating structure 40 may include a metallic body embedding at least one resistive and/or inductive element connected to a power supply; in this case the control unit 100 is configured for controlling the power supply to continuously supply current to the resistive or inductive element such as to keep the temperature of the heating surface 41 within a prefixed range around said first temperature.

In addition to or independent from the latter, the heating structure 40 may include at least one metallic wire directly carried by the heating surface 41 of the heating structure 40; the metallic wire is connected to a power supply and to the control unit 100 which is configured for controlling the power supply to supply current to the metallic wire during discrete time intervals. In practice the thermal inertia of the wire is so small that the control unit may be programmed cause the power supply to provide current for short time intervals, e.g. when sealing of the film sheet 18 to the support needs to take place. During the rest of the cycle described above, the power supply does not feed current to the wire, which is basically at ambient temperature. This is useful when dealing with shrinkable films.

Alternatively or in addition to the latter, the heating structure 40 may include a printed circuit formed onto said heating surface 41 of the heating structure 40; the printed circuit is connected to a power supply and to the control unit 100 which is configured for controlling the power supply to supply current to the printed circuit for short time intervals, e.g. when sealing of the film sheet 18 to the support needs to take place. During the rest of the cycle described above, the power supply does not feed current to the wire, which is basically at ambient temperature. This is useful when dealing with shrinkable films.

As to the heating means, which may be associated to the holding plate 36, also the heating means may include at least one resistive and/or inductive element embedded in the body of the holding plate and connected to a power supply. In this case, the control unit 100 is configured for controlling the power supply to supply current to the resistive or inductive element such as to keep the temperature of the active surface 37 of the holding plate 36 within a prefixed range around said second temperature.

In addition to or independent from the latter, the holding plate may include at least one metallic wire directly carried by the active surface 37 of the holding plate 36 and connected to a power supply and to the control unit 100 which is configured for controlling the power supply to supply current to the metallic wire during discrete time intervals. In practice the thermal inertia of the wire is so small that the control unit may be programmed to cause the power supply to provide current for short time. During the rest of the cycle described above, the power supply does not feed current to the wire, which is basically at ambient temperature.

Alternatively or in addition to the latter, the heating means may include a printed circuit formed onto said active surface 37 of the holding plate 36 and connected to a power supply and to the control unit 100, which is configured for controlling the power supply to supply current to the printed circuit for short time intervals. During the rest of the cycle described above, the power supply does not feed current to the printed circuit, which is basically at ambient temperature.

It is noted that, when the film is heat shrinkable, using the heating means may serve to increase tension in the central portion of the film 18, after having fixed the film perimeter to the rim 4c.

Figure 7:
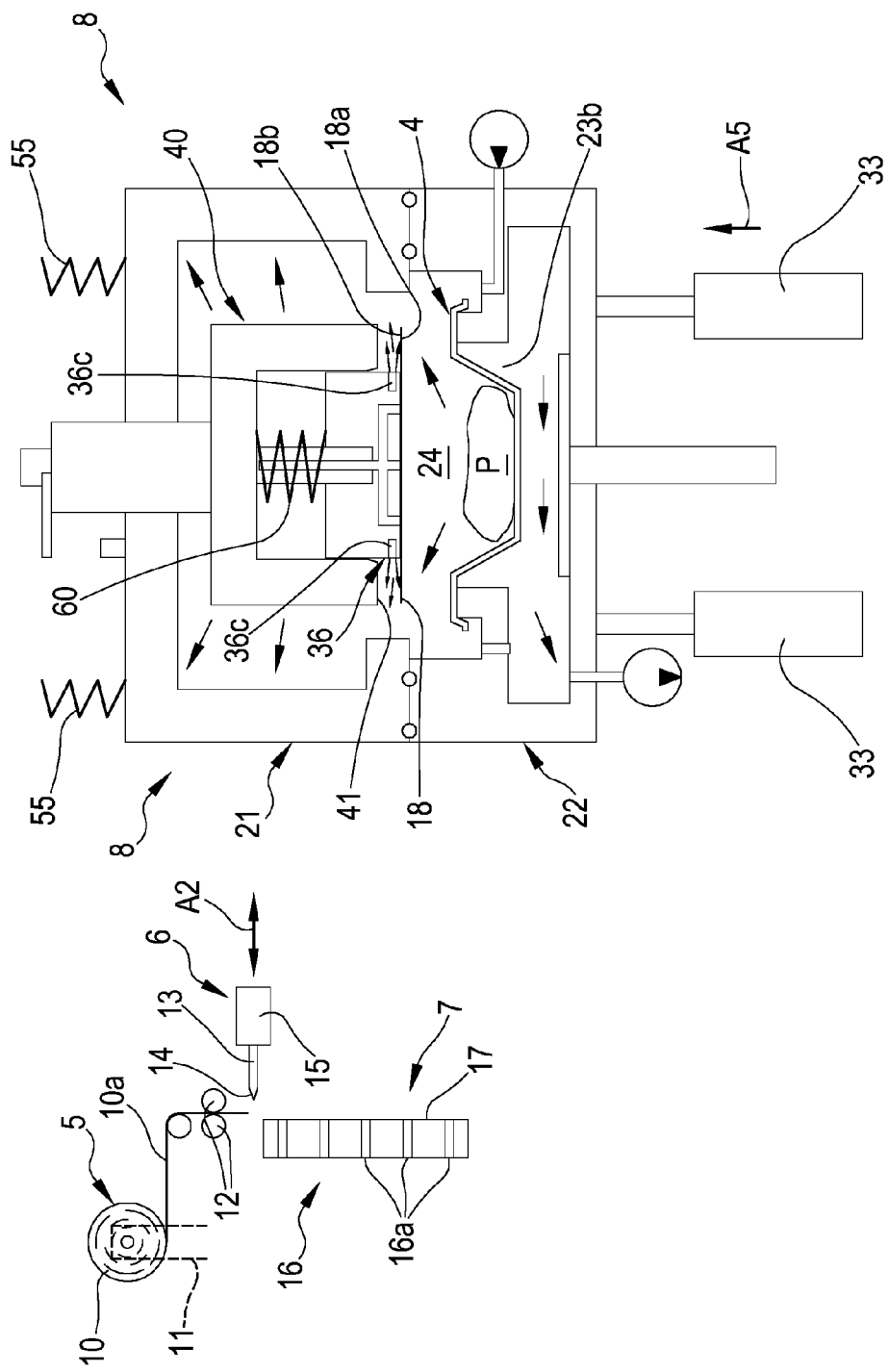
Figure 8:
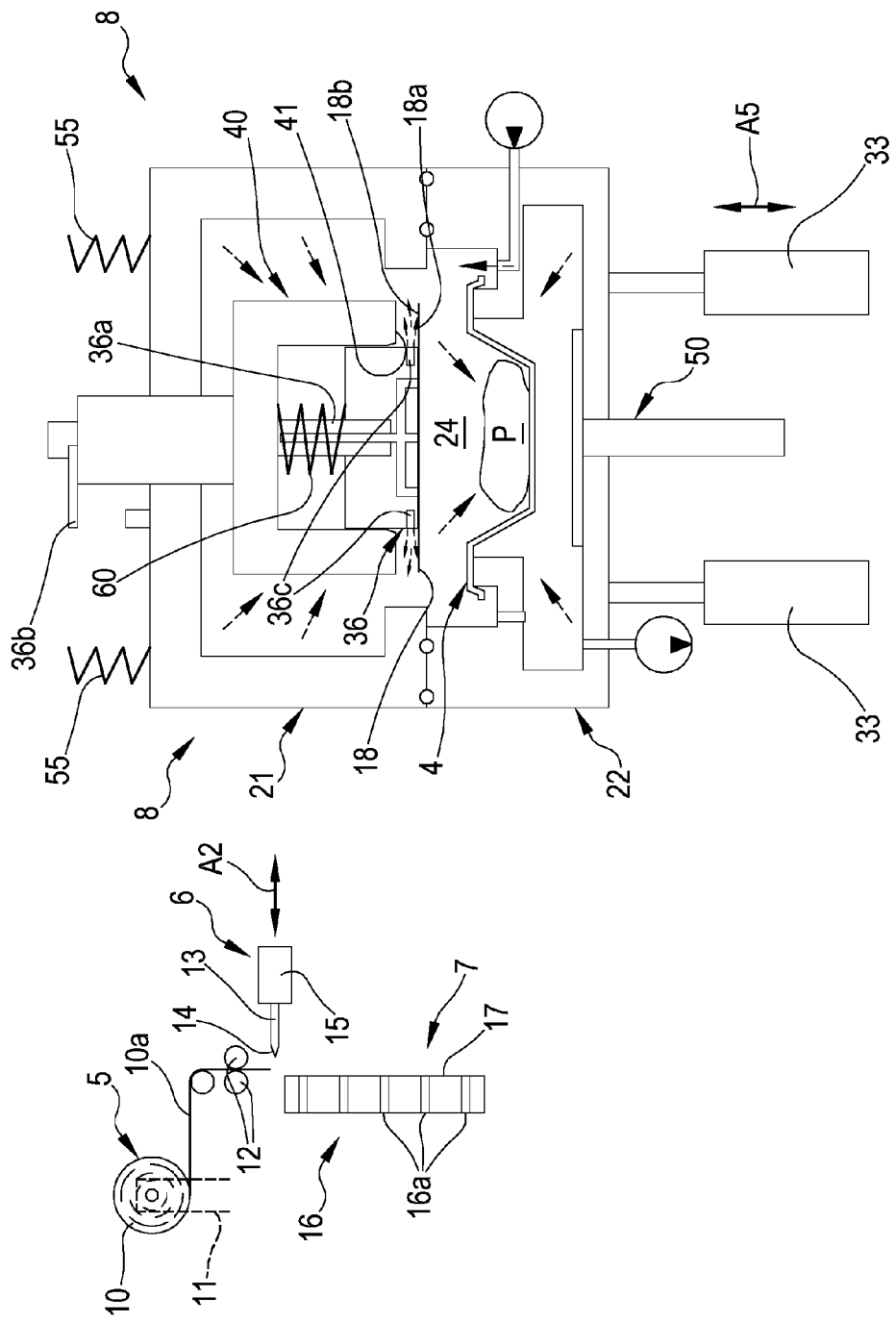
Figure 9:
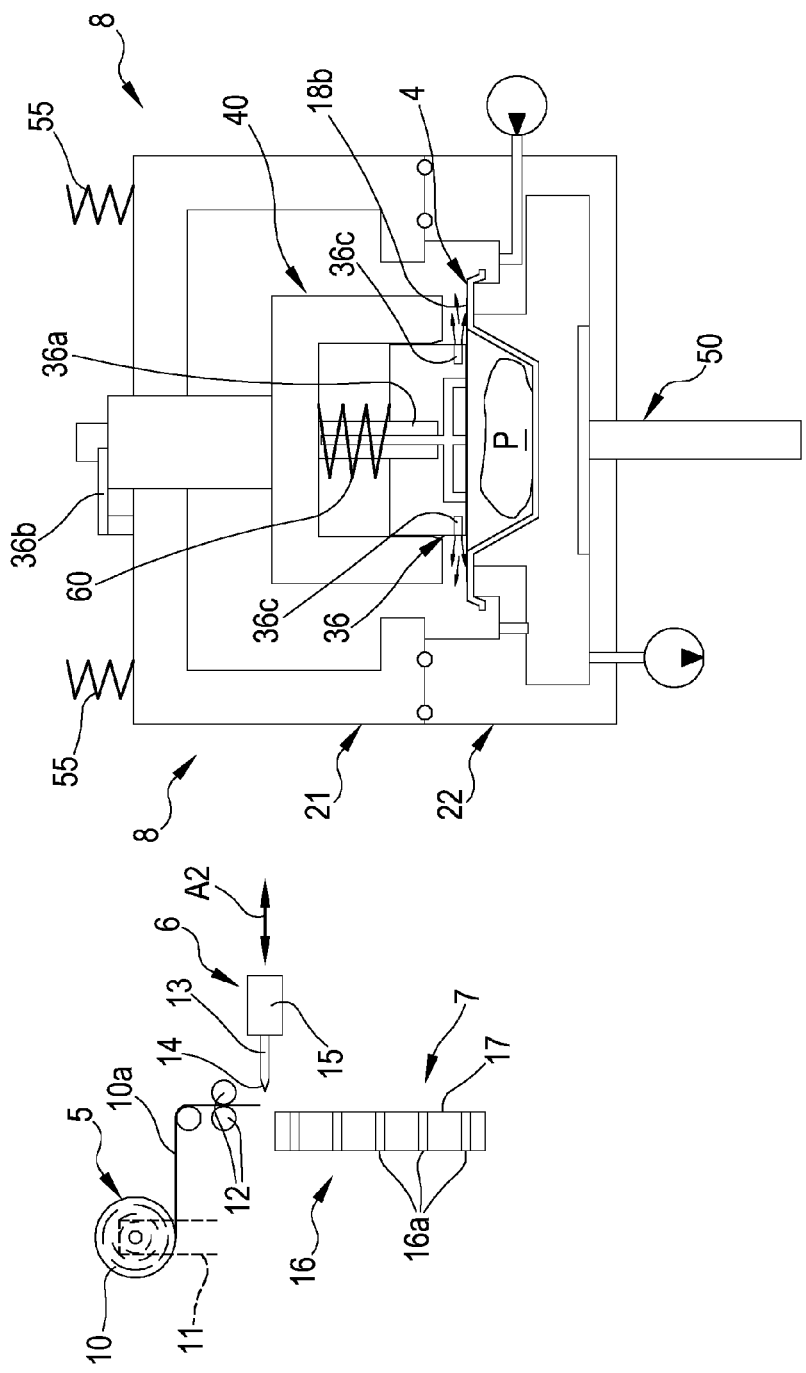

As a further variant, an ultrasound generator may be used in place of or in addition to the heating structure and/or heating means. The ultrasound generator—if present—is configured to convey pressure energy (in the form of high frequency acoustic waves) in correspondence of the area occupied by the peripheral surface 18b of the film sheet 18 and by the rim 4c of support 4. The control unit may be programmed to control the ultrasound generator to cause emission of acoustic waves at least when the film sheet and the tray 4 are brought in mutual contact as shown in FIG. 7.

As another variant, a generator of electromagnetic waves may be used in place of or in addition to the heating structure and/or heating means. The electromagnetic generator—if present—is configured to focus electromagnetic energy (in the form of high frequency electromagnetic waves) in correspondence of the area occupied by the peripheral surface 18b of the film sheet 18 and by the rim 4c of support 4. The control unit may be programmed to control the generator to cause emission of electromagnetic waves at least when the film sheet and the tray 4 are brought in mutual contact as shown in FIG. 10.

FIG. 6A shows a detailed view of heating structure 40 and holding plate 36, as well as film 18. FIG. 6A is discussed in view of comparative FIG. 6B, which shows a prior art arrangement of corresponding components that do not employ the ejectors 36c as described above.

The prior art arrangement shown in FIG. 6B has a heating structure 40' with a heating surface 41', a holding plate 36' with an active surface 37' and suction holes 48' therein, largely corresponding to respective elements 40, 41, 36, 37, and 48 in accordance with the embodiments described herein. For comparison, the cut film shown in FIG. 6B is denoted by reference numeral 18', comprising a central portion 18a' and a peripheral portion 18b'.

The effect of supplying a controlled air or gas stream 31b to ejectors 36c is now described with respect to both FIG. 6A and FIG. 6B. Upon activation of suction (e.g., evacuation, vacuum, etc.) through suction holes 48' and deactivation of suction through channels of backing plate (both not shown in FIGS. 6A and 6B), the cut film sheet 18' remains substantially in contact with active surface 37' of holding plate 36', in a similar manner as described herein with respect to holding plate 36 and cut film 18. Upon retraction of backing plate, the chamber 24 is closed and packaging of the cut film sheet 18' with a corresponding tray or support (not shown) would commence.

However, a common problem occurring with cut film sheet 18', in particular when using a film 10 having a thickness of 33 micron or less, is that upon retraction of the backing plate, the peripheral portion 18b' of cut film sheet 18' can bend or fold from a position suitable for packaging (corresponding to dashed line 18d' of FIG. 6B, substantially extending within the main plane of cut film sheet 18') to a position largely unsuitable for packaging, illustrated in FIG. 6B as downward hanging peripheral portion 18b' of cut film sheet 18'. It is noted that peripheral portion 18b' can assume a number of (intermediate) positions not substantially extending within the main plane of cut film sheet 18', most of which have a detrimental effect on the packaging and or sealing of the tray or support. For example, at least a part of the peripheral portion 18b' is in danger of flapping downwards to such an extent (e.g., as shown in FIG. 6B), that when the heating surface 41' of the heating structure 40' is supposed to contact the peripheral portion 18b' of the cut film sheet 18' positioned above the tray or support, the cut film sheet 18' cannot be sealed to the tray or support as described further below, because said part of the peripheral portion 18b' that is in the flapped down position cannot be acted upon by heating surface 41' as the latter directly contacts the tray or support instead, without any part of peripheral portion 18b' positioned in between. Consequently, the package cannot be sealed and the defective package must be discarded. While FIGS. 6A and 6B, along with the above description focus on the situation in which the peripheral portion of the cut film sheet disadvantageously moves downward, away from the heating surface, similar problems can occur, when the said peripheral portion moves upwards and/or towards the heating surface. These situations can incur similar problems, when a seal cannot be reliably created as described above, and/or when the peripheral portion of the cut film sheet is damaged or deformed due to premature contact with the heating surface or mechanical action from the heating structure and/or holding plate 36. The present apparatus and method are designed to address any kind of folding, bending, or mispositioning of the peripheral portion of a cut film sheet.

Another common problem occurring with cut film sheet 18', in particular when using a film 10 having a thickness of 33 micron or less, is that upon retraction of the backing plate, the temperature of the peripheral portion 18b' of cut film sheet 18' can rise in an undesired manner above a threshold where initial shrinking and/or folding can occur. In particular, if the temperature of the film rises above a level initiating heat shrinking of the peripheral portion 18b' of the film, the resulting deformation (including folding, bending, shrinking, etc.) can make it impossible to achieve a sealing of the package.

It is noted that the flapping down of the peripheral portion 18b' of cut film sheet 18' can occur under several different circumstances, for example, when film 10 has a thickness of 33 micron or less and, thus, would be more prone to deformation due to the decreased inherent stiffness of very thin film. However, the flapping down can also be caused or further aggravated by other factors. For example, heat emitted from heating surface 41' can soften the peripheral portion 18b' of cut film sheet 18', because of the initial proximity of the peripheral portion to the heating surface, which can be in the range of 3 mm to 6 mm, in some preferred embodiments in the range of 4 mm to 5 mm, which is subsequently further decreased. Another example includes deformation of the peripheral portion 18b' of cut film sheet 18' during the injection of controlled atmosphere or evacuation of chamber 24. In both cases, turbulence of air or gas can act upon the peripheral portion 18b', such that the corresponding air or gas flow 30a, as shown in FIG. 6B, can cause movement and/or flapping up/down of at least part of the peripheral portion 18b'.

In order to address the above-described problems, in particular avoiding any deformation (including folding, bending, shrinking, etc.) of the peripheral portion of a film, supply of air or gas to ejectors 36c is controlled by control unit 100 to selectively provide an air or gas stream 31b to be ejected from ejectors 36c in the manner described above. In particular, the stream of gas ejected by the ejectors can serve to cool the peripheral portion or portions of a film in order to prevent its shrinking. FIG. 6A shows an arrangement of components in accordance with the first embodiment of the present invention. In line with what is shown in FIGS. 2 to 11, the upper tool 21 has a heating structure 40 with a heating surface 41, a holding plate 36 with an active surface 37, and suction holes 48 as well as ejectors 36c provided therein. Except for the ejectors 36c, these elements largely correspond to respective elements 40', 41', 36', 37', and 48' as shown in FIG. 6B. For comparison, the cut film sheet shown in FIG. 6A is denoted by reference numeral 18, comprising a central portion 18a and a peripheral portion 18b. Additionally, a mispositioned peripheral portion 18c is schematically shown as a dashed line, merely for the purpose of comparison.

An air or gas stream 31b ejected from ejectors 36c runs along the upper surface of the peripheral portion 18b of cut film sheet 18 and thereby creates a pressure differential on the upper side thereof such that the peripheral portion 18b is maintained substantially in the same plane as the central portion 18a of cut film sheet 18. Due to the air or gas stream 31b (e.g., pressure and/or velocity of the fluid flow) ejected from ejectors 36c along the upper surface of the peripheral portion 18b, the peripheral portion 18b cannot deform (i.e. bend or flap) too much towards the air or gas stream 31b. In case of such deformation, the air or gas stream 31b would exert a positive pressure thereon, thereby forcing the peripheral portion back (e.g. down) into the desired position parallel to the air or gas stream. Likewise, the film cannot deform (i.e. bend or flap) too much away from the air or gas stream 31b. In case of such deformation, the air or gas stream 31b would create a negative pressure on the upper surface of the peripheral portion 18b, thereby also forcing the peripheral portion back (e.g. up) into the desired position parallel to the air or gas stream 31b. As described, the peripheral portion 18b is prevented from flapping or otherwise moving downwards. The peripheral portion is further prevented from flapping upwards towards the heating surface 41, such that, due to the combination of the pressure of the air or gas stream 31b and the pressure differential created by the flow of the air or gas stream 41 along the peripheral portion 18b with respect to the lower side thereof, the position of the peripheral portion 18b is substantially maintained in the plane of the central portion 18a of cut film sheet 18. The ejection of air or gas can be maintained as long as necessary, for example until the closure of chamber 24 and/or until the sealing of the cut film sheet 18 with the tray or support 4 is performed. The ejection of air or gas can alternatively be intermittent, for example permitting evacuation of chamber 24, in which case the ejection of air or gas can be reduced or stopped until the desired level of vacuum within the chamber is reached.

As ejectors 36c can be arranged around the peripheral portion 18b of the entire cut film sheet 18 as required (depending on, e.g., size, shape, thickness, or materials used for the film) the entire peripheral portion 18b of the cut sheet film 18 can be maintained substantially in the plane of the central portion 18a of film 18, essentially corresponding to that of active surface 37. In this manner, mispositioning of the peripheral portion 18b is substantially reduced if not entirely avoided.

Additionally, the air or gas stream 31b ejected from ejectors 36c can serve to regulate a desired temperature of the peripheral portion 18b of cut film sheet 18. Due to the proximity to the heating surface 41, the temperature of the peripheral portion 18b can increase to an unsuitable temperature, for example a temperature affecting the properties of the material of the cut film sheet 18. An unsuitably high temperature of film 18 can result in, for example, decreased stiffness and/or increased softness, shrinkage, a change in adhesive properties, deformation (e.g. ripples or curls), compromised structural integrity, or combinations thereof. In order to reduce or avoid such detrimental effects, the air or gas stream 31b ejected from the ejectors 36c can be configured to maintain a desired temperature of the peripheral portion 18b of the cut film sheet 18.

Additionally or alternatively, the air or gas supplied by film positioning arrangement 30a can be further configured to also supply the same gas or mixture of gases as the controlled atmosphere arrangement 30. In such an embodiment, the creation of a controlled atmosphere within chamber 24 as described above, can be assisted by the gas stream 31b supplied through ejectors 36c. This can result in a more effective creation of the controlled atmosphere within chamber 24, for example due to the time being reduced to create the desired controlled atmosphere and/or due to a more uniform distribution of the gas or gas mixture used to create the controlled atmosphere.

In view of the above structural description of the first embodiment of apparatus 1 here below operation of the first embodiment is disclosed. The operation takes place under control of control unit 100 and achieves a process of packaging a product in a tray. In this case the described process allows packaging under modified atmosphere. In any case the apparatus 1 is also capable of making a skin packaging of the product. Moreover, the apparatus 1 may be used for applying a lid to a tray and thus packaging in normal ambient atmosphere.

The trays are progressively moved to the packaging assembly 8 by transport assembly 3. At the same time the pinch rolls allow unrolling of film from roll 10 and the cutting assembly prepares the cut film sheets in number and size corresponding, preferably, exactly to the trays to be closed. In practice the film sheets may be cut to a size copying that of the outer border of the rim 4c or they may be cut to a size radially smaller than the outer edge of rim 4c but sufficient to tightly close the mouth of the tray 4 and sealingly engage the rim 4c top surface. In some examples, the cut film sheets can be somewhat larger than required to cover the entire rim 4c, thereby allowing for some excess material extending beyond the rim 4c. In some examples, this can reduce the requirements with respect to the accuracy of placement of the cut film sheets onto trays 4.

In the apparatus 1 of FIGS. 2-11 the packaging assembly includes, as described above, a main actuator 33. In the embodiment shown, the main actuator is carried by frame 2 and acts on lower tool 22 under the control of control unit 100 for lifting and lowering the lower tool 22 along main direction A5, which is typically vertical.

FIG. 2 shows a prepared cut film sheet 18 positioned on the backing plate 16 of transfer device 7. In the present embodiment, backing plate 16 has vacuum holding means in the form of channels 16a as described above, actively holding the cut film sheet 18 during transfer towards and into chamber 24. It is understood that backing plate 16 could comprise alternative holding means other than those illustrated in FIGS. 2-11.

In FIG. 3, backing plate 16 has been moved by the transfer device 7 into the space between the upper 21 and lower 22 tools (i.e. into chamber 24), in particular directly below holding plate 36 and directly above and in superimposition with tray or support 4. In this embodiment, the tray or support 4 carrying the product to be packaged is already present within chamber 24. However, it is understood that the movement of the tray or support 4 and that of the cut film sheet 18 into chamber 24 can be performed sequentially in any order or, preferably, at the same time. At this stage, the vacuum holding means 16a are still being supplied with a vacuum, thereby holding cut film sheet 18 into place.

Figure 4:
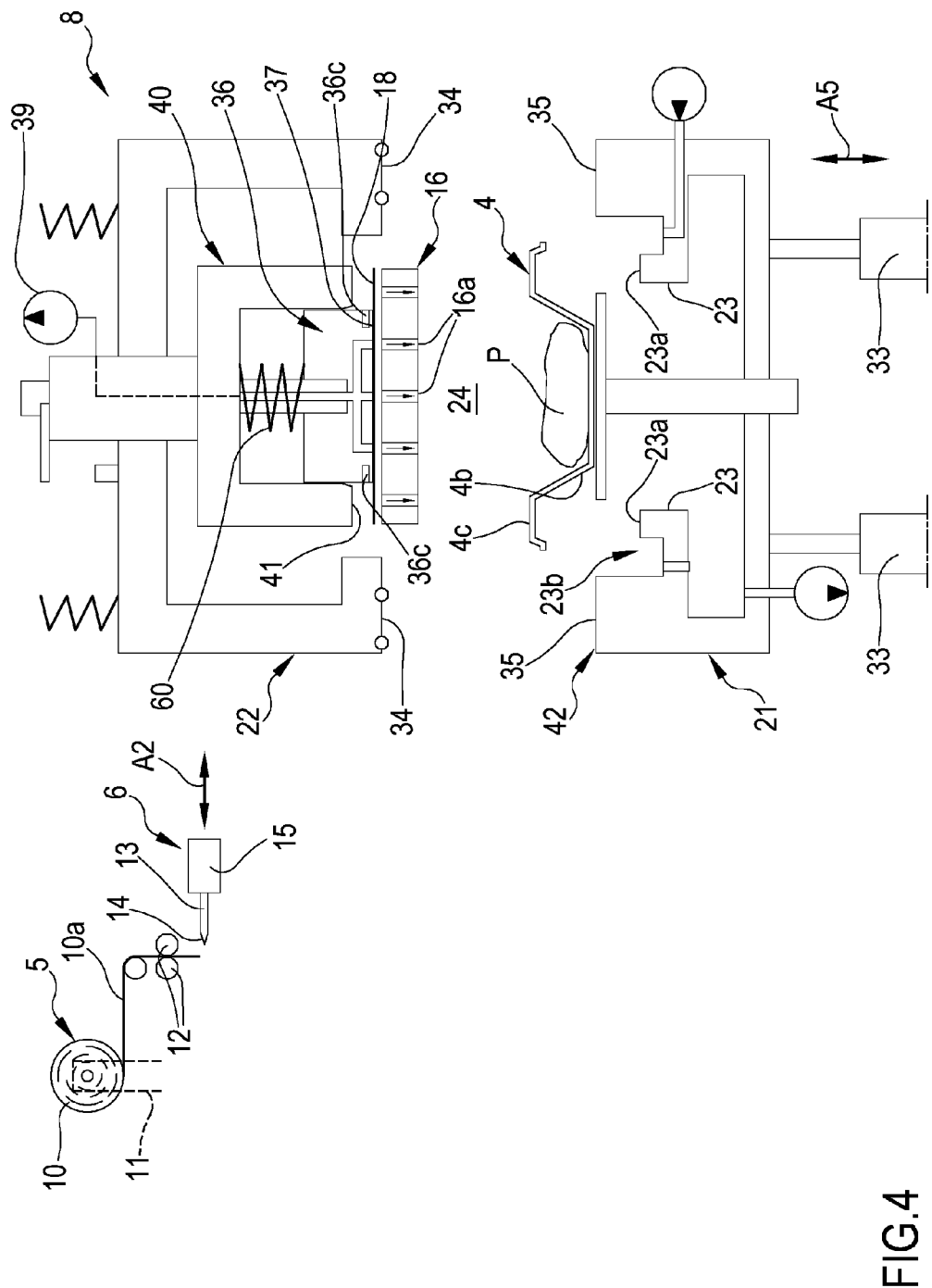

In FIG. 4, backing plate 16 is raised toward holding plate 36 such that the cut film sheet 18 is substantially in the proximity of or in contact with the active surface 37 of holding plate 36. As shown in FIG. 3, backing plate 16 still holds the cut film sheet 18 in place.

Figure 5:
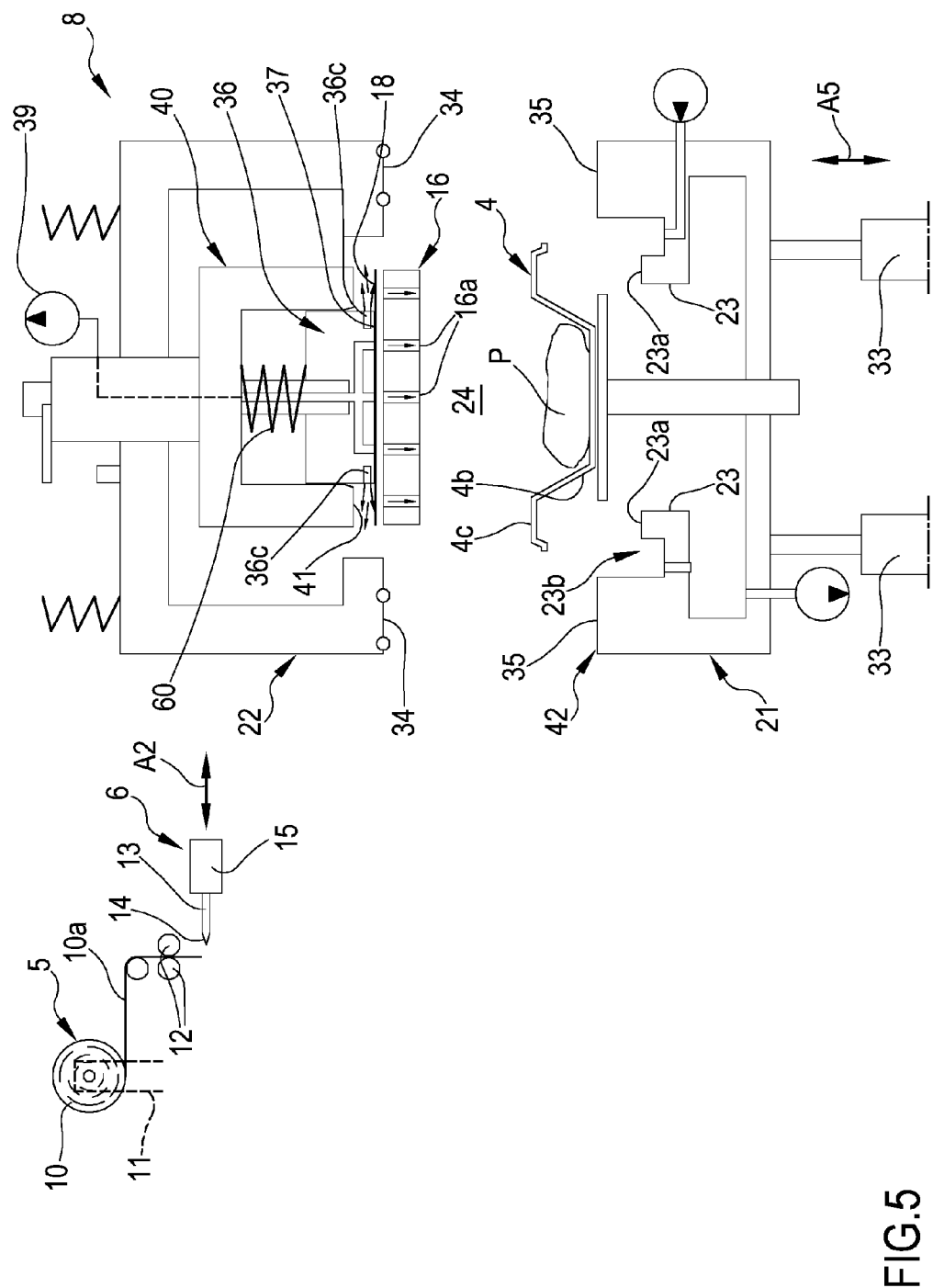

In FIG. 5, the film positioning arrangement 30a has been activated and the air or gas stream 31b is ejected by ejectors 36c as described above, in order to maintain the peripheral portion 18b of the cut film sheet 18 in the present position, namely substantially in the plane of central portion 18a and/or the plane of the active surface of backing plane 16. Subsequently, the vacuum holding means 16a of backing plate 16 are deactivated.

Then, as shown in FIG. 6, holding means 48 of holding plate 36 are activated and, subsequently, backing plate 16 is moved away from holding plate 36. Due to the switch in holding, the cut film sheet 18 is now held by holding plate 36 and backing plate 16 can be entirely retracted by transfer device 7 from the space between the upper 21 and lower 22 tools.

After the transfer device 7 has moved the cut film sheet 18 into the packaging chamber 24 and the holding plate 36 has received the cut film sheet (see FIGS. 2 to 6), the control unit 100 controls the main actuator 33 to close the packaging chamber 24 (see FIG. 7) by lifting the lower tool 22 such that inner wall 33 intercepts the support 4 which is lifted and separated from inner element 50.

A holding gasket (not shown) is configured to engage and hold the four corners of cut film sheet 18 in the configuration of packaging assembly 8 shown in FIG. 7. In this manner, deformation or mispositioning of the cut film sheet 18 in the region of the corners thereof is reduced or entirely prevented. The holding gasket is positioned in a manner preventing any interference with the trays. This can be achieved, for example, by ensuring that the holding gasket has a larger extension that the tray.

It is also noted that during the phases depicted in FIGS. 2 to 6 the abutting portion 36b interferes with a part integral with the heating structure so that the elastic bias exerted by element 60 may cause only a limited relative downward stroke of the holding plate relative to the heating structure. At this point, the packaging chamber is hermetically closed and film sheet is held by holding plate 36 at a certain distance from the mouth of the tray or support 4. As shown in FIG. 7 the vacuum arrangement is activated and a certain degree of vacuum is created.

As described above, the air or gas stream 31b can be reduced or temporarily cut off during the creation of the vacuum or the evacuation of chamber 24. Preferably, the supply of air or gas is reduced to an extent that allows for efficient creation of the desired degree of vacuum.

Then, immediately after or, with a certain temporal overlap during vacuum creation, the controlled atmosphere arrangement is actuated (see FIG. 8) and a controlled atmosphere created inside the packaging chamber. As described above, the ejectors 36c can additionally or alternatively be utilized in in the creation of the controlled atmosphere. In certain variants only the vacuum arrangement or only the controlled atmosphere arrangement may be actuated. It is noted that in case it is desired to operate the apparatus 1 to simply apply a lid to a tray 4, then the vacuum arrangement and the modified atmosphere arrangement may not be activated at all.

A further vertical movement imposed onto the lower tool 22 by main actuator 33 wins the reaction of the elastic elements 55 (see FIG. 9) and brings the film sheet held by holding plate into contact with the rim 4c of the support 4. In this position, the upper tool 21 interacts with the abutment portion 36b. In the example of FIGS. 2-11 a protrusion 21a fixed to the upper tool touches the abutting portion 36b so that further vertical movement of the lower tool would cause vertical movement of the upper tool, of the abutment portion 36b and thus of the holding plate 36.

The control unit 10 is then configured to operate the main actuator 33 to further lift the lower tool 22, winning the reaction of elastic element 60 and thus causing the holding plate 36 to lift and the active surface 37 and heating surface 41 to align with each other (FIG. 10). In a coordinated manner, the air or gas stream 31b ejected by ejectors 36c is cut off, so as to correspond to the relative movement of holding plate 36 and heating structure 40. Preferably, the air or gas stream 31b is maintained as long as heating structure 40 does not obstruct ejectors 36c. It is noted that the air or gas stream 31b can be cut off immediately at a certain point in time. Preferably, the air or gas stream 31b can be reduced gradually over a certain amount of time (e.g., in the range of a few seconds), such that the position of the peripheral portion 18b of cut film sheet 18 is maintained in the desired manner, as described above.

In some cases it can be desirable to maintain the air or gas stream 31b active as long as possible in order to maintain the temperature of the film as described above. In some embodiments, the heating structure 40 can function as one part of a master valve that, in combination with the holding plate 36 and the relative motion between the two components, can substantially shut off the air or gas stream 31b from all ejectors 36c substantially at the same time and/or at the latest possible moment before contact is made between the heating surface 41 and the rim 4c of the support 4, the peripheral portion 18b of cut film sheet 18 being positioned therebetween. In a preferred embodiment, there is a small gap present between the heating structure 40 and the holding plate 36. In some examples, the gap has a size of between 0.1 mm and 5 mm, preferably between 0.5 mm and 3 mm.

At this point, when the heating surface 41 of the heating structure 40 contacts the peripheral portion 18b of the film sheet 18 positioned above a support 4, the control unit 100 causes heating of the heating structure 40 such that the heating surface 41 at least partially fuses plastic material of the peripheral portion of the film sheet 18 and/or of the rim 4c thereby sealing the cut film sheet to the tray. Then the control unit 100 then lowers the lower tool 22, and thus opens the packaging chamber 24 to allow the tray to proceed downstream the packaging assembly (see FIG. 11). The cycle may then be repeated. In an alternative to a controlled heating of the heating surface 41, the temperature of the heating surface can be kept constant, such that sealing upon contact of the heating surface 41 and the film sheet 18 is achieved.

Second Embodiment of Apparatus 1

In FIGS. 12-16 a second embodiment of apparatus 1 is shown. For sake of conciseness only the aspects and components of this second embodiment differing from those of the first embodiment will be described. Remaining aspects and components are substantially the same as in the first embodiment and have been identified with same reference numerals. The differences with respect to the first embodiment concern the packaging assembly. In the case of FIGS. 12-16 the upper tool 21 has at least one holding plate 36 having a respective active surface 37. The holding plate 36 is terminally carried by shaft 36a and covers the entire radial span of the end surface 23a and thus also of rim 4c. The holding plate shaft is coupled to the upper tool 21 to allow at least movement along direction of double arrow A5 as described below. The means for holding 38 may comprise a vacuum source 39, e.g. in the form of a pump, controlled by the control unit 100 and connected to a plurality of suction holes 48 present in correspondence of the active surface 37. Note that in addition or in alternative to vacuum source 39 the means for holding 38 may include one or more of the following:
  mechanical holders, such as pincers, clamps or the like,
  adhesive systems, for instance comprising adhesive portions associated to the active surface 37,
  heating systems, for instance comprising heatable portions associated to the holding plate for causing heating of the active surface 37 and thus of the film sheet 18 in order to increase stickiness of the film sheet to the active surface 37,
  electrostatic systems, for instance the active surface 37 may be charged with a polarity different from that typical of the plastic sheet 18.

Control unit 100 may be configured for activating the means 28, e.g. vacuum source 39, and for causing the film holding plate 36 to receive and hold said one or more film sheets 18 in correspondence of the active surface 37. In particular, the control unit 100 may be configured for coordinating activation of the means 28, e.g. of vacuum source 39, with proper positioning of the cut film sheet 18 by the backing plate 16. For example, the control unit 100 may activate the means 28, e.g. vacuum source 39, and cause the film holding plate 36 to receive and hold said one or more film sheets 18 in correspondence of the active surface 37, when the backing structure 16 carrying the cut film 18 is properly positioned within the packaging chamber underneath the holding plate 36. Heating means may be integrated in the film holding plate 36 which may be configured to heat the active surface 37. No heating structure 40 analogous to that of the first embodiment is present in the second embodiment. In some examples, heating structure 40 can coincide with the active surface 37 (e.g. when heating surface 41 and active surface 37 have substantially the same plane). The heating means can be connected with the control unit 100 and the control unit can be configured for controlling the heating means such that the active surface 37 of the film holding plate 36 is brought to the desired temperature. The heating means may be of the type described for the first embodiment.

The control unit may control the heating means to generate a first temperature in the peripheral portion of the surface 37 and a second temperature in the central portion of the surface 37. In particular, the control unit 100 may be configured to control the first and second temperatures as follows:

in case of heat-shrinkable films 10 being used, then the control unit may only cause heating of the peripheral portion of the active surface 37, optionally only when this latter is pressed against the rim 4c of tray 4, in case of non heat-shrinkable films 10 being used, then the control unit may cause heating of the entire surface 37 and thus of the entire film sheet with the first and second temperatures being e.g. equal, in case of skin packaging then the control unit may cause heating of the entire active surface 37 and thus of the entire film sheet, e.g. with the second temperature being higher than the first temperature.

The holding plate 36 of the second embodiment of apparatus 1 comprises ejectors 36c similar to those described above with respect to the first embodiment. However, while in the first embodiment ejectors 36c can be arranged all around the perimeter of holding plate 36, in the second embodiment ejectors 36c are arranged exclusively at the corners of the holding plate 36c.

Figure 18:
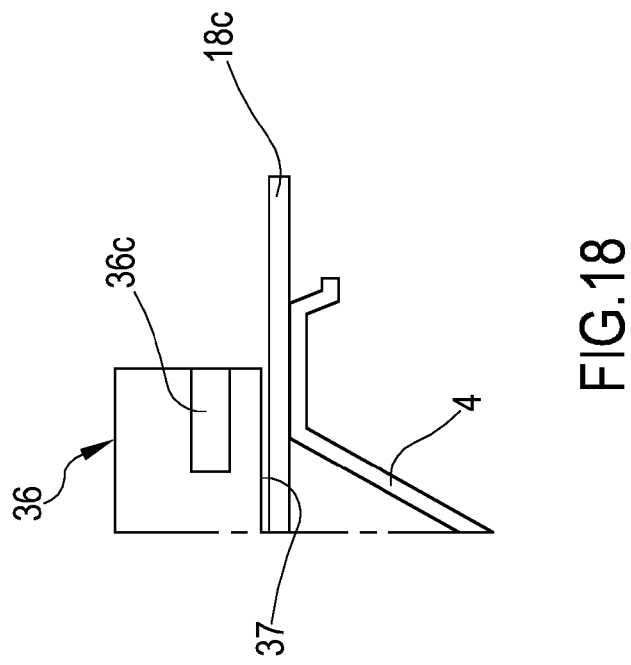
FIG. 18 is a view taken according to plane XVIII of FIG. 17 and shows a cross-section of the packaging apparatus relating to ejectors, in accordance with certain aspects of the invention.
Figure 17:
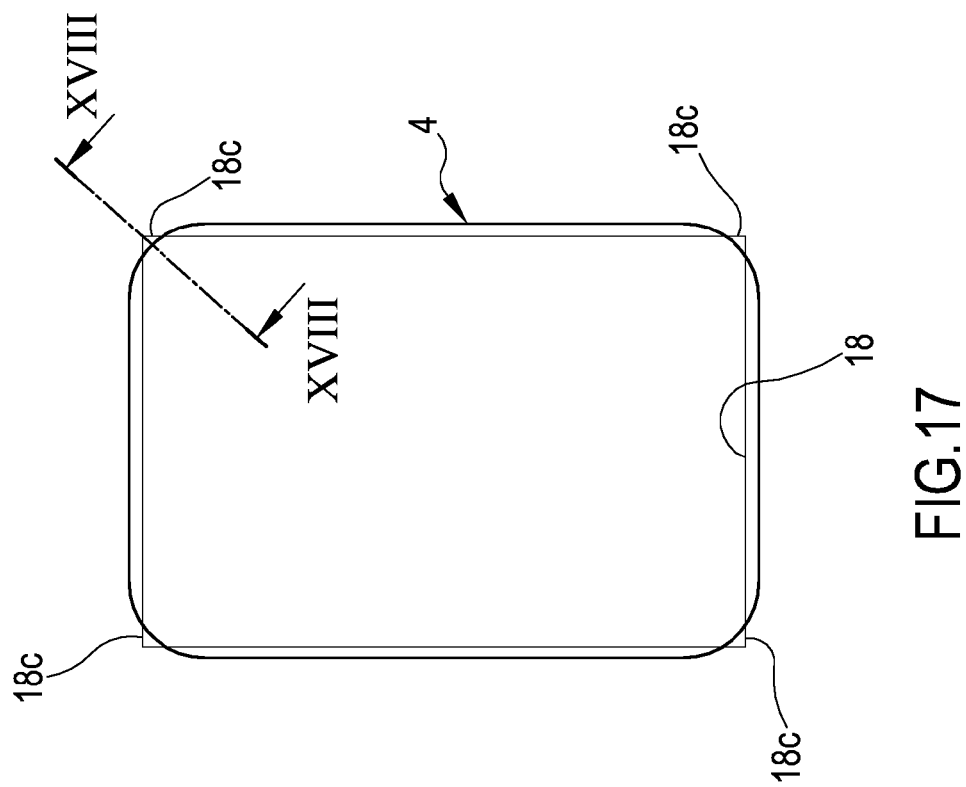
FIG. 17 is a schematic plan view showing a support and a film sheet in overlapping relationship in correspondence of the packaging assembly.

FIGS. 17 and 18 illustrate an exemplary configuration of ejectors around holding plate 36 in line with the second embodiment of apparatus 1. FIG. 17 shows a top view of a tray 4 having a cut film sheet 18 positioned on top and substantially in superimposition therewith. As can be seen in FIG. 17, tray 4 has a substantially rectangular shape with rounded corner regions. Cut film sheet 18 has a substantially corresponding rectangular shape and comprises corner portions 18e extending beyond the rounded corner regions of tray 4. Film holding plate 36 is not shown in FIG. 17 as it would also be substantially in superimposition with tray 4 and cut film sheet 18.

FIG. 18 shows a cross section view of the arrangement shown in FIG. 17, taken along line XVIII. FIG. 18 also shows the cross section of film holding plate 36 with tray 4 positioned below, substantially in contact with active surface 37 of film holding plate 36 and with cut film 18 positioned between tray 4 and active surface 37. In this embodiment, only the corner portions 18e of cut film sheet 18 extend beyond the corner regions of tray 4, so that most of the peripheral portions of cut film sheet 18, namely the peripheral portions extending parallel and along the edges of tray 4, do not extend beyond the rim 4c of tray 4 and, thus, cannot fold or bend downwards as described above with respect to the first embodiment. However, corner portions 18e of cut film sheet 18 extend beyond corner regions of tray 4, and are therefore subject to the above-described problem of the film material folding or bending (e.g. downwards) out of position substantially parallel to a plane defined by the majority of cut film sheet 18, which is substantially parallel to active surface 37 of film holding plate 36.

In order to prevent folding or bending of the corner portions 18e of cut film sheet 18, ejectors 36c are arranged at the corner regions and configured to eject an air or gas stream 31b in a manner similar to ejectors 36c as described above with respect to the first embodiment. In the second embodiment, however, ejection of the air or gas streams 31b is only necessary at the corner portions 18e of cut film sheet 18 where folding or bending out of position is possible, as described above. Other features, functions, and/or details (e.g. the supply of air or gas to the ejectors, lines or manifolds leading thereto, the film positioning arrangement, etc.) largely correspond to those already described in detail with respect to the first embodiment.

Operation of the second embodiment takes place under control of control unit 100 and achieves a process of packaging a product in a tray. In this case, the described process allows a skin packaging of the product. In any case, apparatus 1 is also capable of packaging under modified atmosphere.

In the apparatus 1 of FIGS. 12-16, after the transfer device has moved the cut film sheet 18 into the packaging chamber 24 and the holding plate 36 has received the cut film sheet (see FIG. 12), the control unit 100 controls the film positioning arrangement 30a to supply an air or gas stream 31b to ejectors 36c (in a manner substantially corresponding to that described above with respect to the first embodiment). The air or gas stream creates a flow of air or gas at the corner regions of film holding plate 36 and thus prevents folding of bending of the corner portions 18e (not shown in FIGS. 12-16; see, e.g., FIGS. 20 and 21 instead) of cut film sheet 18 while the backing plate 16 is retracted from chamber 24. The air or gas stream 31b is supplied in substantially the same manner as described above with respect to the first embodiment. For example, the air or gas stream 31b is supplied and maintained in the same manner as described above and can be started, stopped, increased or decreased in the same way. In particular, the air or gas stream 31b can be supplied in a manner adapted to the evacuation of chamber 24 and the stream 31b can comprise air or gas (e.g. the same stream of controlled gas as supplied by the controlled atmosphere arrangement.

Figure 13:
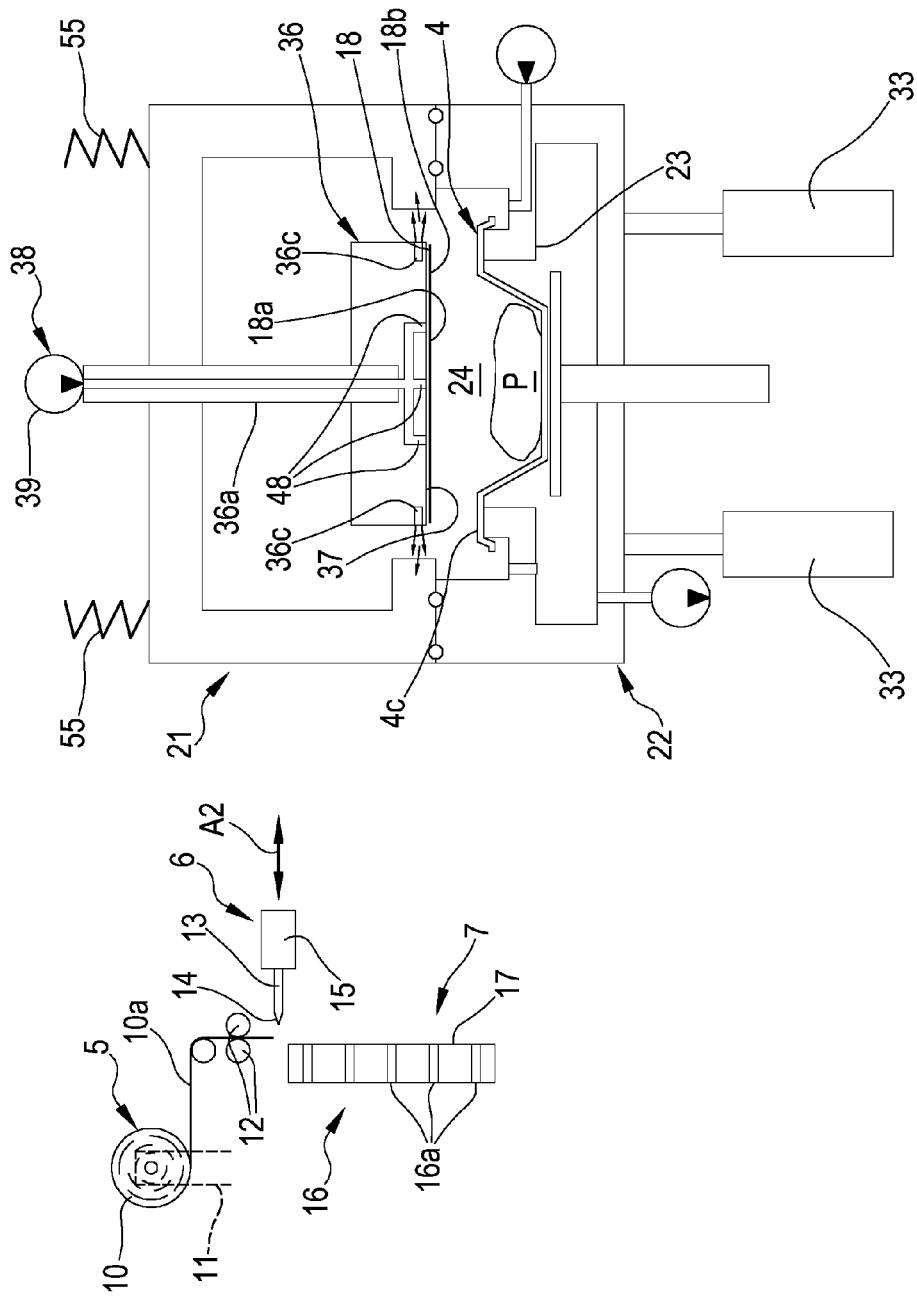
Figure 14:
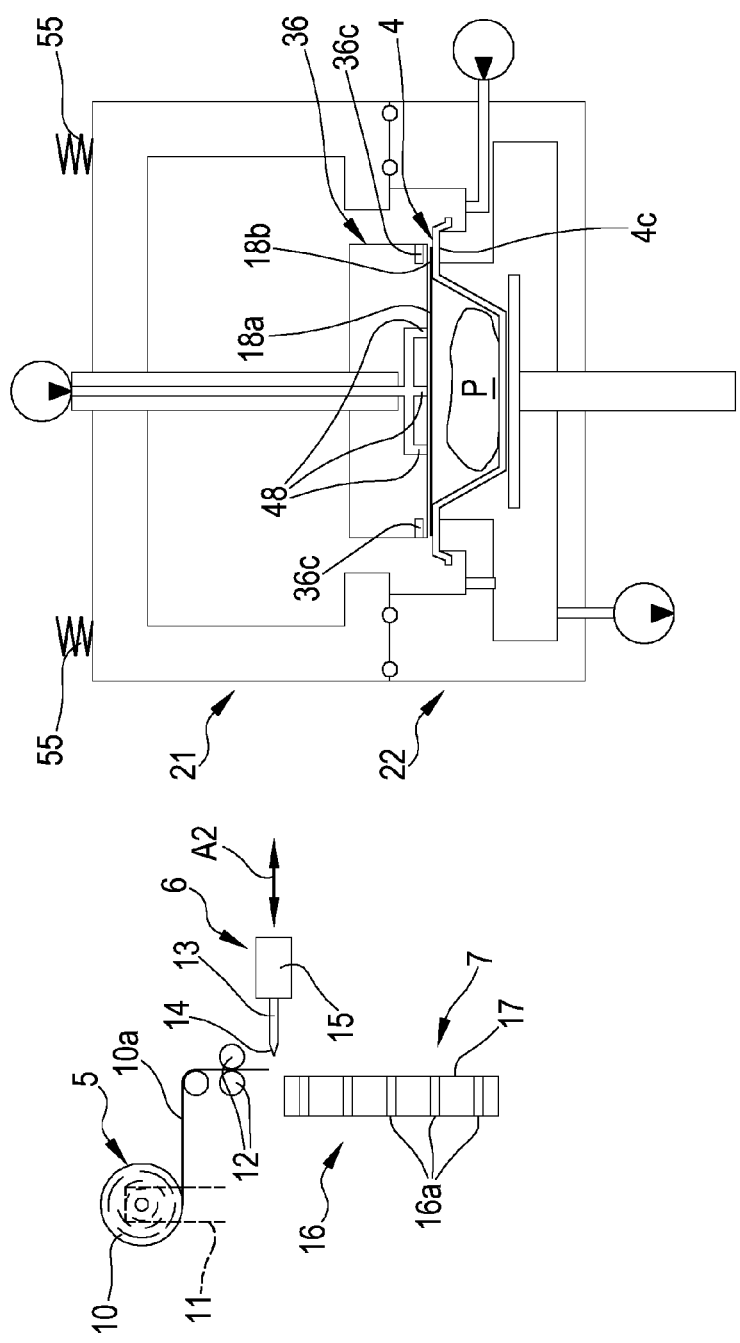

The control unit 100 controls the main actuator 33 to close the packaging chamber 24 (FIG. 13) by lifting the lower tool 22 such that inner wall 33 intercepts the support 4 while air or gas stream 31b is supplied to ejectors 36c. At this point, the packaging chamber is hermetically closed and film sheet 18 is held by holding plate 36 at a certain distance from the mouth of the tray or support 4. As shown in FIG. 13, the vacuum arrangement may be activated and a certain degree of vacuum is created. A further vertical movement imposed onto the lower tool 22 by main actuator 33 wins the reaction of the elastic elements 55 (see FIG. 14) and brings the film sheet hold by holding plate in contact to the rim 4c of the support 4. At substantially the same time (e.g. at the same time or shortly before or after), the supply of the air or gas stream 31b to ejectors 36c is decreased or stopped as the corner portions 18e of cut film sheet 18 are positioned as desired. In this configuration, the corner portions 18e of cut film sheet 18 are prevented from having a detrimental effect on the placement of cut film sheet 18 or the subsequent bonding (e.g. by heat treatment) thereof to tray 4.

The heating means cause a heating of the film sheet 18 positioned above a support 4. As the material of cut film sheet 18 is adequate for vacuum packaging, the heating surface is heated to a temperature allowing the desired subsequent deformation of the central portion 18a of the cut film sheet 18, which typically expands or stretches out and thereby adapts to the contours of the product present within tray 4. Then the control unit causes the pump 39 to pump gas into chamber 24 (e.g. instead of operating as a vacuum source) and thereby cause the draping down of the film sheet onto the product. Alternatively the control unit may simply connect the suction holes 48 to the environment (e.g. surrounding atmosphere) as is typically sufficient for establishing normal pressure within chamber 24. As the cut film sheet 18 is in tight contact with the rim 4c of tray 4 or tray 4 itself and has substantially adapted to the contours of the product present in tray 4, the remaining space between the cut film sheet 18 and the product and/or tray 4 still corresponds to the vacuum established before. Upon establishing normal pressure in chamber 24, the cut film sheet 18 is tightly pressed against the contours of the product and of the tray 4, such that a minimal amount of air or controlled gas remains within the package.

Figure 15:
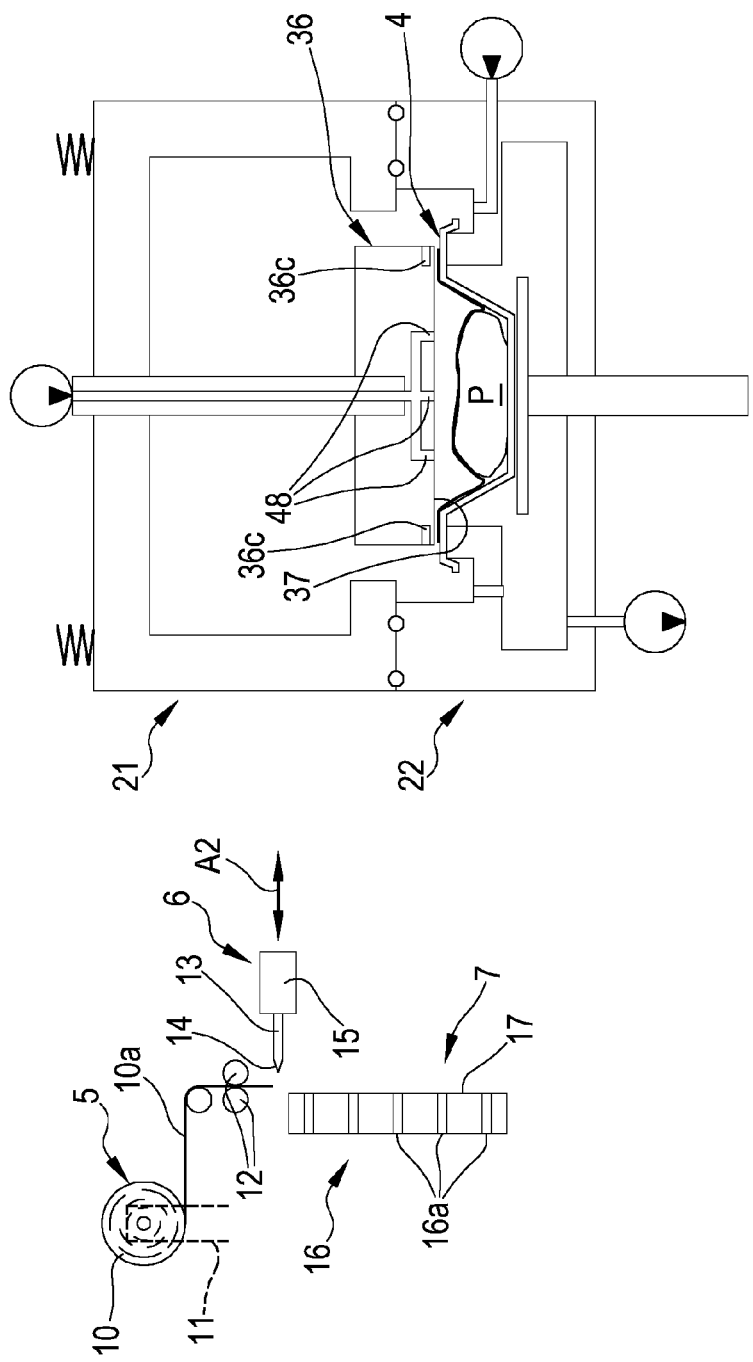
Figure 16:
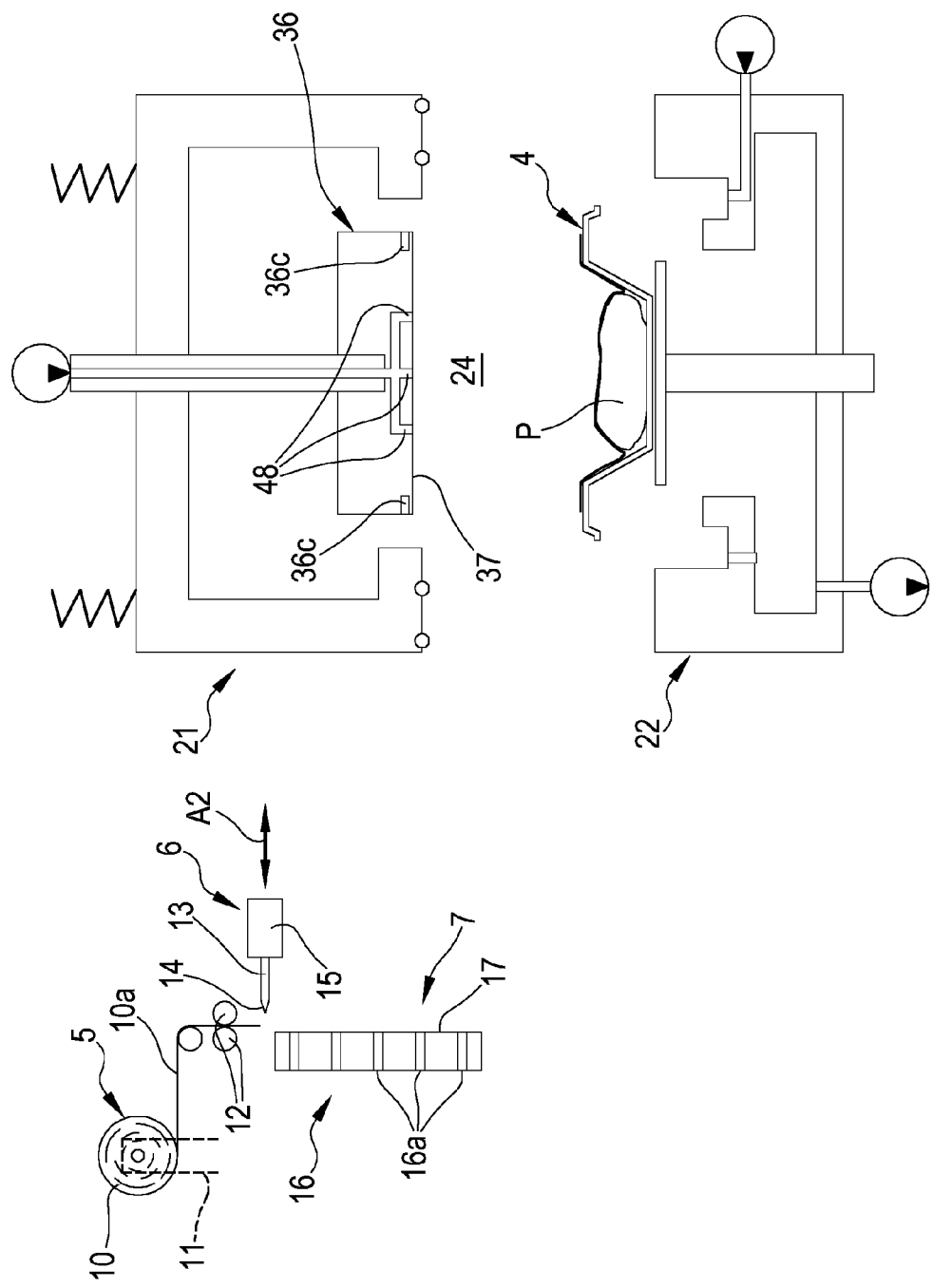

Further heating generated by the heat means may facilitate sealing of the peripheral portion of the film sheet to rim 4c (see FIG. 15). The control unit 100 operates the main actuator to lower the lower tool 22, and thus the packaging chamber 24 may be opened to allow the tray to proceed downstream the packaging assembly. The cycle may then be repeated.

It is noted that the cut film sheet 18 can either bond to tray 4 and rim 4c thereof by the heat treatment described above and/or by heat sealing the peripheral portion of cut film sheet 18 along the rim 4c of tray 4 as also described above.

Control Unit of Apparatus 1

The apparatus according to the invention has of at least one control unit. The control unit 100 (schematically represented in FIG. 1) may comprise a digital processor (CPU) with memory (or memories), an analogical type circuit, or a combination of one or more digital processing units with one or more analogical processing circuits. In the present description and in the claims it is indicated that the control unit 100 is "configured" or "programmed" to execute certain steps. This may be achieved in practice by any means which allow configuring or programming the control unit. For example, in case of a control unit 100 comprising one or more CPUs, one or more programs are stored in an appropriate memory. The program or programs containing instructions which, when executed by the control unit, cause the control unit 100 to execute the steps described and/or claimed in connection with the control unit. Alternatively, if the control unit 100 is of an analogical type, then the circuitry of the control unit is designed to include circuitry configured, in use, to process electric signals such as to execute the control unit steps herein disclosed.

In general terms, the control unit 100 acts on and controls the transport assembly 3, the film cutting assembly 6, the transfer device 7, packaging assembly 8 and particularly the upper and/or lower tools 21, 22, the vacuum arrangement 27, the controlled atmosphere 30. In particular the control unit 100 may be configured for controlling execution of the following cycle:

commanding the transport assembly 3 to displace said support along the predefined path into said packaging chamber 24 so that each support 4 to be packaged is housed in the respective seat 23b;

commanding the film cutting assembly 6 to cut at least one film sheet 18 exactly sized to cover the upper opening of the support 4 delimited by said rim 4c and at least part of or the entire top surface of the rim, commanding the transfer device 7 to position the cut film sheet 18 inside the packaging chamber 24 and above the respective support 4, commanding the upper tool 21 to hold the cut film sheet 18 above and at a distance from said support 4, commanding the film positioning arrangement to position the peripheral portion 18b if the cut film sheet 18 substantially within the plane of the cut film sheet 18, commanding the packaging assembly 8 to pass from the first to the second operating condition so as to hermetically close the packaging chamber 24, commanding the vacuum arrangement 27 to remove air from within said hermetically closed packaging chamber, commanding the controlled atmosphere arrangement 30 to inject a gas or a gas mixture into the packaging chamber, commanding the packaging assembly 8 to tightly fix the film sheet 18 to said support 4, commanding the packaging assembly 8 from the second to the first operating condition, commanding the transport assembly 3 to move the support 4 with the tightly fixed film sheet 18 out of the packaging chamber 24 and then repeating the above cycle.

The control unit may also be configured for controlling the apparatus 1 in order to execute any one of the packaging processes described below or claimed in the appended claims.

Processes of Packaging

Processes of packaging in accordance with aspects of the invention are now described.

The following processes may be executed by the apparatus according to any one of the above embodiments and variants under the supervision of control unit 100. In accordance with an aspect of the invention it is the control unit 100 which is controlled and programmed to execute the processes described below using an apparatus 1 as described in one of the above embodiments or as claimed in any one of the appended claims.

The trays (or supports) 4 are progressively moved to the packaging assembly 8, e.g. by transport assembly 3. At the same time the film 10a is unrolled from roll 10 and the cutting assembly 6 acting outside packaging chamber 8 prepares the cut film sheets 18 in number and size corresponding to the trays to be closed. In practice the film sheets may be cut to a shape and size largely corresponding to that of the outer border of the rim 4c (e.g. substantially identical in size or slightly larger than that of the outer border of rim 4c, and covering the opening of tray 4) or they may be cut to a size radially smaller than the outer edge of rim 4c but sufficiently large to tightly close the opening of tray 4 and to sealingly engage the top surface of rim 4c. In other words, the radial width of the cut film sheets may be comprised between the maximum radial width and the minimum radial width of the rim 4c of tray or support 4. In some examples, the cut film sheets can be somewhat larger than required to cover the entire rim 4c, thereby allowing for some excess material extending beyond the rim 4c.

The tray preparation may be made beforehand or the trays may be formed in-line at a forming station substantially at the same as the cutting of film sheets is performed. The cutting of the film 10a into film sheets 18 takes place at a station remote from the location where the film sheets are coupled to the tray. The cut film sheet or—in case a plurality of trays are treated at the same time—a plurality of cut film sheets are moved to the packaging assembly 8. The packaging assembly 8 is left open for a time period sufficiently long for a number of trays 4 and for a corresponding number of film sheets 18 to be properly positioned inside the packaging chamber 24 defined in the packaging assembly. The transfer device 7 may be used as described above in order to move the film sheets, which have been cut outside the packaging assembly 8, towards and into the packaging chamber 24. Then the packaging assembly 8 is closed and the film sheets are held above the respective tray at a distance sufficient to allow gas circulation inside the tray. The packaging chamber is hermetically closed in the sense that only controlled streams of gas may be withdrawn and/or injected into the chamber 24 under the control of apparatus 1 (e.g. controlled by control unit 100 thereof). At this point, the packaging process may vary depending upon the type of packaging and depending upon the type of film sheet available.

Upon positioning of the cut film sheet 18 (or of multiple cut film sheets), control unit 100 controls the film positioning arrangement 30a to supply an air or gas stream 31b to the ejectors 36c, thereby preventing folding or bending of part of or of the entire peripheral portion 18b or of the corner portions 18e of cut film sheet 18 out of position. As a result, also portions of cut film sheet 18 (e.g. peripheral portions 18b or corner portions 18e) are kept in position substantially in the same plane as the reminder of cut film sheet 18. The supply of the air or gas stream 31b is maintained as desired and can be kept up until the packaging of tray 4 has essentially been performed (e.g. when the cut film sheet 18 is sealedly fixed on tray 4 or when cut film sheet 18 is substantially in contact with tray 4 and/or the product contained therein.

The supply of the air or gas stream 31b can be controlled depending upon the evacuation and/or the supply of a stream of controlled gas as described above. For example, the gas supplied to ejectors 36c can substantially correspond to the gas making up the controlled stream of gas supplied by the controlled atmosphere arrangement. Further, the supply of the air or gas stream 31b can be started, stopped, increased or decreased as desired in combination with one or more of the steps described above.

If, for example, a non heat shrinkable film sheet is being used as tray lid, and if it is intended to create a modified atmosphere packaging, then a partial vacuum is created inside the packaging chamber and a gas for modified atmosphere contemporaneously or subsequently injected. When a partial vacuum is formed in the packaging chamber 24 (e.g. by the control unit 100 controlling the vacuum pump 28 to withdraw gas from said packaging chamber 24) gas is withdrawn until a pressure comprised between 100 and 300 mbar, optionally between 150 and 250 mbar, is reached inside the packaging chamber 24. This pressure level is sufficiently low but not too low, so that detachment of the film sheet from the holding plate 36 is avoided. This can be achieved, for example, by ensuring that the pressure level formed in correspondence of the suction holes 48 is below the pressure level established in the packaging chamber. In this phase, the film sheet (or the film sheets) is kept in place by the holding plate, which may be provided with means for holding the film in proper position as described above. In particular, the peripheral portion 18b and/or the corner portions 18e are kept in position as described above. Then, after a prefixed delay from start of gas withdrawal (e.g. after a prefixed delay from activation of said vacuum pump 28) or after a prefixed level of vacuum has been reached inside said packaging chamber 24, a modified atmosphere gas in injected into the packaging chamber 8. The injecting of said stream of controlled gas for creating a modified atmosphere may be started even while gas withdrawal is still going on so as to shorten the time for creating the modified atmosphere. The risks involved with high oxygen content are the same as discussed above. Alternatively or additionally to the injection of the stream of controlled gas, substantially the same controlled gas can be supplied by the film positioning arrangement 30a to ejectors 36c as described above, for example to fill chamber 24 for quickly, more uniformly, or more efficiently. Moreover as it is preferable to avoid having very strong vacuum in the packaging chamber and at the same time it is desirable to ensure a proper atmosphere inside the chamber it is advantageous stopping the vacuum generation after the gas injection has already started. In this way pressure inside the chamber never goes below a desired value. During the overlap, the gas injected is mixed with residual air and continuing to pull vacuum the mix air-modified atmosphere gas continues to be removed so that the amount of initial air is in any case decreased. Again, suitable pumps should be used (e.g. pumps suitable for pumping gas having a high oxygen content).

The film sheet 18 may be uniformly heated or it may be heated at least in correspondence of the peripheral portion 18b. This operation may take place using the heating structure 40 and/or the heating means associated to the holding plate 36. At least one of the peripheral portion 18b of cut film sheet 18 and of the rim 4c is brought to a temperature allowing the heat bonding of the peripheral portion 18b to the rim 4c of tray 4 and a tight closure of the tray 4. Thereafter, or contemporaneously to heating, the film sheet 18 is lowered and tightly bond to the tray. If ultrasonic or microwave-based heaters are used, they are operated at this stage and also the rim 4c of tray 4 may be contemporaneously heated. Once the bonding has been completed, the packaging chamber may be opened and the tray 4 provided with a tight lid formed by the cut film sheet 18 may proceed out of the packaging chamber 24.

If, for example, a heat shrinkable film sheet is being used as tray lid, and if it is intended to create a modified atmosphere packaging, then a partial vacuum is created inside the packaging chamber and a gas for modified atmosphere contemporaneously or subsequently injected. When a partial vacuum is formed in the packaging chamber 24 (e.g. by the control unit 100 controlling the vacuum pump 28 to withdraw gas from said packaging chamber 24) gas is withdrawn until a pressure comprised between 100 and 300 mbar, optionally between 150 and 250 mbar, is reached inside the packaging chamber 24. This pressure level is sufficiently low but not too low, so that detachment of the film sheet from the holding plate 36 is avoided. This can be achieved, for example, by ensuring that the pressure level formed in correspondence of the suction holes 48 is below the pressure level established in the packaging chamber. In this phase the film sheet is kept by the holding plate, which may be provided with means for holding the film in proper position as described above. Heat shrinkable films may be very thin (e.g. the thickness may go down to a range of 15-40 micron, in some applications down to a range of 10-15 micron) and their handling after cutting is difficult so it is relevant that the pressure levels in the packaging chamber and at the holding plate are properly controlled. After a prefixed delay from the start of gas withdrawal (e.g. after a prefixed delay from activation of said vacuum pump 28) or after a prefixed level of vacuum has been reached inside said packaging chamber 24, a modified atmosphere gas is injected into the packaging chamber 24. The injecting of said stream of controlled gas for creating a modified atmosphere may be started even while gas withdrawal is still going on so as to shorten the time for creating the modified atmosphere. Alternatively or additionally to the injection of the stream of controlled gas, substantially the same controlled gas can be supplied by the film positioning arrangement 30a to ejectors 36c as described above, for example to fill chamber 24 for quickly, more uniformly, or more efficiently. Moreover as it is preferable to avoid having very strong vacuum in the packaging chamber and at the same time it is desirable to ensure a proper atmosphere inside the chamber it is advantageous stopping the vacuum generation after the gas injection has already started. In this way pressure inside the chamber never goes below a desired value. During the overlap, the gas injected is mixed with residual air and, continuing to pull vacuum, the mix air-modified atmosphere gas continues to be removed so that the amount of initial air is in any case decreased. This flushing of gas and mixing of the gas and residual air is very important in order to achieve the desired controlled atmosphere in an effective and efficient manner, while ensuring that the desired pressure (i.e. level of vacuum) is achieved.

The film sheet 18 may be heated in correspondence of its periphery 18*b*. This operation may take place using the heating structure 40. At least one of the peripheral portion 18*b* of cut film sheet 18 and of the rim 4*c* is brought to a temperature allowing the heat bonding of the peripheral portion 18*b* to the rim 4*c* of tray 4 and a tight closure of the tray 4. Then the film sheet is lowered and tightly bond to the tray 4. In case ultrasonic or microwave-based heaters are used, they are operated at this stage and also the tray rim 4*c* may be contemporaneously heated. Once the bonding has been completed, the packaging chamber may be opened and the tray 4 provided with a tight lid formed by the cut film sheet 18 may proceed out of the packaging chamber 24.

If, for example, a non-heat shrinkable film sheet is being used and if it is intended to create a vacuum skin packaging, then a vacuum is created inside the packaging chamber. Then, the film sheet 18 may be uniformly heated or it may be heated at least in correspondence of its periphery 18*b* to a first temperature adequate for heat sealing and it may be heated in correspondence of its central portion 18*a* to a second temperature, e.g. equal to or above the first temperature, adequate for rendering the film sheet deformable. This operation may take place using the heating structure 40 and/or the heating means associated to the holding plate 36. Then, once a vacuum level adequate for skin packaging has been reached, the film sheet is lowered such that the peripheral portion 18*b* of the film sheet 18 contacts the rim 4*c* of the tray 4. In case ultrasonic or microwave-based heaters are used, they are operated at this stage and also the rim 4*c* of tray 4 may be contemporaneously heated. In general, the heating of the film 18 or of the peripheral portion 18*b* thereof preferably takes place at the same time as the film is moved towards (i.e. is approached to) and contacts the tray 4 or the rim 4*c* thereof. The holding plate 36 releases the film sheet and normal atmosphere pressure is created above the cut film sheet 18 which drapes down and matches the shape of the product P and of the inside walls of the tray crating a plastic film skin around the product and on the surfaces of the tray 4 that are not occupied by product P. In other words, when a predefined low pressure is reached within packaging chamber 24 and thus within the tray or support 4 underneath the film sheet 18, the film sheet 18 is released and is drawn downwardly by the vacuum within the support 4. Since the film sheet 4 is heated (and softened), under effect of the vacuum within the support 4 it deforms so as to adhere to the product P and to the inner surface of the support 4 (see FIGS. 15 and 16). In practice the film is at least bonded to the rim 4*c* and to portions of the inner surface of the support 4. Once the bonding has been completed, the packaging chamber may be opened and the tray 4 provided with a tightly associate skin formed by cut film sheet 18 may move out of the packaging chamber 24.

It is noted that an ejection of a stream of gas or air 31*b* can be controlled so as to not interfere with the creation and/or maintaining of the vacuum within chamber 24. For example, the amount of gas or air ejected can be minimized so as to achieve, depending upon the material and properties of the film used, the effect of positioning the peripheral 18*b* and/or corner portions 18*e* of cut film sheet 18, while not substantially (or, at least, very slowly) altering the pressure and/or composition of the atmosphere within chamber 24.

Alternatively, the creation of a vacuum inside chamber 24 may be skipped and the cut film sheet 18 can be bonded to the tray 4 creating a sealed tray with ambient atmosphere inside the package.

While the invention has been described in connection with what is presently considered to be the most practical and preferred embodiments, it is to be understood that the invention is not to be limited to the disclosed embodiments, but on the contrary, is intended to cover various modifications and equivalent arrangements included within the spirit and the scope of the appended claims. For example, the elastic elements 55, 60, and 80 may be substituted by linear actuators controlled by control unit 100.

The specific nature of the actuators described is exemplary and alternative types of actuators may be used provided the type of motion imposed to the mobile parts on which said actuators are operating is substantially the same.

It is also notes that although the described embodiments show a single packaging assembly 8, multiple packaging assemblies may be used in parallel together with multiple transfer devices 7 (as shown, e.g., in FIGS. 1 and 2, or any alternative thereto), in order to optimize productivity.

The invention claimed is:

1. An apparatus for packaging a product arranged on one or more supports, said one or more supports having a base wall and a side wall, said apparatus comprising:
    a packaging assembly configured to fix one or more film sheets to the one or more of the supports, the packaging assembly including:
        a lower tool comprising at least an inner wall defining a prefixed number of seats to receive the one or more supports, and
        an upper tool facing the lower tool and comprising a film holding plate configured to hold the one or more film sheets, the film holding plate having a respective active surface configured to receive the one or more film sheets, at least the upper and lower tools cooperating to define a packaging chamber,
        wherein said packaging assembly is configured to operate at least in a first operating condition and in a second operating condition, wherein said packaging chamber is open to receive the one or more film sheets in the first operating condition, and wherein said packaging chamber is closed in the second operating condition;
    a film supply configured to supply a continuous film;
    a film cutter configured to cut film sheets of prefixed length from said continuous film; and
    a control unit coupled to the packaging assembly and configured to command the packaging assembly to pass from the first to the second operating condition and vice-versa;
    wherein the film holding plate has a lateral surface extending substantially transverse to a plane defined by the active surface, the film holding plate comprising a plurality of ejectors arranged in the lateral surface, each of the plurality of ejectors being configured to eject a stream of gas in a direction substantially parallel to said plane and substantially away from a center of the active surface.

2. The apparatus according to claim 1, wherein the film cutter is located outside said packaging chamber.

3. The apparatus according to claim 1, further comprising at least one of:

a vacuum arrangement coupled to the packaging chamber and configured to remove gas from said packaging chamber, wherein said control unit is further configured to control the vacuum arrangement to withdraw gas from said packaging chamber at least when the packaging assembly is in said second operating condition with said packaging chamber closed; and at least one injection device coupled to the packaging chamber and configured to inject a stream of controlled gas into said packaging chamber, wherein said control unit is further configured to control said at least one injection device to inject said stream of controlled gas at least when the packaging assembly is in said second operating condition with said packaging chamber closed, wherein the at least one injection device is configured to inject gas into the packaging chamber including a quantity of one or more of $N_2$, $O_2$ and $CO_2$ which is different from a quantity the one or more of $N_2$, $O_2$ and $CO_2$ as present in the atmosphere at 20° C. and 1 atmosphere pressure; or a vacuum arrangement and at least one injection device, wherein the control unit is configured to control said at least one injection device to start injecting a stream of controlled gas either after a prefixed delay from activation of said vacuum arrangement or after a prefixed level of vacuum has been reached inside said packaging chamber, wherein the control unit is configured to operate the vacuum arrangement to remove gas from said packaging chamber and create in the packaging chamber a vacuum level with pressure in a range between 100 and 300 mbar.

4. The apparatus according to claim 3, wherein the apparatus further comprises:

a film positioning arrangement coupled to the plurality of ejectors and configured to supply the stream of gas to the plurality of ejectors;

wherein the stream of gas has a same composition as the stream of controlled gas injected by the at least one injection device;

wherein the film positioning arrangement comprises a supply switch configured to controllably select a first gas supply source and a second gas supply source for of the stream of gas, the first gas supply source being configured to supply gas having the same composition as the stream of controlled gas injected by the at least one injection device, the second gas supply source being configured to supply air; and wherein the control unit is further configured to control said film positioning arrangement to supply said stream of gas comprising one or more of starting supply of the stream of gas, increasing supply of the stream of gas, decreasing supply of the stream of gas, and stopping supply of the stream of gas.

5. The apparatus according to claim 1, wherein the film holding plate comprises means for holding the one or more film sheets in correspondence of said active surface, wherein said means for holding of the group consisting of:

a vacuum source controlled by the control unit, the control unit being configured to activate the vacuum source and cause the film holding plate to receive and hold said one or more film sheets in correspondence of the active surface, mechanical holders associated to the active surface, adhesive portions associated to the active surface, heatable portions associated to the holding plate and controlled by control unit to cause heating of the active surface and thus of the film sheet in order to increase stickiness of the film sheet to the active surface, and electric systems associated to the film holding plate and controlled by control unit to charge the active surface with a predetermined polarity.

6. The apparatus according to claim 5, further comprising a heating structure peripherally associated to the film holding plate and having a respective heating surface which extends radially outside with respect to the active surface of the film holding plate, wherein:

at least when the packaging assembly is in said second operating condition, the heating surface of the heating structure faces an end surface of said inner wall delimiting a respective one of said seats in the lower tool, the heating structure and film holding plate are relatively movable the one with respect to the other along a main direction such that the heating surface of the heating structure is selectively positioned in a position where it does not contact the film sheet and in a position where it contacts the film sheet positioned above a support located in one of said seats, and the control unit is configured to control heating of the heating structure such that the heating surface is brought at least to a first temperature.

7. The apparatus according to claim 5, comprising:

heating means integrated in the film holding plate and configured to be controlled by the control unit, the control unit being configured to control the heating means such that the active surface of the film holding plate is brought at least to a second temperature in a range between 150° C. and 260° C.;

wherein the control unit is configured to independently control the heating means and a heating structure and further configured to independently set first and second temperatures.

8. The apparatus according to claim 5, further comprising a heating structure, wherein the heating structure comprises at least one of:

a metallic body embedding at least one of a resistive element or an inductive element coupled to a power supply and to the control unit which is configured to control the power supply to supply current to the resistive element or the inductive element to keep a temperature of the heating surface within a prefixed range around a first temperature;

a metallic wire directly carried by the heating surface of the heating structure, the metallic wire being coupled to a power supply and to the control unit which is configured to control the power supply to supply current to the metallic wire during discrete time intervals followed by time intervals where no current is supplied to the metallic wire; or a printed circuit formed onto said heating surface of the heating structure, the printed circuit being coupled to a power supply and to the control unit which is configured to control the power supply to supply current to the printed circuit during discrete time intervals followed by time intervals where no current is supplied to the printed circuit.

9. The apparatus according to claim 5, wherein the film holding plate is rigidly coupled to the upper tool and mounted to the upper tool so that the film holding plate is not relatively movable with respect to the upper tool at least along a main direction and so that the active surface is flush to a bottom surface of the lower tool, and wherein said active surface of the film holding plate is sized to overlap an end surface of said inner wall delimiting a respective one of said seats in the lower tool.

10. The apparatus according to claim 1, comprising heating means integrated in the film holding plate and configured to be controlled by the control unit, the control unit being configured to control the heating means such that the active surface of the film holding plate is brought at least to a second temperature in a range between 150° C. and 260° C.

11. The apparatus according to claim 1, wherein the plurality of ejectors comprises at least one of:
   at least one ejector arranged at each of four corners of the film holding plate, wherein the film holding plate has a substantially rectangular shape comprising four corners;
   ejectors arranged around a perimeter of the film holding plate defined by the lateral surface;
   ejectors in fluid communication with a common manifold configured to supply the stream of gas to each of the ejectors;
   ejectors angularly arranged with respect to a center of the active surface in substantially the same angular distance from one another; or
   ejectors coupled to a film positioning arrangement configured to supply the stream of gas to the ejectors.

12. The apparatus according to claim 11, wherein the plurality of ejectors comprises the ejectors coupled to the film positioning arrangement, wherein the control unit is further configured to control said film positioning arrangement to supply said stream of gas by one or more of:
   starting supply of the stream of gas,
   increasing supply of the stream of gas,
   decreasing supply of the stream of gas, and
   stopping supply of the stream of gas.

13. The apparatus according to claim 11, wherein the plurality of ejectors comprises the ejectors coupled to the film positioning arrangement, and wherein the control unit is configured to:
   control said film positioning arrangement to start supply of the stream of gas to the ejectors,
   control said vacuum arrangement to withdraw gas from said packaging chamber, to control the film positioning arrangement to decrease or stop supply of the stream of gas to the ejectors during withdrawal of gas from the packaging chamber, and to control the film positioning arrangement to restart or increase supply of the stream of gas to the ejectors while withdrawal of gas from the packaging chamber is ongoing,
   control said at least one injection device to start injecting the stream of controlled gas,
   control said at least one injection device to stop injecting the stream of controlled gas, and
   control said film positioning arrangement to stop supply of the stream of gas to the ejectors.

14. The apparatus according to claim 13, wherein the control unit is configured to control the at least one injection device to start injecting the stream of controlled gas further by controlling the film positioning arrangement to start supply of a gas to the ejectors having the same composition as the stream of controlled gas.

15. The apparatus according to claim 1, wherein the packaging assembly further comprises at least a side wall movably associated to one of the upper tool and the lower tool, wherein:
   the side wall has a front surface configured to abut against an abutment surface of the other of said upper tool and the lower tool,
   the side wall is mounted to the packaging assembly such that, when the packaging assembly moves from said first operating condition to said second operating condition, the side wall correspondingly moves from a first position to a second position, wherein the side wall front surface is spaced from said abutment surface so that the packaging chamber is left open to receive one or more of said film sheets in the first position, and wherein a front surface of the side wall closes against said abutment surface such that said packaging chamber is hermetically closed with respect to an atmosphere outside the apparatus.

16. The apparatus according to claim 1, wherein the lower tool is provided with multiple seats each configured to host a corresponding support and wherein the upper tool is provided with a corresponding plurality of holding plates each configured to hold a respective film sheet.

17. The apparatus according to claim 1, wherein:
   the apparatus comprises a frame carrying:
      a transport assembly,
      the packaging assembly,
      the film supply, which comprises a film roll supported by a roll holder carried by said frame, and
      the film cutter, which comprises at least one blade carried by said frame and active in a position located between said packaging assembly and said film supply assembly;
   wherein the control unit is configured to:
      command the transport assembly to displace said one or more supports and said packaging chamber,
      command the film cutter assembly to cut at least one film sheet,
      command a transfer device or the upper tool to position the cut film sheet inside the packaging chamber and above the respective one of the one or more supports,
      command the upper tool to hold the cut film sheet above, and at a distance from, said one of the one or more supports,
      command the packaging assembly to pass from the first to the second operating condition, and
      command the packaging assembly to fix the film sheet to said one of the one or more supports.

* * * * *